(12) United States Patent
Murata et al.

(10) Patent No.: US 9,189,136 B2
(45) Date of Patent: Nov. 17, 2015

(54) INFORMATION PROCESSING APPARATUS AND INFORMATION PROCESSING METHOD

(71) Applicant: Sony Corporation, Tokyo (JP)

(72) Inventors: Makoto Murata, Tokyo (JP); Masatomo Kurata, Tokyo (JP); Takashi Ogata, Tokyo (JP); Masanori Katsu, Tokyo (JP); Mitsuo Okumura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/933,009

(22) Filed: Jul. 1, 2013

(65) Prior Publication Data

US 2013/0305168 A1    Nov. 14, 2013

Related U.S. Application Data

(63) Continuation of application No. 12/629,213, filed on Dec. 2, 2009, now Pat. No. 8,508,536.

(30) Foreign Application Priority Data

Dec. 5, 2008 (JP) ................................. 2008-311628

(51) Int. Cl.
*G06T 13/00* (2011.01)
*G06F 3/0484* (2013.01)
(Continued)

(52) U.S. Cl.
CPC .............. *G06F 3/0484* (2013.01); *G06F 3/016* (2013.01); *G06F 3/0481* (2013.01); *G06F 3/04883* (2013.01); *H04M 1/27455* (2013.01); *H04M 1/274583* (2013.01); *H04M 1/72522* (2013.01); *G06F 2203/013* (2013.01); *G06F 2203/014* (2013.01); *H04M 1/72552* (2013.01); *H04M 2250/12* (2013.01); *H04M 2250/22* (2013.01)

(58) Field of Classification Search
None
See application file for complete search history.

(56) References Cited

U.S. PATENT DOCUMENTS

| 2006/0026521 | A1 | 2/2006 | Hotelling et al. |
| 2007/0112922 | A1 | 5/2007 | Kurata et al. |

(Continued)

FOREIGN PATENT DOCUMENTS

| JP | 08-005394 | 1/1996 |
| JP | A HEI 08-005394 | 1/1996 |

(Continued)

OTHER PUBLICATIONS

Office Action from the Japanese Patent Office in corresponding Japanese Application No. 2008-311628, dated Nov. 5, 2013.

(Continued)

*Primary Examiner* — Phi Hoang
*Assistant Examiner* — Mohammad H Akhavannik
(74) *Attorney, Agent, or Firm* — Oblon, McClelland, Maier & Neustadt, L.L.P.

(57) ABSTRACT

An information processing apparatus, comprising:
 a storage unit that records predetermined information about a first user and a second user registered by the first user;
 a data control unit that generates a video signal that displays objects corresponding to the first user and the second user in a two-dimensional display screen at a distance calculated based on the predetermined information; and
 a display control unit that displays the video signal in the two-dimensional display screen.

21 Claims, 56 Drawing Sheets

(51) Int. Cl.
*G06F 3/01* (2006.01)
*G06F 3/0481* (2013.01)
*G06F 3/0488* (2013.01)
*H04M 1/2745* (2006.01)
*H04M 1/725* (2006.01)

(56) References Cited

U.S. PATENT DOCUMENTS

2007/0123204 A1  5/2007  Inukai
2007/0204218 A1*  8/2007  Weber et al. ............... 715/530
2009/0094518 A1*  4/2009  Lawther et al. ............ 715/716

FOREIGN PATENT DOCUMENTS

| JP | 11-073271 | 3/1999 |
| JP | A HEI 11-073271 | 3/1999 |
| JP | A 2001-318870 | 11/2001 |
| JP | 2005-102773 | 4/2005 |
| JP | A 2005-102773 | 4/2005 |
| JP | 2005-234882 | 9/2005 |
| JP | A 2005-234882 | 9/2005 |
| JP | 2006-340903 | 12/2006 |
| JP | 2006-345269 | 12/2006 |
| JP | A 2006-345269 | 12/2006 |
| JP | 2007-129609 | 5/2007 |
| JP | A 2007-129609 | 5/2007 |
| JP | 2008-3655 | 1/2008 |
| JP | 2008-107895 | 5/2008 |
| JP | A 2008-107895 | 5/2008 |

OTHER PUBLICATIONS

Office Action from the Japanese Patent Office in corresponding Japanese Application No. 2013-125467 dated Feb. 25, 2014.
Wang, J., "The Integrated Technique of GPS/GIS/GPRS Application in Vehicle Locating and Monitoring," (2005).

* cited by examiner

FIG. 24
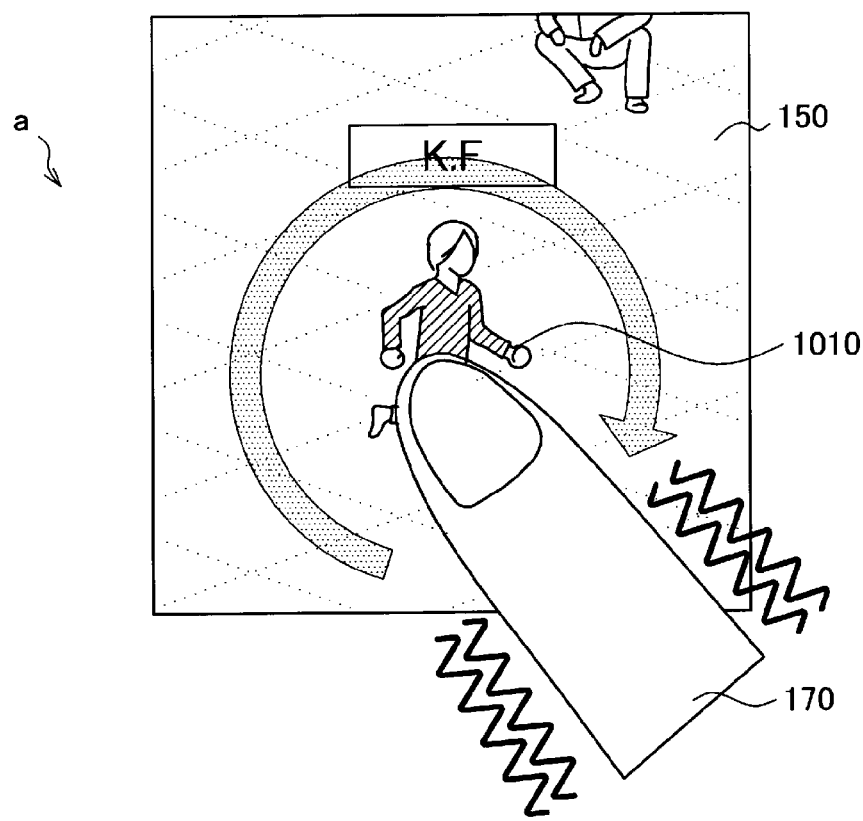
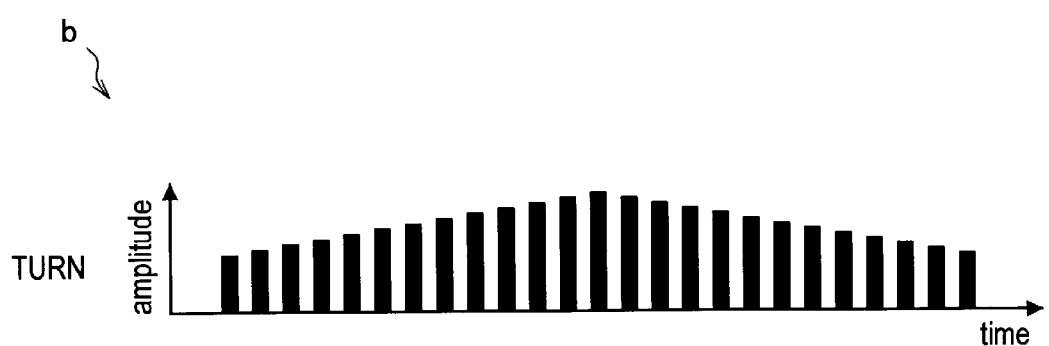
TURN

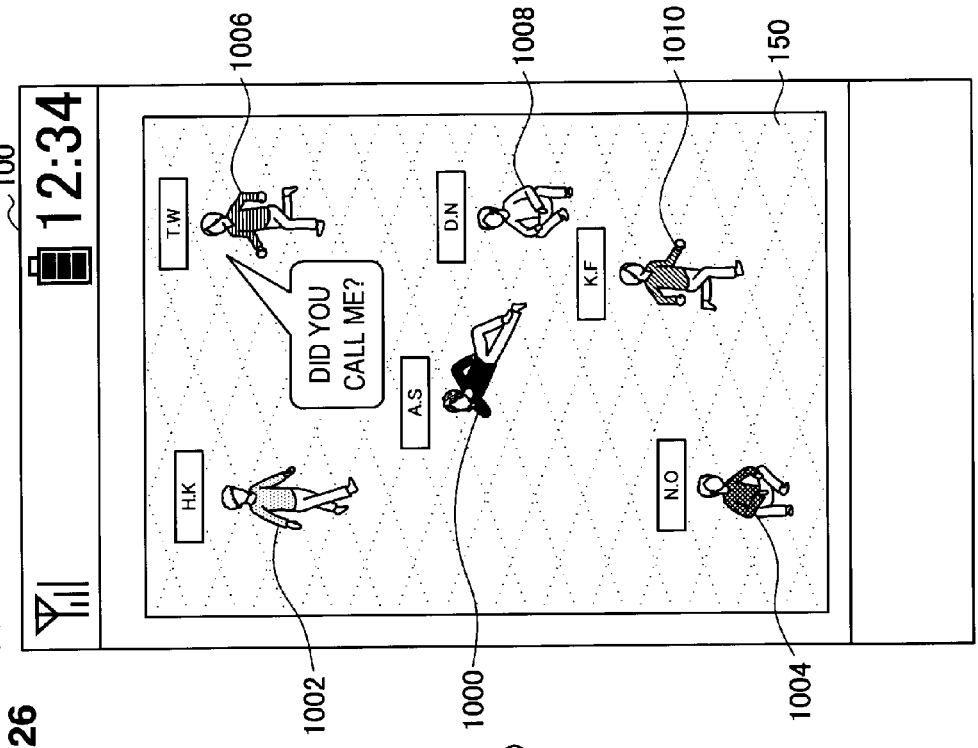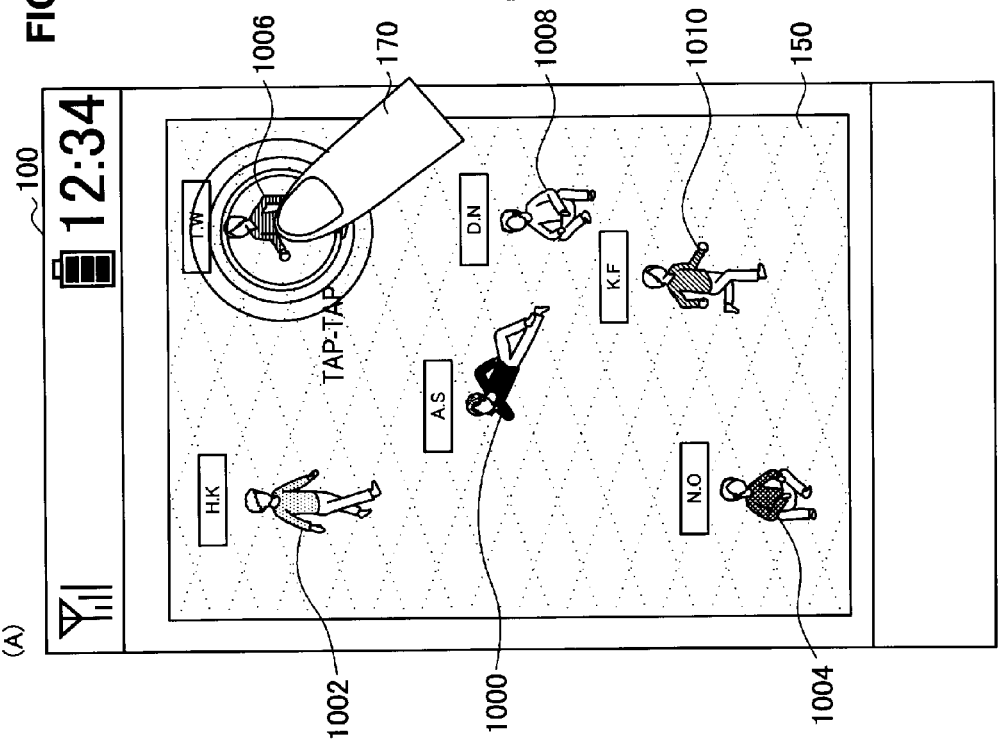
FIG. 26

INFORMATION PROCESSING APPARATUS AND INFORMATION PROCESSING METHOD

This is a continuation of application Ser. No. 12/629,213, filed Dec. 2, 2009, which claims priority to Japanese Application No. 2008-311628, filed Dec. 5, 2008. All of the applications are incorporated herein by reference in their entirety.

BACKGROUND OF THE INVENTION

1. Field of the Invention

The present invention relates to an information processing apparatus and an information processing method.

2. Description of the Related Art

In recent years, information processing apparatuses such as mobile phones have been multifunctional. Thus, a user can obtain a variety of information by using various functions mounted in an information processing apparatus. Functions mounted in an information processing apparatus include, as an example, a function capable of grasping behavior of the user. For example, Japanese Patent Application Laid-Open No. 2006-340903 and Japanese Patent Application Laid-Open No. 2008-003655 disclose a technology that recognizes behavior of a user such as walking, running, and stopping by using an acceleration sensor and a gyro sensor and displays the behavior as an object.

SUMMARY OF THE INVENTION

However, even if the above function is used, it is difficult to grasp behavior of a plurality of other users at a time. Moreover, it is difficult to grasp information other than the behavior of the plurality of other users at the same time.

The present invention has been made in view of the above issues and it is desirable to provide a novel and improved information processing apparatus capable of arranging objects displaying behavior of a plurality of users on a two-dimensional surface based on predetermined information and an information processing method.

According to an embodiment of the present invention, there is provided an information processing apparatus, comprising: a storage unit that records predetermined information about a first user and a second user registered by the first user; a data control unit that generates a video signal that displays objects corresponding to the first user and the second user in a two-dimensional display screen at a distance calculated based on the predetermined information; and a display control unit that displays the video signal in the two-dimensional display screen.

The information processing apparatus may further comprise: a behavior sensing unit that senses behavior of the first user; a sensor data generation unit that generates sensor data on behavior information of the first user by receiving the behavior information, which is information about behavior of the first user, from the behavior sensing unit; a behavior parameter extraction unit that extracts behavior parameters characterizing behavior from the sensor data; and a behavior representation data generation unit that generates behavior representation data represented by using moving images or still images based on the behavior parameters, wherein the data control unit generates a video signal that displays the behavior representation data as the objects in the two-dimensional display screen at a distance based on the predetermined data.

The information processing apparatus may further comprise: a data transmission unit that transmits the behavior representation data to a server; and a data receiving unit that receives the behavior representation data of the second user from the server, wherein the data control unit generates a video signal that displays the behavior representation data of the first user and the second user as the objects in the two-dimensional display screen at a distance based on the predetermined data.

The information processing apparatus may further comprise: a position recognition unit that recognizes a presence position of the first user; and a position data generation unit that generates position data from presence position information, which is information about the presence position of the first user acquired from the position generation unit, wherein the data transmission unit transmits the position data of the first user generated by the position data generation unit to the server and the data control unit generates a video signal that displays the behavior representation data of the first user and the second user as the objects in the two-dimensional display screen at a distance based on the position data of the first user and at least one piece of the position data of the second user received by the data receiving unit.

The predetermined data may be communication history data on a history of communication between users using the information processing apparatus owned by each user and the data control unit may generate a video signal that displays the behavior representation data of the first user and the second user as the objects in the two-dimensional display screen at a distance based on the communication history data.

With an external object being brought into contact with the object displayed in the display screen, the data control unit may cause the object to move following movement of the external object in contact.

The predetermined data for each user may be personal data on the user, the data transmission unit transmits the personal data to the server, and the data control unit generates a video signal that displays the behavior representation data of the first user and the second user as the objects in the two-dimensional display screen at a distance based on the personal data of the first user and the personal data of the second user received by the data receiving unit from the server.

When a gesture based on a predetermined type by the first user is made to the object of the user, communication may be started between a local apparatus and the information processing apparatus owned by the second user.

The behavior parameter extraction unit may comprise: a sensor data receiving unit that receives the sensor data; a behavior classification unit that, when the sensor data is displayed chronologically, classifies peaks based on a period in which the peak represented by an output value of the sensor data occurs; and an extraordinary behavior extraction unit that extracts the peaks whose period is equal to or less than a predetermined value and transmits data on the extracted peaks to the behavior representation data generation unit as extraordinary behavior data.

The behavior parameter extraction unit may comprise: a sensor data receiving unit that receives the sensor data; a behavior pattern generation unit that generates a behavior pattern by acquiring a plurality of pieces of the sensor data; and a behavior pattern evaluation unit that determines a correlation coefficient between the behavior pattern received from the behavior pattern generation unit and the sensor data received from the sensor data receiving unit and transmits the sensor data that does not fall within a range of predetermined correlation coefficients to the behavior representation data generation unit.

According to another embodiment of the present invention, there is provided an information processing method, comprising the steps of: generating a video signal that, based on predetermined information about a first user and a second user registered by the first user in advance, displays objects corresponding to the first user and the second user in a two-dimensional display screen at a distance calculated based on the predetermined information; and displaying the video signal in the two-dimensional display screen.

According to another embodiment of the present invention, there is provided a program that causes a computer to realize functions held by the information processing apparatus. Further, a computer readable recording medium in which the program is recorded can be provided.

According to the present invention, as described above, objects displaying behavior of a plurality of users can be arranged on a two-dimensional surface based on predetermined information.

BRIEF DESCRIPTION OF THE DRAWINGS

FIG. 24 is an explanatory view showing a function of vibration of the information processing apparatus according to the embodiment;

FIG. 26 is an explanatory view showing a display screen of the information processing apparatus according to the embodiment;

DETAILED DESCRIPTION OF THE EMBODIMENTS

Figure 1:
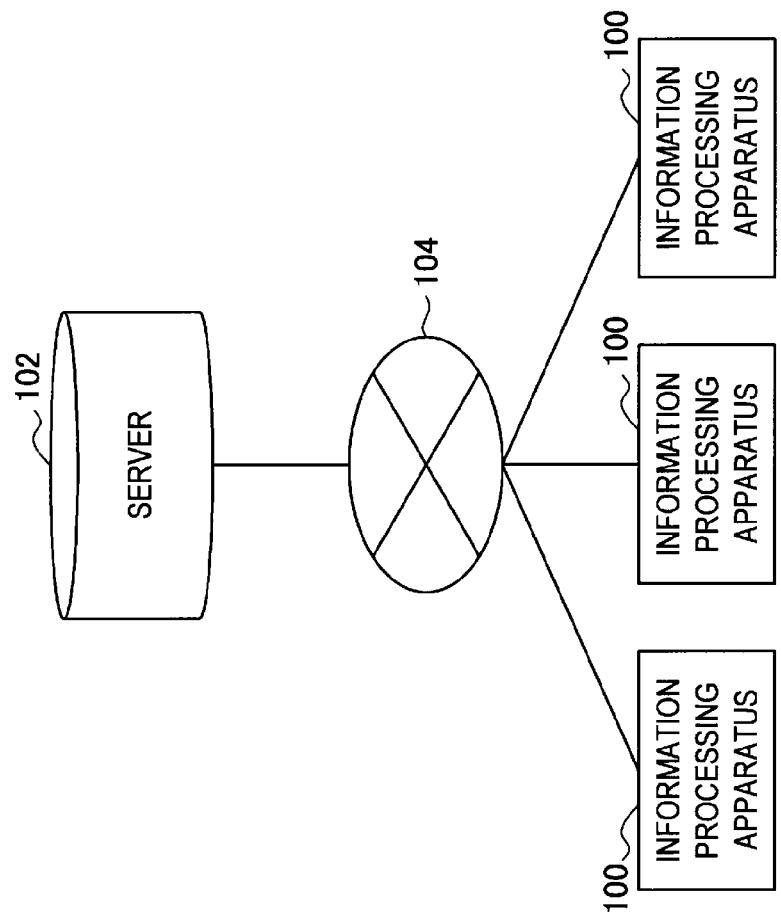
FIG. 1 is an explanatory view showing a network to which a technology according to an embodiment of the present invention can be applied.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

The flow of description herein is as follows: The configuration of a network containing an information processing apparatus according to an embodiment of the present invention is first described with reference to FIG. 1. Next, a configuration example of the information processing apparatus according to the embodiment is described with reference to FIG. 2. Next, the functional configuration of the information processing apparatus according to the embodiment is described with reference to FIG. 3.

Next, application examples of an information processing method of the present invention are described with reference to FIGS. 4 to 55. Lastly, technical ideas of the embodiment are summarized and operation effects obtained from the technical ideas are briefly described.

1. Configuration Example of Network
2. Configuration Example of Information Processing Apparatus 100
3. Functional Configuration of Information Processing Apparatus 100
4. Application Examples of Information Processing Method
5. Extraordinary Behavior Extraction Technology
6. Hardware Configuration Example of Information Processing Apparatus 100
7. Summary

1. CONFIGURATION EXAMPLE OF NETWORK

First, the configuration of a network containing an information processing apparatus according to an embodiment of the present invention will be described with reference to FIG. 1. FIG. 1 is an explanatory view showing a system configuration example of a display system 1 according to the embodiment.

As shown in FIG. 1, the display system 1 mainly includes information processing apparatuses 100, a server 102, and a communication network 104.

The information processing apparatus 100 performs processing based on predetermined data to display behavior representation data received from the server 102 as an object in a display screen. The information processing apparatus 100 also creates behavior representation data based on behavior of a user and transmits the behavior representation data to the server 102. In addition to the above processing, the information processing apparatus 100 can perform various kinds of processing. The information processing apparatus 100 will be described again in detail below. The above predetermined data includes, for example, user's personal data and position data. The predetermined data will also be described in detail below.

The server 102 provides behavior representation data transmitted from the information processing apparatus 100 to the other information processing apparatus 100. The behavior representation data is, for example, data in XML format. The server 102 also provides the above predetermined data transmitted from the information processing apparatus 100 to the other information processing apparatus 100. The predetermined data is also, for example, data in XML format.

The communication network 104 is a communication line network that connects the information processing apparatus 100 and the server 102 bi-directionally communicably or uni-directionally communicably. The communication network 104 is configured of, for example, a public network such as the Internet, an NGN (Next Generation Network) network, telephone network, satellite communication network, and broadcast communication line or a leased line network such as a WAN (Wide Area Network), LAN (Local Area Network), IP-VPN (Internet Protocol-Virtual Private Network), Ethernet (registered trademark), and wireless LAN and it does not matter whether communication network 104 is by wire or by radio.

The server 102 provides behavior representation data, personal data, and position data acquired from the information processing apparatus 100 via the communication network 104 to the other information processing apparatus 100. The information processing apparatus 100 creates a video signal in which a plurality of users is displayed as objects by processing behavior representation data, personal data, and position data acquired from the server 102 and behavior representation data, personal data, and position data generated by the local apparatus 100.

2. CONFIGURATION EXAMPLE OF INFORMATION PROCESSING APPARATUS 100

Figure 2:
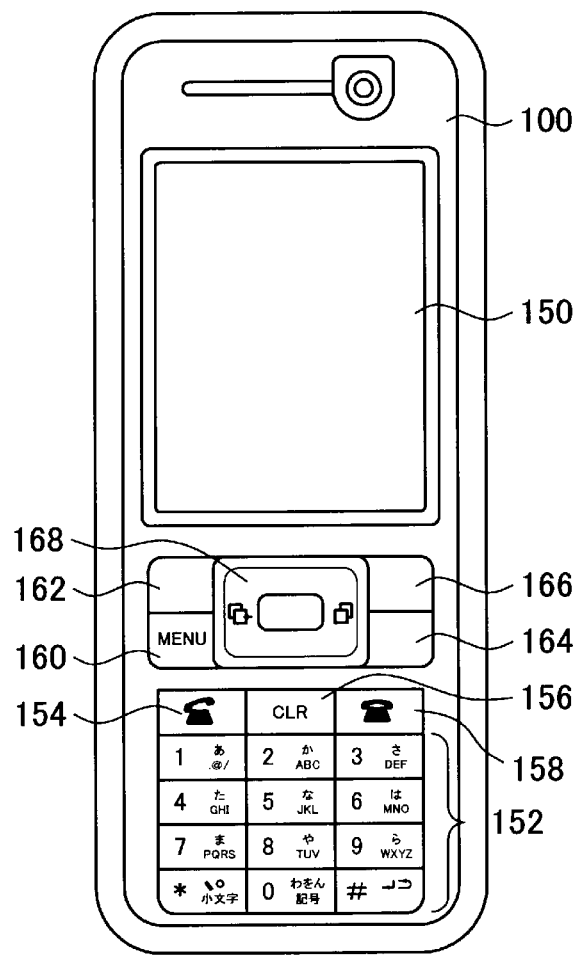
FIG. 2 is an explanatory view showing a configuration of an information processing apparatus according to the embodiment.

A configuration example of the information processing apparatus 100 will be described with reference to FIG. 2. FIG. 2 is an explanatory view showing a configuration example of the information processing apparatus 100. In FIG. 2, a desirable mobile phone to achieve effects of the present invention is described as an example of the information processing apparatus 100. However, only main keys used for an input operation according to the embodiment are rendered in FIG. 2.

As shown in FIG. 2, the information processing apparatus 100 includes a display screen 150, input keys 152, a call key 154, a clear key 156, a power key 158, a menu key 160, a mail key 162, a memory key 164, a communication key 166, and a cross key 168.

The information processing apparatus 100 is provided with the display screen 150. The display screen 150 is used to display transmitted/received electronic mails and various kinds of information. The display screen 150 may have a touch panel function.

The information processing apparatus 100 is also provided with the input keys 152. The input keys 152 are used to input characters or the like when an electronic mail is created. The input keys 152 are also used to input the number on the other end of the phone when a phone call is made.

The information processing apparatus 100 is also provided with the call key 154. The call key 154 is used to enable a phone call. The information processing apparatus 100 is also provided with the clear key 156. The clear key 156 is used to clear various kinds of information. Further, the information processing apparatus 100 is provided with the power key 158. The power key 158 is used to input power of the information processing apparatus 100.

The information processing apparatus 100 is also provided with the menu key 160. The menu key 160 is used to display various menus. For example, a function to have a plurality of users displayed in a two-dimensional display screen according to the present invention may be displayed as a menu. The information processing apparatus 100 is also provided with the mail key 162. The mail key 162 is used to output a display screen to create a mail. Further, the information processing apparatus 100 is provided with the memory key 164. The memory key 164 is used to display phone numbers or mail addresses of other users registered by the user.

The information processing apparatus 100 is also provided with the communication key 166. The communication key 166 is used to enable an Internet connection. Further, the information processing apparatus 100 is provided with the cross key 168. The cross key 168 is used to select various kinds of information output to the display screen by using a cursor.

A mobile phone, which is an example of the information processing apparatus 100, is not limited to one having the above form and functions.

3. FUNCTIONAL CONFIGURATION EXAMPLE OF INFORMATION PROCESSING APPARATUS 100

Figure 3:
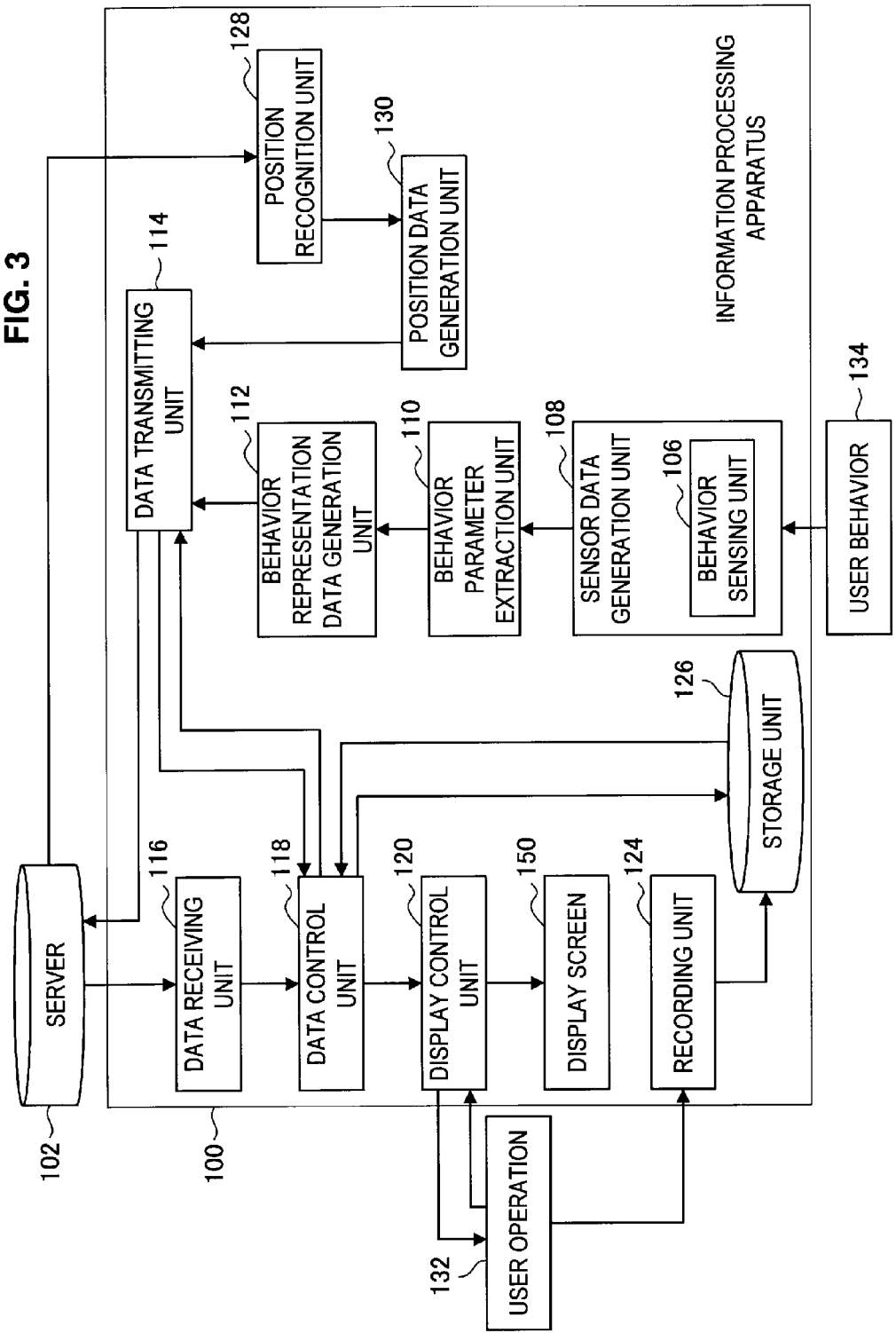
FIG. 3 is an explanatory view showing a functional configuration of the information processing apparatus according to the embodiment.

Next, the functional configuration of the information processing apparatus 100 according to the present embodiment will be described with reference to FIG. 3. FIG. 3 is an explanatory view showing a functional configuration example of the information processing apparatus 100 according to the present embodiment. The information processing apparatus 100 is characterized, with predetermined display information provided by the local apparatus, by a function to arrange objects contained in a video signal based on predetermined information.

As shown in FIG. 3, the information processing apparatus 100 mainly includes a behavior sensing unit 106, a sensor data generation unit 108, a behavior parameter extraction unit 110, a behavior representation data generation unit 112, and a data transmission unit 114. The information processing apparatus 100 also includes a data receiving unit 116, a data control unit 118, a display control unit 120, the display screen 150, a recording unit 124, a storage unit 126, a position recognition unit 128, and a position data generation unit 130.

The behavior sensing unit 106 senses user behavior 134 and transmits a signal representing that a user is acting to the sensor data generation unit 108. When information indicating that the user is acting is received, the sensor data generation unit 108 generates sensor data, which is information about user behavior. Information about user behavior here refers to information representing behavior of the user accompanying the information processing apparatus 100 such as the user walking, sitting, standing, running, phoning, jumping, and mailing.

Next, the sensor data generation unit 108 transmits the sensor data to the behavior parameter extraction unit 110. The behavior parameter extraction unit 110 extracts behavior parameters based on the received sensor data. The behavior parameters are characteristic data in behavior exhibited by the user of the sensor data and, for example, a set of peaks having values equal to or more than predetermined reference values of the sensor data.

Next, the behavior parameter extraction unit 110 transmits the extracted behavior parameters to the behavior representation data generation unit 112. The behavior representation data generation unit 112 generates behavior representation data, which is a result of recognizing behavior exhibited by the user based on the received behavior parameters. The behavior representation data is data that represents concrete behavior by being derived based on acceleration data, gyro data or the like. The behavior representation data includes data indicating that the user is walking, data indicating that the user is sitting, data indicating that the user is standing, data indicating that the user is running, data indicating that the user is phoning, data indicating that the user is jumping, and data indicating that the user is mailing. The behavior representation data is, for example, data in XML format.

Next, the behavior representation data generation unit 112 transmits the behavior representation data to the data transmission unit 114. The data transmission unit 114 transmits the behavior representation data to the server 102. The server 102 may transmit the received behavior representation data to the other information processing apparatus 100 according to the present embodiment than the above information processing apparatus 100. Thus, as described later, the information processing apparatus 100 can acquire behavior representation data of other users and arrange objects regarding the behavior representation data of a plurality of users based on predetermined information, which is displayed as a video signal.

The data receiving unit 116 can receive behavior representation data of other users from the server 102. The data receiving unit 116 transmits the received behavior representation data of the other users to the data control unit 118. The data control unit 118 receives behavior representation data of other users from the data receiving unit 116. The data control unit 118 also receives behavior representation data of the user owning the information processing apparatus 100 from the data transmission unit 114. Alternatively, after behavior representation data of the user owning the information processing apparatus 100 being received by the data receiving unit 116 from the server 102, the data control unit 118 may receive the behavior representation data of the user from the data receiving unit 116.

The data control unit 118 generates a video signal in which the received behavior representation data of the user owning the information processing apparatus 100 and behavior representation data of other users are arranged in a two-dimensional display screen as objects based on predetermined data. The information processing apparatus 100 may have a plurality of pieces of the different predetermined data. The predetermined data may be selected by a user operation. Alternatively, what is selected every hour may be set as the predetermined data.

Here, the predetermined data will be described in detail with reference to FIG. 4. Predetermined data is, for example, position data. Position data will be described below.

First, the position recognition unit 128 recognizes the position of the user owning the information processing apparatus 100. The method used by the position recognition unit 128 to recognize the position of the user may be the GPS (Global Positioning System) method or any other method. After recognizing the position of the user, the position recognition unit 128 transmits the information about the position to the position data generation unit 130.

Next, the position data generation unit 130 generates position data on the presence position of the user. The position data generation unit 130 transmits the position data to the data transmission unit 114. The data transmission unit 114 transmits the position data to the server 102. Thus, the information processing apparatus 100 can acquire position data of other users from the server 102 and arrange objects regarding the behavior representation data of a plurality of users based on position data, which can be displayed as a video signal.

The data receiving unit 116 can receive position data of other users from the server 102. The data receiving unit 116 transmits the received position data of the other users to the data control unit 118. The data control unit 118 receives position data of other users from the data receiving unit 116. The data control unit 118 also receives position data of the user owning the information processing apparatus 100 from the data transmission unit 114. Alternatively, after position data of the user owning the information processing apparatus 100 being received by the data receiving unit 116 from the server 102, the data control unit 118 may receive the position data of the user from the data receiving unit 116.

The data control unit 118 can arrange behavior representation data in a two-dimensional display screen as objects based on the received position data of the user owning the information processing apparatus 100 and position data of other users. The data control unit 118 can also generate a video signal in which the above behavior representation data is arranged in the two-dimensional display screen as objects. The objects can be moved by a user operation 132. An object can be moved by, for example, a touch panel operation being performed by the user in the display screen. The data control unit 118 has a display distance control unit (not shown) that controls the distance between displayed objects.

Next, the data control unit 118 transmits the video signal to the display control unit 120. The display control unit 120 displays the video signal in the display screen 150. Thus, by arranging behavior representation data of other users in a two-dimensional display screen as objects based on position data, at what distance a plurality of users is actually apart can be grasped at a glance.

Predetermined data may be communication history data representing the frequency of communication such as mails and phone calls exchanged between users via the information processing apparatus 100. Communication history data will be described below.

The storage unit 126 can record a history of communication such as mails and phone calls exchanged between users via the information processing apparatus 100. The data control unit 118 receives communication history data on the history from the storage unit 126. The data control unit 118 can also transmit the communication history data to the data transmission unit 114. The data transmission unit 114 can transmit the received communication history data to the server 102. Thus, the information processing apparatus 100 can acquire communication history data of other users and arrange objects regarding the behavior representation data of a plurality of users based on communication history data, which is displayed as a video signal.

On the other hand, the data receiving unit 116 can receive communication history data of other users from the server 102. The data receiving unit 116 transmits the received communication history data of the other users to the data control unit 118. The data control unit 118 receives communication history data of other users from the data receiving unit 116. The data control unit 118 arranges behavior representation data in a two-dimensional display screen as objects based on the communication history data of the other users and the communication history data received from the storage unit 126. The data control unit 118 also generates a video signal in which the behavior representation data is arranged in the two-dimensional display screen as objects. The objects can be moved by the user operation 132. An object can be moved by, for example, a touch panel operation being performed by the user in the display screen.

Next, the data control unit 118 transmits the video signal to the display control unit 120. The display control unit 120 causes the display screen 150 to display the video signal. Thus, by arranging behavior representation data of other users in a two-dimensional display screen as objects based on communication history data, how frequently a plurality of users actually communicates can be grasped at a glance. Therefore, how close the plurality of users is can be grasped at a glance and so users with increasing closeness can be moved to the center of the display screen. Moreover, as described above, the objects can be moved by the user operation 132 and thus, for example, users who are represented as being close in the display screen, though actually not close, may be moved to positions represented as not being close. On the other hand, users who are represented as not being close in the display screen, though actually close, may be moved to positions represented as being close.

The above communication history data may be, for example, the number of times of mails or phone calls. More specifically, users can be considered closer with an increasing number of times of mails or phone calls. The above communication history data may be, for example, the number of characters of mail. More specifically, users can be considered closer with an increasing total number of characters by determining the total of the number of characters of each mail with a specific user. The above communication history data may be, for example, the duration of phone calls. More specifically, users can be considered closer with an increasing total duration of phone calls by determining the total of duration of each phone call with a specific user.

Predetermined data may be personal data for each user stored in the information processing apparatus 100. Personal data is, for example, information about hobbies or preferences of the user and contains data input into the information processing apparatus 100 by the user. Personal data will be described below.

Personal data for each user can be recorded in the storage unit 126. The data control unit 118 receives the personal data from the storage unit 126. The data control unit 118 can also transmit the personal data to the data transmission unit 114. The data transmission unit 114 can transmit the received personal data to the server 102. Thus, the information processing apparatus 100 can acquire personal data of other users and arrange objects regarding the behavior representation data of a plurality of users based on personal data, which can be displayed as a video signal.

On the other hand, the data receiving unit 116 can receive personal data of other users from the server 102. The data receiving unit 116 transmits the received personal data of the other users to the data control unit 118. The data control unit 118 receives personal data of other users from the data receiving unit 116. The data control unit 118 arranges behavior representation data in a two-dimensional display screen as objects based on the personal data of the other users and the personal data received from the storage unit 126. The data control unit 118 also generates a video signal in which the behavior representation data is arranged in the two-dimensional display screen as objects. The objects can be moved by the user operation 132. An object can be moved by, for example, a touch panel operation being performed by the user in the display screen.

Next, the data control unit 118 transmits the video signal to the display control unit 120. The display control unit 120 causes the display screen 150 to display the video signal. Thus, by arranging behavior representation data of other users in a two-dimensional display screen as objects based on personal data, what hobbies a plurality of users actually shares can be grasped at a glance. Therefore, for example, commonness of hobbies of the plurality of users can be grasped at a glance and users having common hobbies can be moved to the center of the display screen. As described above, the objects can be moved by the user operation 132. The above personal data may be, for example, words frequently used in mails.

4. APPLICATION EXAMPLES OF INFORMATION PROCESSING METHOD

Next, a method of displaying objects of a plurality of users in a two-dimensional display screen will be described with reference to FIGS. 4 to 34.

(Controlling the Distance Between Objects Based on Closeness Between Users)

Figure 4:
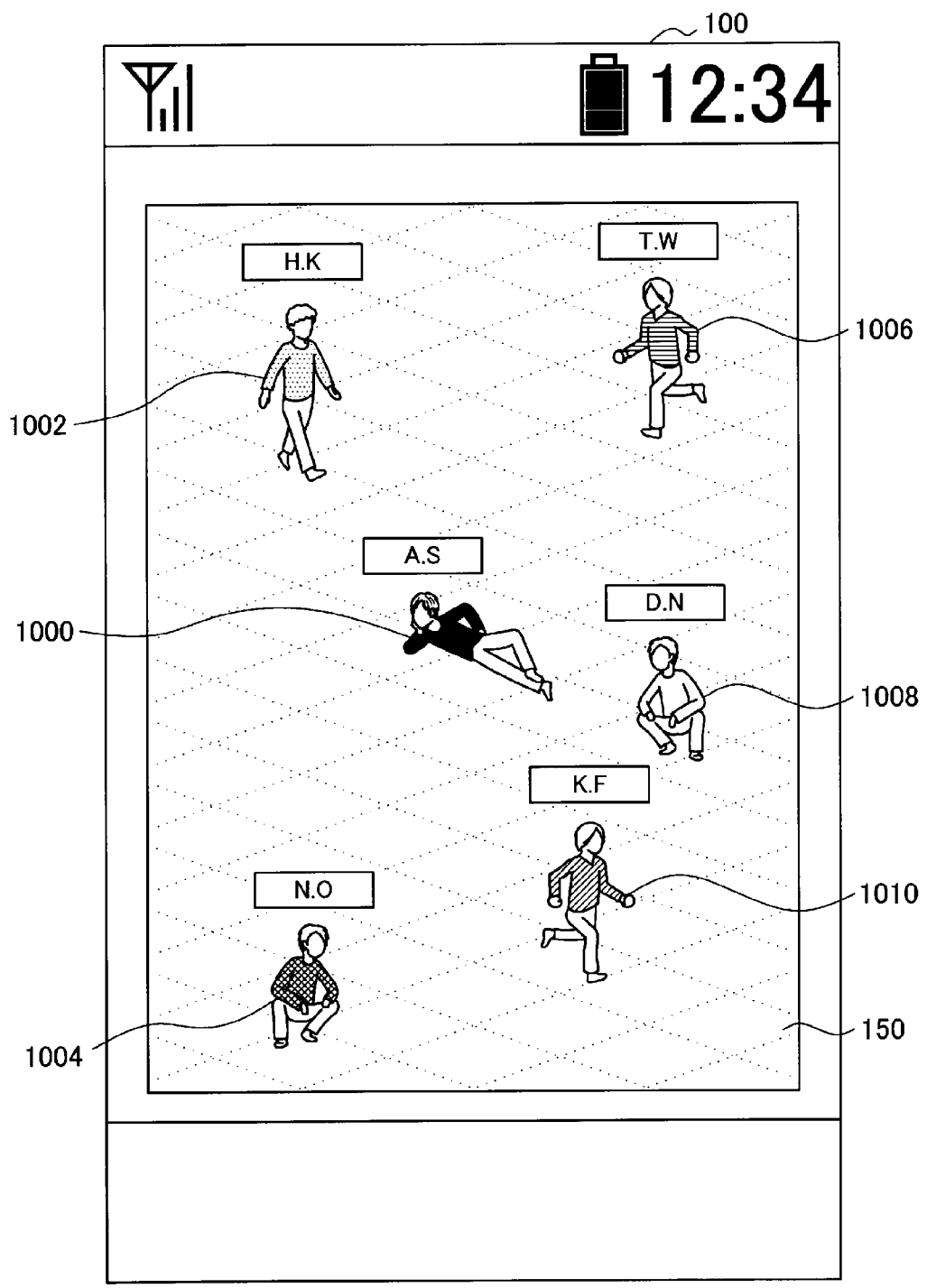
FIG. 4 is an explanatory view showing a display screen of the information processing apparatus according to the embodiment.

FIG. 4 shows a display screen in a two-dimensional display of objects concerning a plurality of users. The information processing apparatus 100 has the display screen 150. The data control unit 118 can display an object 1000, an object 1002, an object 1004, an object 1006, an object 1008, and an object 1010 in the display screen 150. The object 1000 positioned in the center of the display screen shows an object of the user (hereinafter, referred to as the administrative user) owning the information processing apparatus 100. The object 1002, the object 1004, the object 1006, the object 1008, and the object 1010 may be objects concerning users registered with the information processing apparatus 100 by the administrative user. Particularly, the object 1002, the object 1004, the object 1006, the object 1008, and the object 1010 may be, among users registered by the administrative user, objects concerning only users who have agreed with the administrative user regarding the display as shown in FIG. 4. Initials are displayed for the object 1000, the object 1002, the object 1004, the object 1006, the object 1008, and the object 1010. Thus, the user can grasp to which user an arranged object belongs at a glance. Such a display is not limited to initials shown in FIG. 4. For example, full names may be displayed or nicknames may be displayed.

The objects 1000, 1002, 1004, 1006, 1008, and 1010 of each user shown in FIG. 4 are objects showing current behavior of each user. Such an object will be described in detail by taking the object 1000 as an example. The administrative user concerning the object 1000 currently exhibits behavior of lying down. The behavior sensing unit 106 senses behavior of lying down of the administrative user and transmits a signal representing that the user is acting to the sensor data generation unit 108. When information indicating that the user is acting is received, the sensor data generation unit 108 generates sensor data, which is information about user behavior. The sensor data generation unit 108 transmits the sensor data to the behavior parameter extraction unit 110.

The behavior parameter extraction unit 110 extracts behavior parameters concerning behavior currently being exhibited (that is, behavior of the administrative user to lie down). More specifically, the behavior parameter extraction unit 110 extracts behavior parameters of data having values equal to or more than predetermined reference values from acceleration sensor data and gyro sensor data. Next, the behavior representation data generation unit 112 receives the behavior parameters. The behavior representation data generation unit 112 generates behavior representation data based on the received behavior parameters. More specifically, the behavior representation data generation unit 112 generates behavior representation data indicating lying down based on behavior parameters indicating lying down. The data transmission unit 114 receives the behavior representation data. The data transmission unit 114 can transmit the behavior representation data to the server. As a result, the information processing apparatus 100 can cause the display screen 150 to display behavior currently exhibited by other users as objects based on the behavior representation data. As shown in FIG. 4, the user concerning the object 1002 is walking. The user concerning the object 1004 is squatting. The user concerning the object 1006 is running. The user concerning the object 1008 is squatting. The user concerning the object 1010 is running. Behavior exhibited by objects is not limited to the above behavior. For example, states of a user concerning an object standing and stopping, jumping, ascending or descending in an elevator, sitting, riding on a train, photographing, calling, or mailing can also be shown.

On the other hand, the data control unit 118 can receive behavior representation data from the data transmission unit 114. The data control unit 118 can also receive behavior representation data of other users received by the data receiving unit 116 from the server. The data control unit 118 generates a video signal that displays behavior representation data of the administrative user as the object 1000 in the two-dimensional display screen 150. As a result, the display control unit 120 can cause the display screen 150 to display the lying object 1000 as an object of the administrative user. For the objects 1002, 1004, 1006, 1008, and 1010 of other users, the data receiving unit 116 receives behavior representation data of other users from the server and the data control unit 118 generates video signals based on the behavior representation data similar to the object 1000 of the administrative user.

Figure 5:
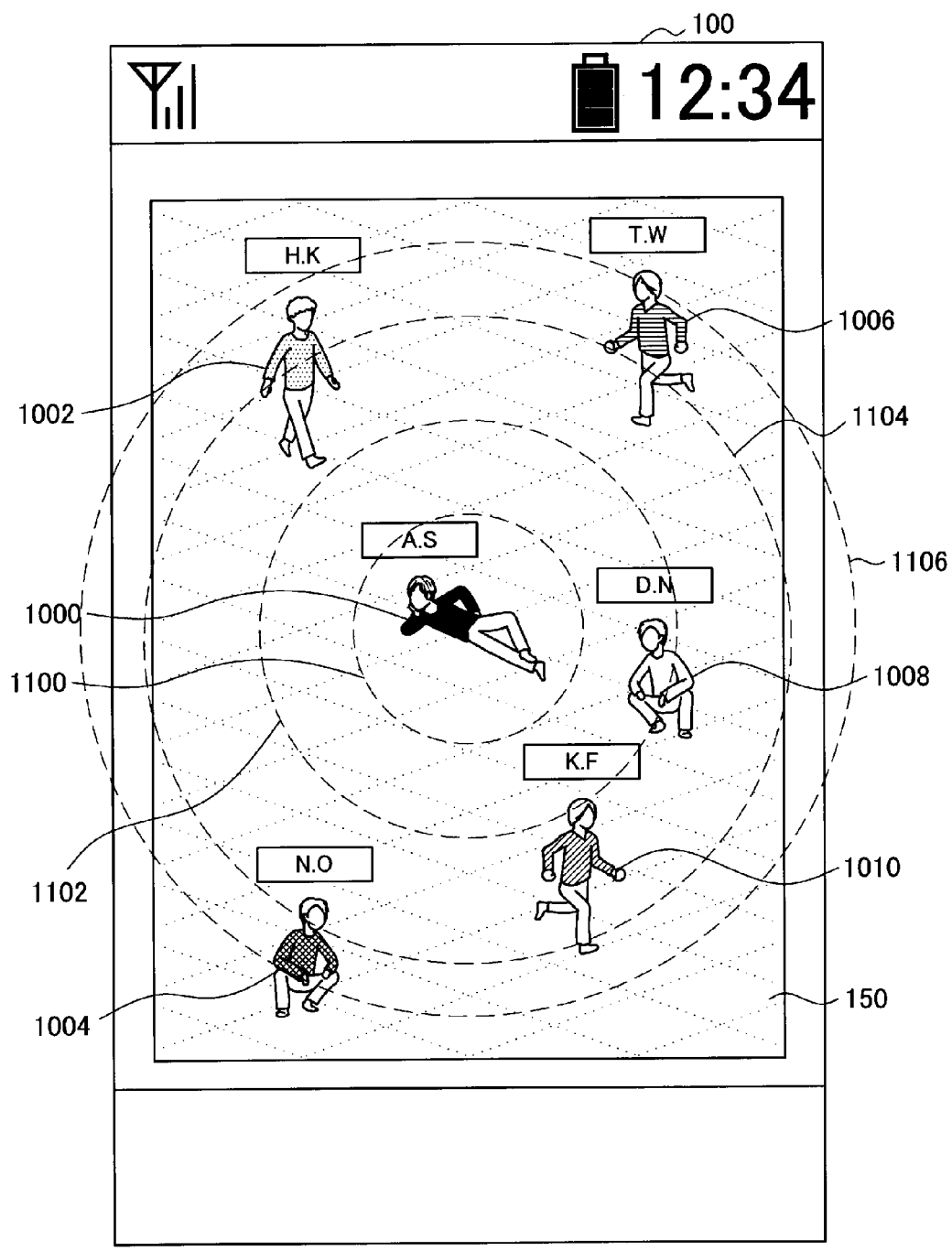
FIG. 5 is an explanatory view showing a display screen of the information processing apparatus according to the embodiment.

Next, how the objects 1000, 1002, 1004, 1006, 1008, and 1010 of each user are arranged in a two-dimensional display screen will be described with reference to FIG. 5. The data control unit 118 arranges the object 1000 of the administrative user in the center of the display screen 150. For the objects 1002, 1004, 1006, 1008, and 1010 of each user other than the administrative user, a decreasing distance to the object 1000 of the administrative user indicates being closer. More specifically, circles 1100, 1102, 1104, and 1106 around the object 1000 of the administrative user will virtually be used for description. For example, the object 1008 is positioned on the circle 1102. That is, the object 1008 has a distance to the object 1000 shorter than that of any of the objects 1002, 1004, 1106, and 1010. Thus, among the users of the objects 1002, 1004, 1106, 1108, and 1010, the object 1008 is close to the administrative user represented by the object 1000.

The object 1002 is positioned between the circle 1102 and the circle 1104. That is, the user represented by the object 1002 is close to the administrative user represented by the object 1000 next to the object 1008. The objects 1006 and 1010 are both positioned on the circle 1104. Thus, the user represented by the object 1006 is close to the administrative user represented by the object 1000 as much as the user represented by the object 1010. The object 1004 is positioned on the circle 1106. That is, among the users of the objects 1002, 1004, 1106, 1108, and 1010, the user represented by the object 1004 is the least close to the administrative user represented by the object 1000.

Here, various methods can be used by the data control unit 118 regarding on which data the arrangement of the objects 1000, 1002, 1004, 1106, 1108, and 1010 in a two-dimensional screen is based. The objects 1000, 1002, 1004, 1106, 1108, and 1010 shown in FIGS. 4 and 5 are arranged in accordance with closeness between users concerning objects. Closeness here refers to that determined based on communication history data representing the frequency of communication such as mails and phone calls conducted between users. More specifically, the data control unit 118 receives communication history data on communication such as mails and phone calls conducted between the administrative user and another user from the storage unit 126.

Communication history data may be, for example, the number of times of mails or phone calls. More specifically, users can be considered closer with an increasing number of times of mails or phone calls. The above communication history data may be, for example, the number of characters of mail. More specifically, users can considered closer with an increasing total number of characters by determining the total of the number of characters of each mail with a specific user. The above communication history data may be, for example, the duration of phone calls. More specifically, users can considered closer with an increasing total duration of phone calls by determining the total of duration of each phone call with a specific user. Thus, by arranging behavior representation data of other users in a two-dimensional display screen as objects based on communication history data, how frequently a plurality of users actually communicates can be grasped at a glance. Therefore, how close the plurality of users is can be grasped at a glance and so users with increasing closeness can be moved to the center of the display screen.

Figure 6:
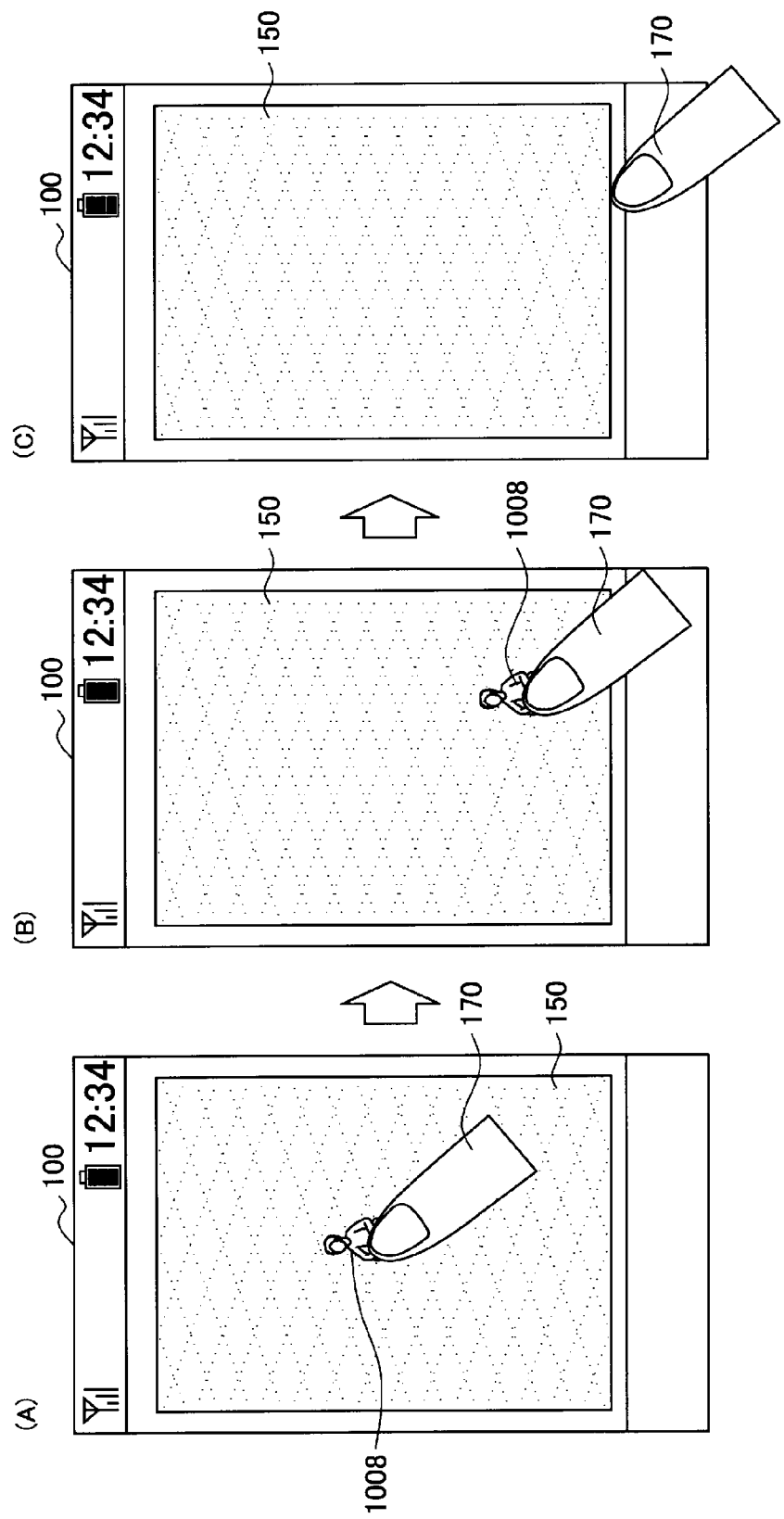
FIG. 6 is an explanatory view showing a display screen of the information processing apparatus according to the embodiment.

Next, the function that allows the user to move the objects 1000, 1002, 1004, 1106, 1108, and 1010 of each user in the display screen 150 by a touch panel operation will be described with reference to FIGS. 6 and 7. FIG. 6 is a diagram illustrating how the user moves the object 1008 of some user from the center of the display screen 150 to the outside by a touch panel operation.

In FIG. 6, only the object 1008 concerning a user is displayed in the display screen 150 to simplify the description. In FIG. 6A, the object 1008 of a user is arranged in the display screen 150 based on communication history data as described above. A finger 170 of the user can move the object 1008 in any direction. FIG. 6B shows the finger 170 of the user moving the object 1008 to the outside of the display screen 150. Further, as shown in FIG. 6C, the finger 170 of the user may move the object 1008 to a position where the object 1008 is not displayed in the display screen 150. In this manner, an object of a user displayed in the display screen 150 can be moved based on user's judgment. Thus, for example, objects that are represented as being close in the display screen 150, though actually not close, can be moved to positions represented as not being close.

Figure 7:
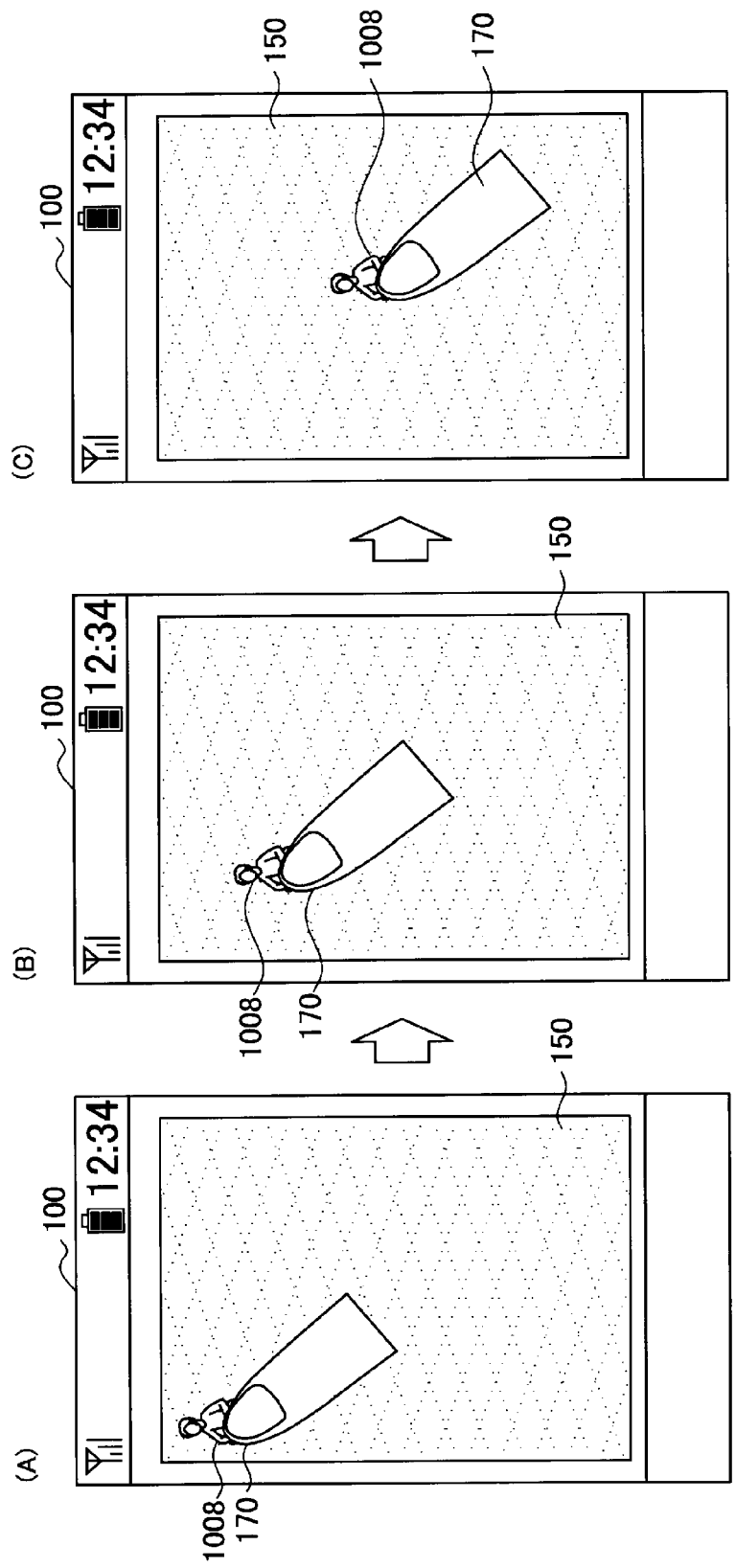
FIG. 7 is an explanatory view showing a display screen of the information processing apparatus according to the embodiment.

FIG. 7 is a diagram illustrating how the user moves the object 1008 of some user from the outside of the display screen 150 to the center by a touch panel operation. In FIG. 7A, the object 1008 of a user is arranged in the display screen 150 based on communication history data as described above. The finger 170 of the user can move the object 1008 in any direction. FIG. 7B shows the finger 170 of the user moving the object 1008 to the inside of the display screen 150. Further, as shown in FIG. 7C, the finger 170 of the user may move the object 1008 further to the inside of the display screen 150. In this manner, an object of a user displayed in the display screen 150 can be moved based on user's judgment. Thus, for example, users that are represented as not being close in the display screen 150, though actually close, can be moved to positions represented as being close, that is, to the center.

(Deciding Whether to Allow Communication Between Users Based on Closeness)

Figure 8:
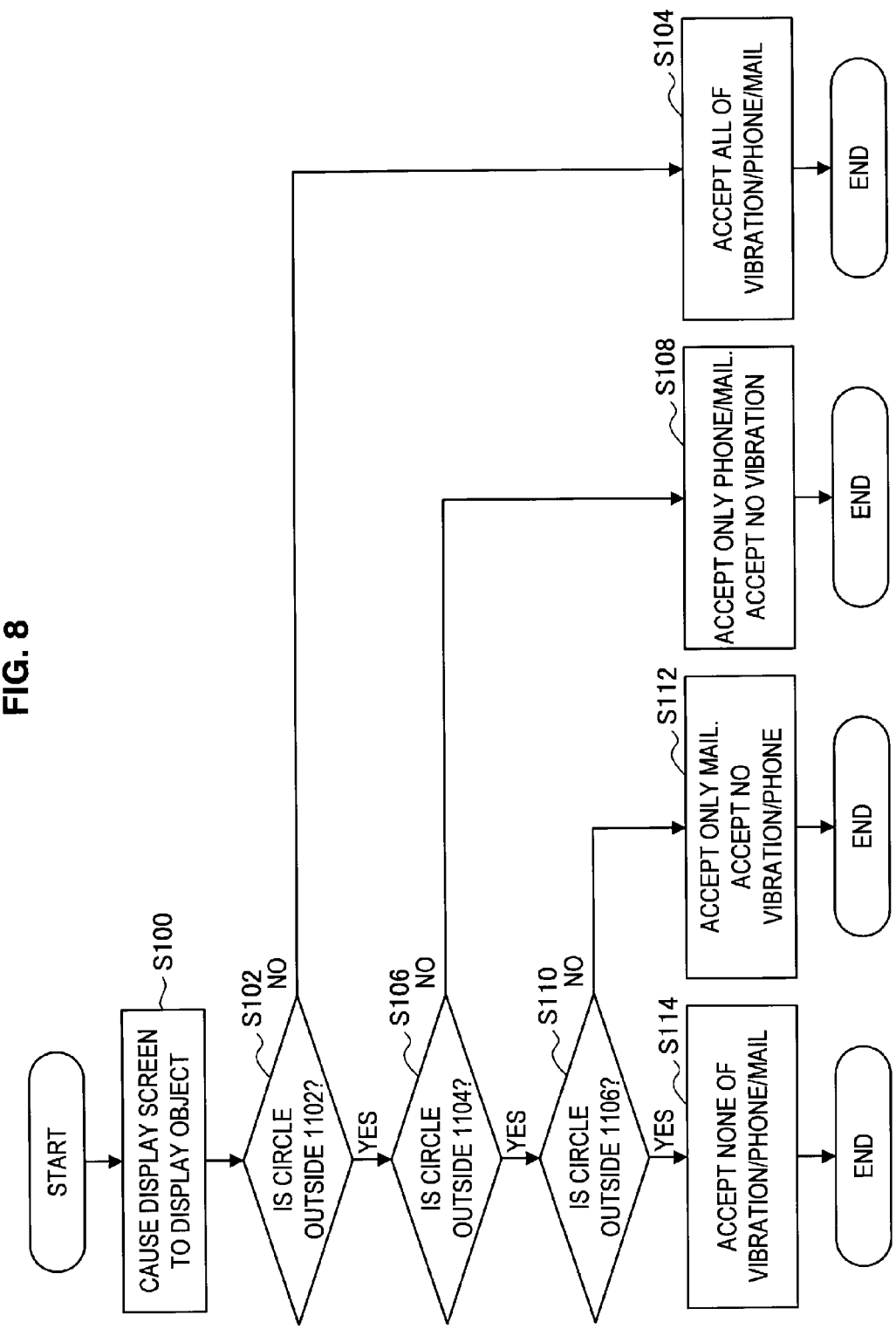
FIG. 8 is an explanatory view showing a flow concerning a movement method of an object in the display screen of the information processing apparatus according to the embodiment.

Further, the data control unit 118 can disable the use of various communications means between users in accordance with the above closeness to the administrative user. FIG. 8 is a flow chart illustrating such functions. First, the data control unit 118 displays the object 1002 (may be 1004, 1006, 1008, or 1010 and this also applies below) concerning a user in the display screen 150, as shown at S100, by the technique described above. Next, as shown at S102, the data control unit 118 determines whether the object 1002 is positioned outside or inside the circle 1102. If the object 1002 is positioned inside, this means that the user concerning the object 1002 and the administrative user are very close and, as shown at S104, all of vibration, phone calls, and mails from the user are accepted. The vibration, which will be described in detail later, refers to vibration transmitted to a finger when the finger is brought into contact with the object 1002 by a touch panel operation. Behavior of the user concerning the object 1002 can be grasped by the period of the vibration or the like. Acceptance of vibration indicates that the administrative user allows the user concerning the object 1002 to grasp behavior of the administrative user through vibration. Acceptance of phone calls indicates that the administrative user makes phone calls from the user concerning the object 1002 callterminable. Acceptance of mails indicates that the administrative user makes electronic mails transmitted from the user concerning the object receivable.

If the object 1002 is positioned outside the circle 1102, as shown at S106, the data control unit 118 next determines whether the object 1002 is positioned outside or inside the circle 1104. If the object 1002 is positioned inside the circle 1104, as shown at S108, while phone calls and mails from the user are accepted, vibration is not accepted. If, on the other hand, the object 1002 is positioned outside the circle 1104, as shown at S110, the data control unit 118 next determines whether the object 1002 is positioned outside or inside the circle 1106. If the object 1002 is positioned inside the circle 1106, as shown at S112, while phone calls and mails from the user are accepted, vibration is not accepted. If the object 1002 is positioned outside the circle 1106, the data control unit 118 accepts none of vibration, phone calls, and mails of the user concerning the object 1002. Settings of whether to allow communication are not limited to those described above.

(Updating the Distance to the User after a Certain Period)

Next, the update arrangement positions of the objects 1002, 1004, 1006, 1008, and 1010 in the display screen 150 will be described with reference to FIG. 9. The interval of update period may be, for example, every day, every week, or every month. Alternatively, the user may set the interval of update period in accordance with user's preferences. For example, arrangement positions of the objects 1002, 1004, 1006, 1008, and 1010 can be updated by communication history data being updated by the data control unit 118 at intervals of a certain period.

Figure 9:
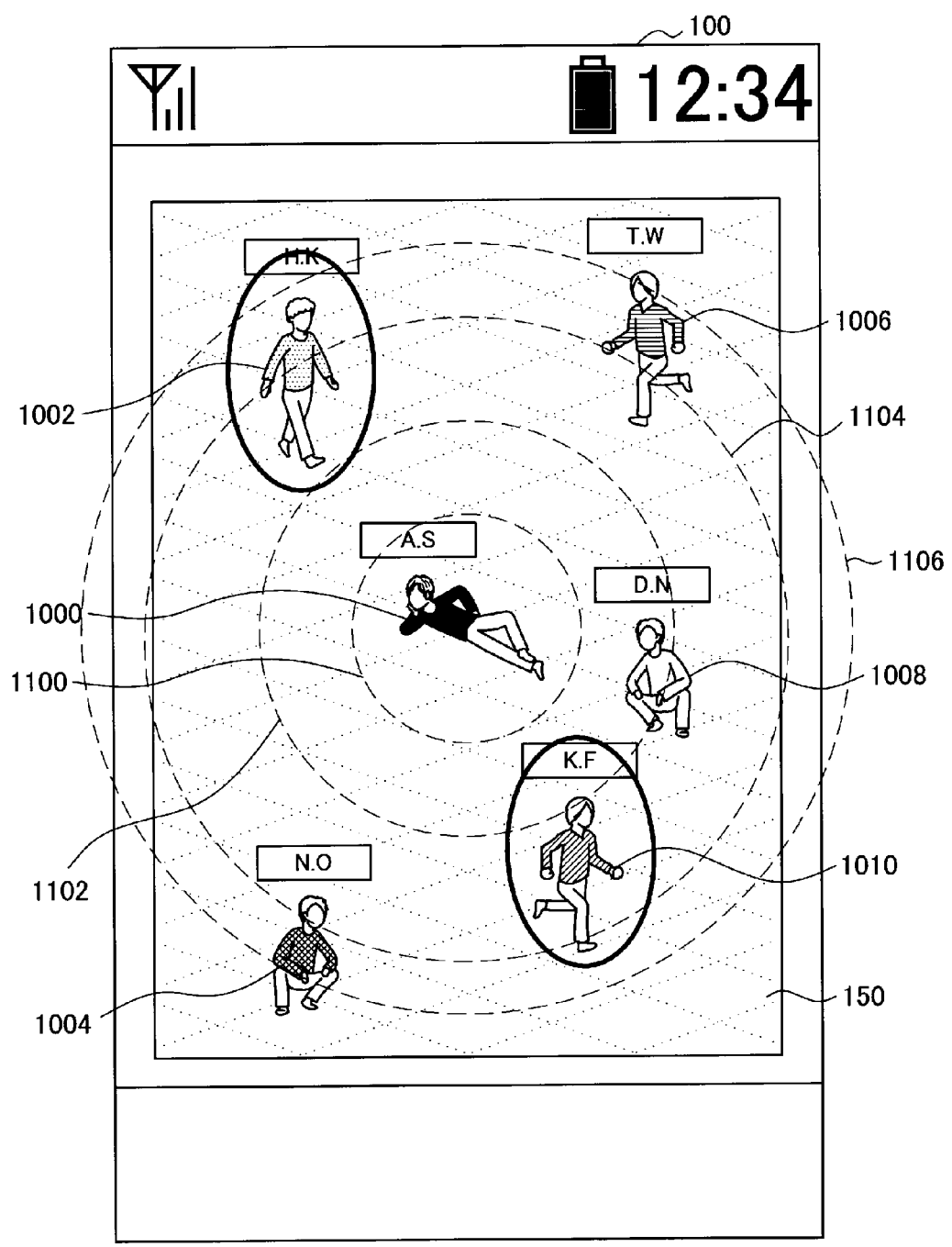
FIG. 9 is an explanatory view showing the display screen of the information processing apparatus according to the embodiment.

FIG. 9 is an explanatory view showing how the display screen 150 is updated. For example, the object 1002 moves toward the center of the display screen 150. That is, this indicates that closeness between the object 1002 and the administrative user has improved after the update when compared with before the update. Closeness after the update is a result of evaluation for a specific period. Closeness before the update is a result of evaluation for a specific period prior to the above specific period. On the other hand, the object 1010 moves toward the outside of the display screen 150. That is, this indicates that closeness between the object 1010 and the administrative user has decreased after the update when compared with before the update. A change in closeness will be described with reference to the flow chart in FIG. 10.

Figure 10:
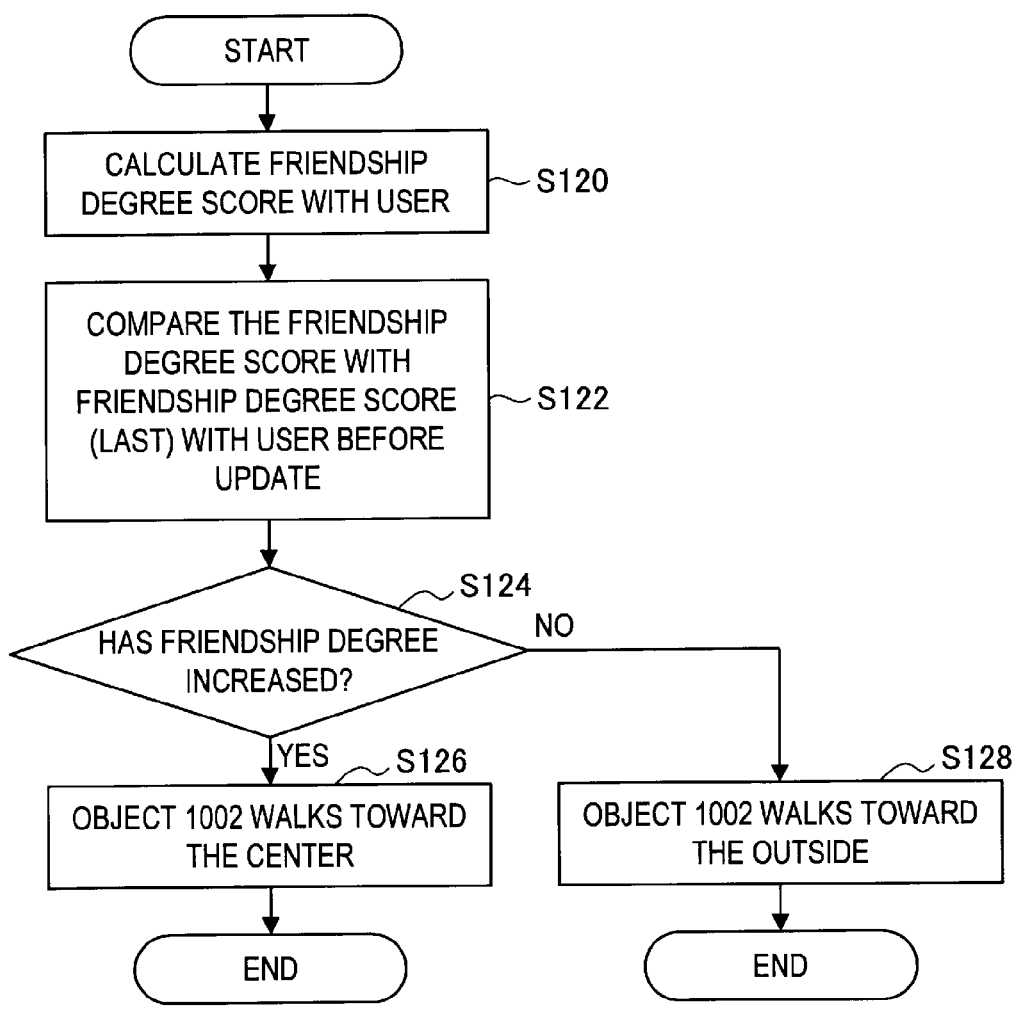
FIG. 10 is an explanatory view showing a flow concerning a movement method of an object in the display screen of the information processing apparatus according to the embodiment.

FIG. 10 is a flow chart illustrating a change in closeness. First, as shown at S120, the data control unit 118 calculates closeness between the user concerning the object 1002 (may be 1004, 1006, 1008, or 1010 and this also applies below) and the administrative user as a score. The score of closeness is determined by, for example, Formula 1 below:

$$\text{Score } A = W1 \times C_{mail} + W2 \times C_{talk} + W3 \times C_{meet} \quad \text{(Formula 1)}$$

$C_{mail}$ in the above Formula 1 is the number of mails in a specific period. $C_{talk}$ is the number of phone calls in the specific period. $C_{meet}$ is the number of actual meetings in the specific period. W1, W2, and W3 are weighting factors to weight $C_{mail}$, $C_{talk}$, and $C_{meet}$.

Next, as shown at 8122, the data control unit 118 compares closeness (called $A_{last}$) before the update determined by Formula 1 and closeness (called $A_{curr}$) after the update determined by Formula 1. Next, as shown at S124, if the closeness has improved, as shown at S126, the object 1002 walks toward the center. Improvement of closeness indicates $A_{curr} - A_{last} > 0$. If, as shown at S124, closeness decreases, as shown at S128, the object 1002 walks toward the outside to move away from the center. Decrease closeness indicates $A_{curr} - A_{last} < 0$. If closeness does not change (not shown), the object does not move. No change of closeness indicates $A_{curr} - A_{last} = 0$.

(Controlling the Distance Between Objects Based on Closeness Between Other Users)

Figure 11:
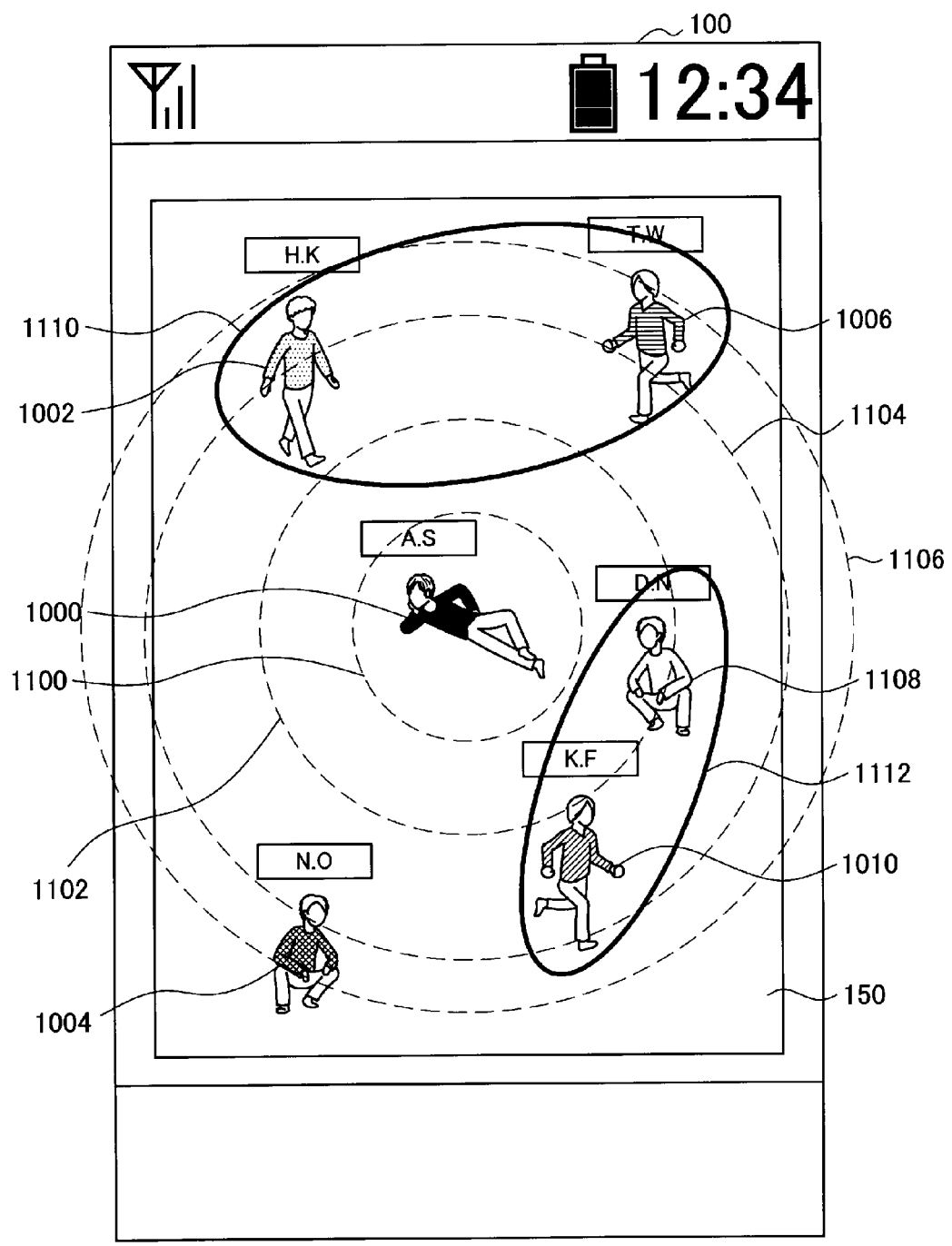
FIG. 11 is an explanatory view showing the display screen of the information processing apparatus according to the embodiment.

FIG. 11 is a diagram illustrating closeness between other users than the administrative user. The data control unit 118 can control, in addition to the distance between the administrative user and another user, closeness between other users. First, as described above, closeness between the administrative user and another user is grasped based on the distance from the object 1000 concerning the administrative user. First, closeness between other users will be described by taking two objects 1110 including the object 1002 and the object 1006 as an example. Closeness between users concerning the object 1002 and the object 1006 is evaluated based on the magnitude of the angle around the object 1000. A more specific description will be provided with reference to FIG. 12.

Figure 12:
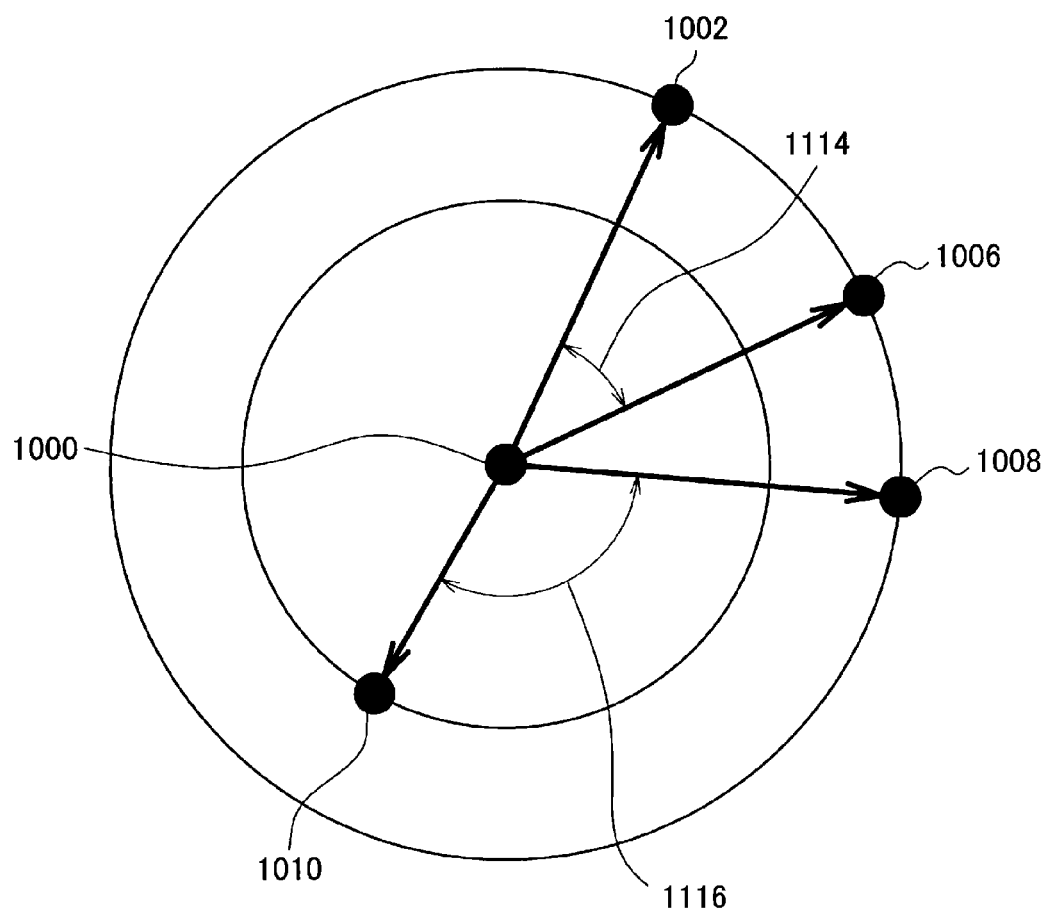
FIG. 12 is an explanatory view showing relationships among users concerning objects in the display screen of the information processing apparatus according to the embodiment.

FIG. 12 is a diagram briefly illustrating arrangement positions of the objects 1000, 1002, 1004, 1006, 1008, and 1010 in the display screen 150. In FIG. 12, among the objects 1000, 1002, 1004, 1006, 1008, and 1010, only the objects 1000, 1002, 1008, and 1010 are denoted with a black circle. Closeness between users concerning the object 1002 and the object 1006 is evaluated based on the magnitude of an angle 1114 around the object 1000. That is, closeness between users concerning the object 1008 and the object 1010 is evaluated based on the magnitude of an angle 1116. If the magnitude of the angle 1114 is smaller than that of the angle 1116, the users concerning the object 1002 and the object 1006 closer than the users concerning the object 1008 and the object 1010. Closeness between other users described with reference to FIGS. 11 and 12 can also be determined by the data control unit 118 using Formula 1 as described above. Thus, the user can grasp closeness of each of the administrative user and other users based on the distance among the objects 1000, 1002, 1004, 1008, and 1010 at a glance.

(Adjusting the Distance Based on Position Data)

Figure 13:
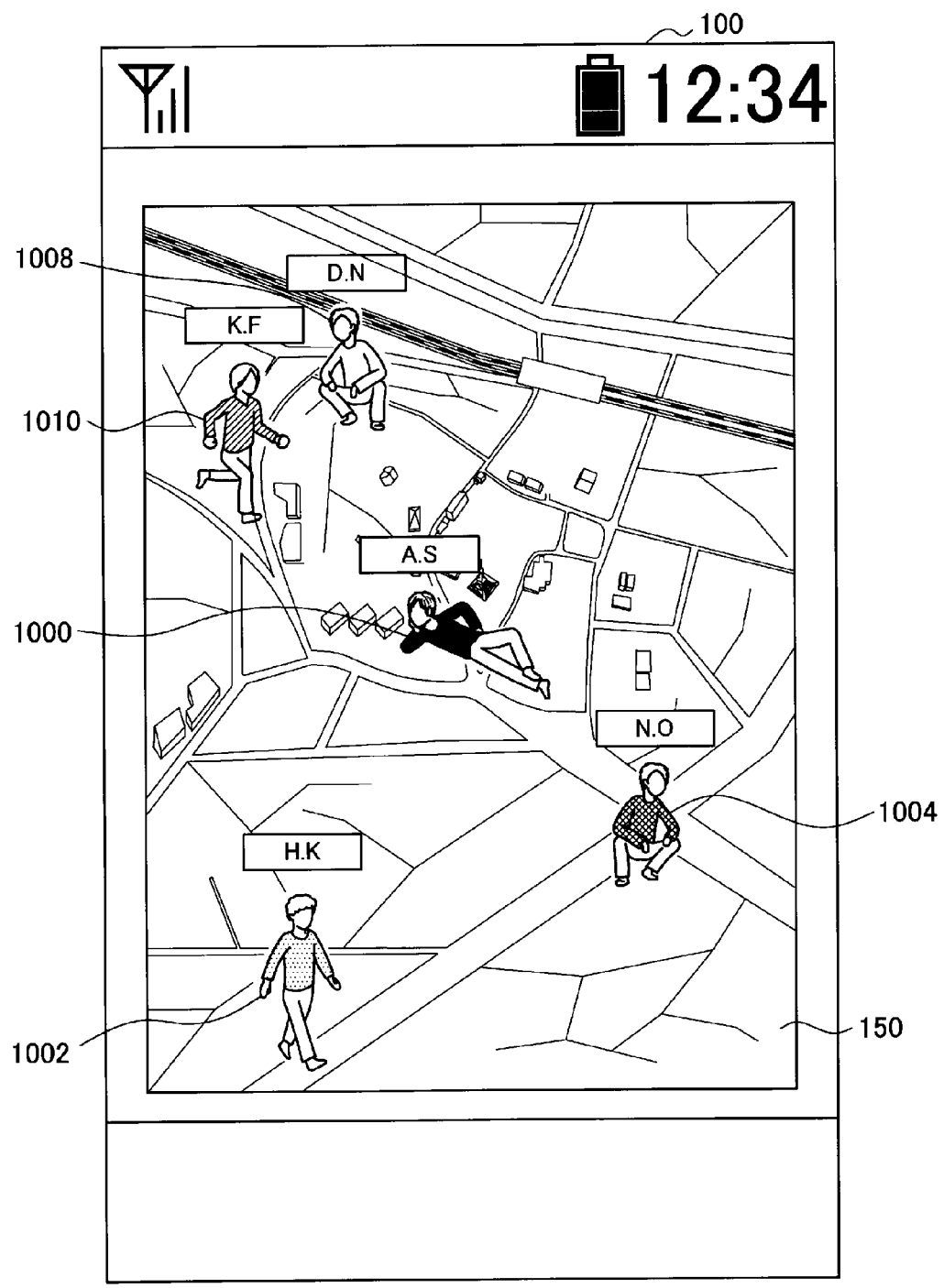
FIG. 13 is an explanatory view showing a display screen of the information processing apparatus according to the embodiment.

Next, a method by which the information processing apparatus 100 according to the present embodiment displays the objects 1000, 1002, 1004, 1008, and 1010 in the two-dimensional display screen 150 based on position data with reference to FIG. 13. FIG. 13 is a diagram illustrating the display screen 150 in which the objects 1000, 1002, 1004, 1008, and 1010 are displayed based on position data.

First, position data will be described. The position recognition unit 128 first recognizes the position of the administrative user. The method used by the position recognition unit 128 to recognize the position of the user may be the GPS (Global Positioning System) method or any other method. After recognizing the position of the user, the position recognition unit 128 transmits the information about the position to the position data generation unit 130.

Next, the position data generation unit 130 generates position data on the presence position of the user. The position data generation unit 130 transmits the position data to the data transmission unit 114. The data transmission unit 114 transmits the position data to the server 102. Thus, the information processing apparatus 100 can acquire position data of other users from the server 102 and display a video signal by arranging the objects 1000, 1002, 1004, 1006, 1008, and 1010 of a plurality of users based on the position data.

Next, the data receiving unit 116 receives position data of other users from the server 102. The data receiving unit 116 transmits the received position data of the other users to the data control unit 118. The data control unit 118 receives position data of other users from the data receiving unit 116. The data control unit 118 also receives position data of the administrative user from the data transmission unit 114. Alternatively, after position data of the administrative user being received by the data receiving unit 116 from the server 102, the data control unit 118 may receive the position data of the administrative user from the data receiving unit 116.

The data control unit 118 can arrange the objects 1000, 1002, 1004, 1006, 1008, and 1010 concerning users in the two-dimensional display screen 150 based on the received position data of the user owning the information processing apparatus 100 and position data of other users. The objects 1000, 1002, 1004, 1006, 1008, and 1010 are preferably objects based on the above behavior representation data. The data control unit 118 generates a video signal in which the objects 1000, 1002, 1004, 1006, 1008, and 1010 are arranged in the two-dimensional display screen 150.

Next, the data control unit 118 transmits the video signal to the display control unit 120. The display control unit 120 displays the video signal in the display screen 150. FIG. 13 is an example of the video signal displayed in the display screen 150.

In FIG. 13, as described above, the display screen 150 displays the objects 1002, 1004, 1008, and 1010 corresponding to each user arranged on a map around the object 1000 concerning the administrative user. The objects 1002, 1004, 1008, and 1010 display at which position each user actually exist. Thus, by arranging behavior representation data of other users in a two-dimensional display screen as objects based on position data, at what distance a plurality of users is actually apart can be grasped at a glance. As described with reference to FIG. 9, the data control unit 118 can update the objects 1000, 1002, 1004, 1006, 1008, and 1010 displayed based on position data at intervals of a specific period.

(Adjusting the Distance Based on Personal Data)

Figure 14:
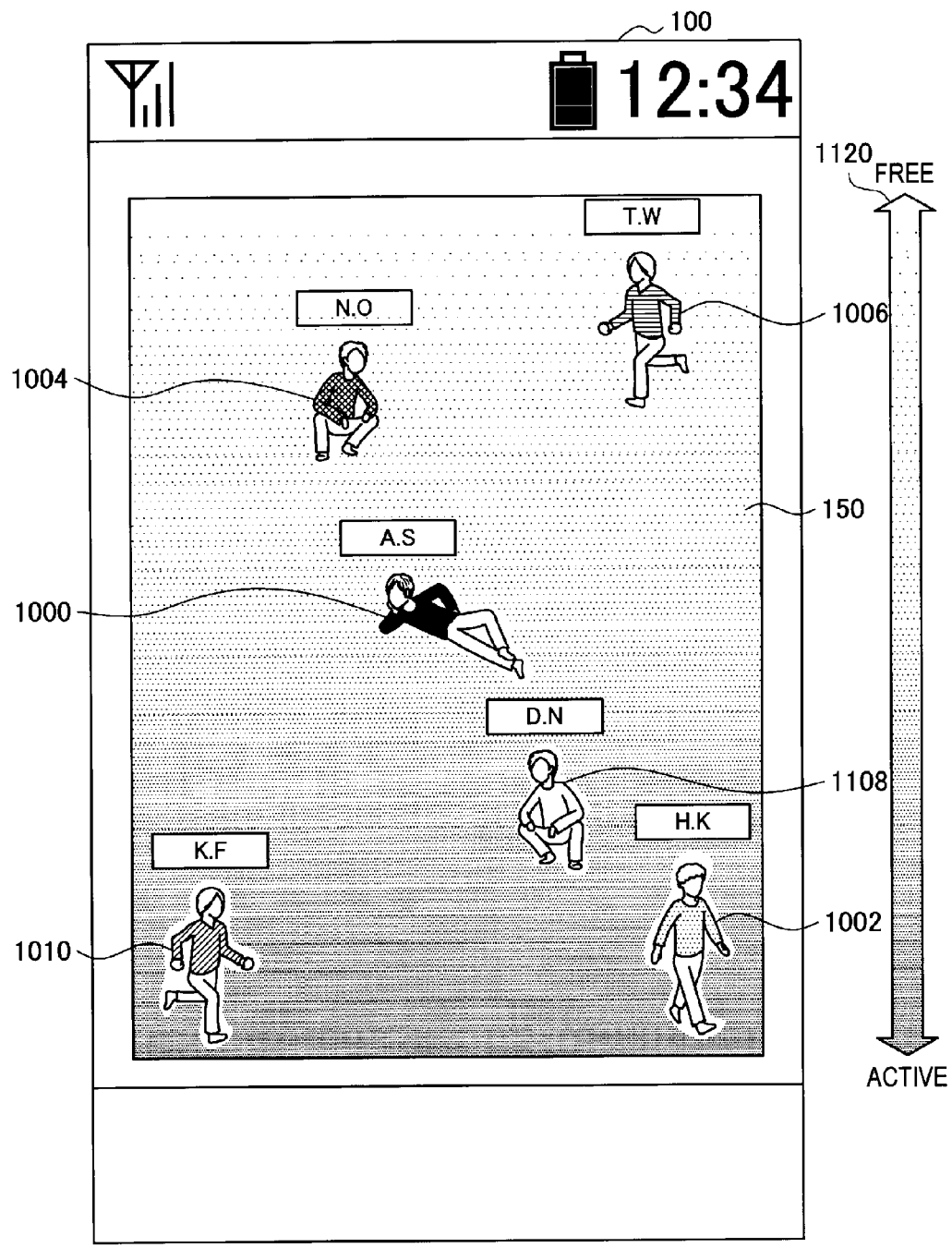
FIG. 14 is an explanatory view showing a display screen of the information processing apparatus according to the embodiment.

Next, a method by which the information processing apparatus 100 according to the present embodiment displays the objects 1000, 1002, 1004, 1006, 1008, and 1010 in the two-dimensional display screen 150 based on personal data with reference to FIG. 14. FIG. 14 is a diagram illustrating the display screen 150 in which the objects 1000, 1002, 1004, 1006, 1008, and 1010 are displayed based on personal data.

First, personal data will be described. The storage unit 126 can store personal data for each user. The data control unit 118 receives the personal data from the storage unit 126. The data control unit 118 can also transmit the personal data to the data transmission unit 114. The data transmission unit 114 can transmit the received personal data to the server 102. Thus, the information processing apparatus 100 can acquire personal data of other users and display a video signal by arranging the objects 1000, 1002, 1004, 1006, 1008, and 1010 of a plurality of users based on the personal data.

On the other hand, the data receiving unit 116 can receive personal data of other users from the server 102. The data receiving unit 116 transmits the received personal data of the other users to the data control unit 118. The data control unit 118 receives personal data of other users from the data receiving unit 116. The data control unit 118 arranges the objects 1000, 1002, 1004, 1006, 1008, and 1010 in a two-dimensional display screen based on the personal data of the other users and the personal data received from the storage unit 126. The data control unit 118 can also generate a video signal in which the behavior representation data is arranged in the two-dimensional display screen as the objects 1000, 1002, 1004, 1006, 1008, and 1010.

Next, the data control unit 118 transmits the video signal to the display control unit 120. The display control unit 120 causes the display screen 150 to display the video signal. FIG. 14 is an example of the video signal arranged in the display screen 150.

In the example shown in FIG. 14, as described above, the display screen 150 displays how active other users are around the object 1000 concerning the administrative user. FIG. 14 shows that users concerning objects present closer to the direction of "Active" regarding an axis 1120 are more active. In the case of FIG. 14, more specifically, personal data may be, for example, information about how many phone calls were made in a specific few days. That is, a user is more active with an increasing number of phone calls. In the example shown in FIG. 14, personal data may naturally be other information such as information about mails. Thus, by arranging the objects 1000, 1002, 1004, 1006, 1008, and 1010 in the two-dimensional display screen 150 based on personal data, for example, how active a plurality of users actually is can be grasped at a glance. Therefore, for example, commonness of hobbies of a plurality of users can be grasped at a glance and users sharing a common hobby with the administrative user can be moved to the center of the display screen.

Figure 15:
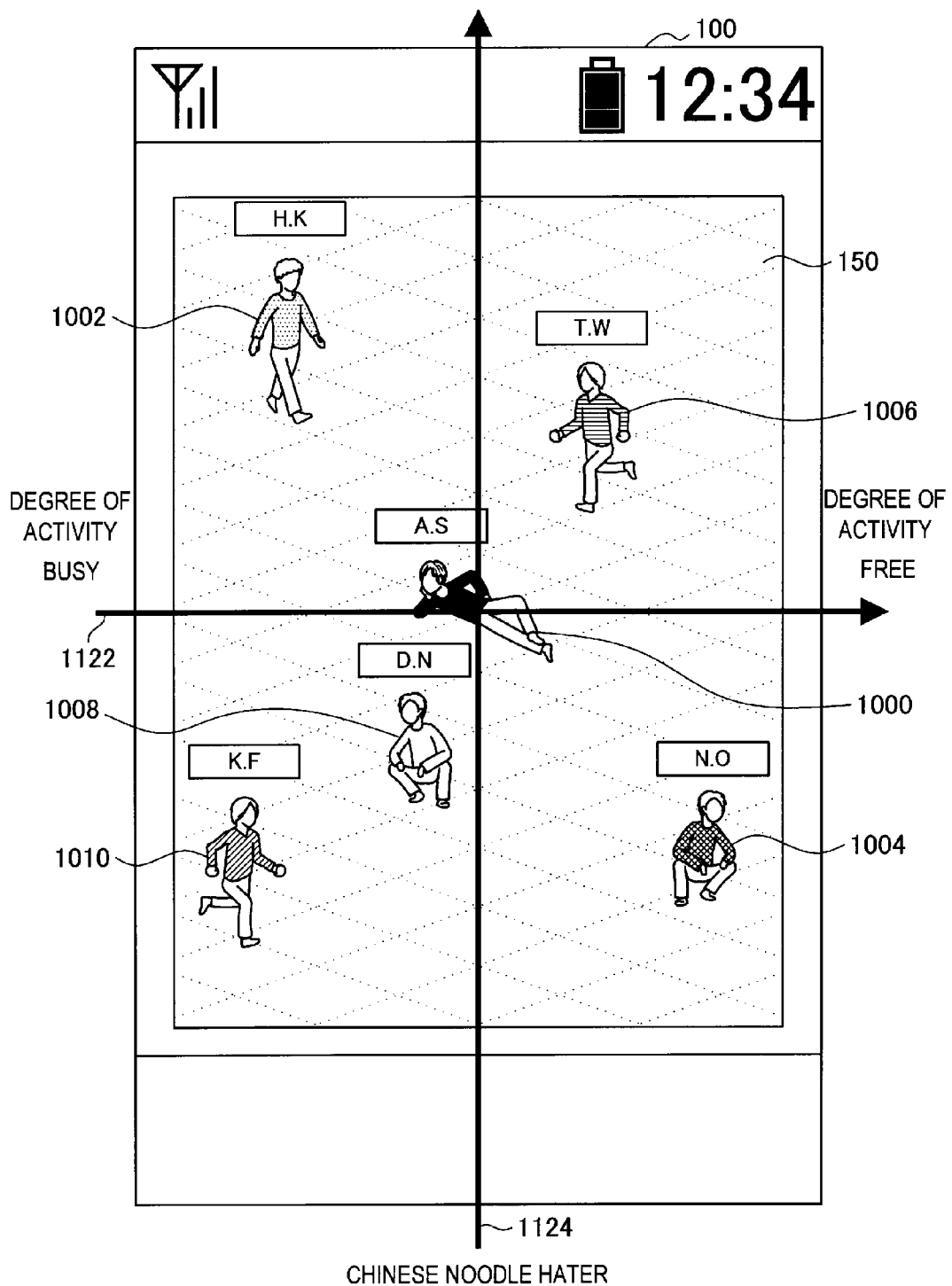
FIG. 15 is an explanatory view showing a display screen of the information processing apparatus according to the embodiment.

Next, another method by which the information processing apparatus 100 according to the present embodiment displays the objects 1000, 1002, 1004, 1006, 1008, and 1010 in the two-dimensional display screen 150 based on personal data with reference to FIG. 15. FIG. 15 is a diagram illustrating the display screen 150 in which the objects 1000, 1002, 1004, 1006, 1008, and 1010 are displayed based on personal data.

The method of making a display in the display screen 150 based on personal data shown in FIG. 15 may be exactly the same as that in the example described with reference to FIG. 14 except that the data control unit 118 makes a display in the display screen 150 based on two pieces of personal data. In the example shown in FIG. 15, the display screen 150 displays how active other users are around the object 1000 concerning the administrative user in the direction of an axis 1122. The display screen 150 also displays how much other users like Chinese noodles around the object 1000 concerning the administrative user in the direction of an axis 1124.

In the example shown in FIG. 15, the user concerning the object 1006 is a more Chinese noodles lover than the administrative user and less active. The user concerning the object 1002 is a more Chinese noodles lover than the administrative user and more active. The user concerning the object 1004 is a less Chinese noodles lover than the administrative user and less active. The user concerning the object 1010 is a less Chinese noodles lover than the administrative user and more active. In the example shown in FIG. 15, personal data such as whether a user is a Chinese noodles lover may be, for example, data that evaluates how much the user likes Chinese noodles on a scale of 1 to 5 as a profile in the storage unit 126 of the information processing apparatus 100 of each user. Alternatively, the personal data may be, for example, the number of words searched from words used in mails transmitted/received by the user after a search for Chinese noodles is performed.

Thus, by arranging the objects 1000, 1002, 1004, 1006, 1008, and 1010 in the two-dimensional display screen 150 based on personal data, for example, which hobbies a plurality of users actually shares can be grasped at a glance. Also, by arranging the objects 1000, 1002, 1004, 1006, 1008, and 1010 in the two-dimensional display screen 150 based on personal data, for example, how active the plurality of users actually is can be grasped at a glance. That is, a plurality of pieces of information such as power of action and hobbies of the plurality of users can be grasped at a glance. Thus, for example, commonness of the plurality of pieces of information of the plurality of users can be grasped at a glance.

Figure 16:
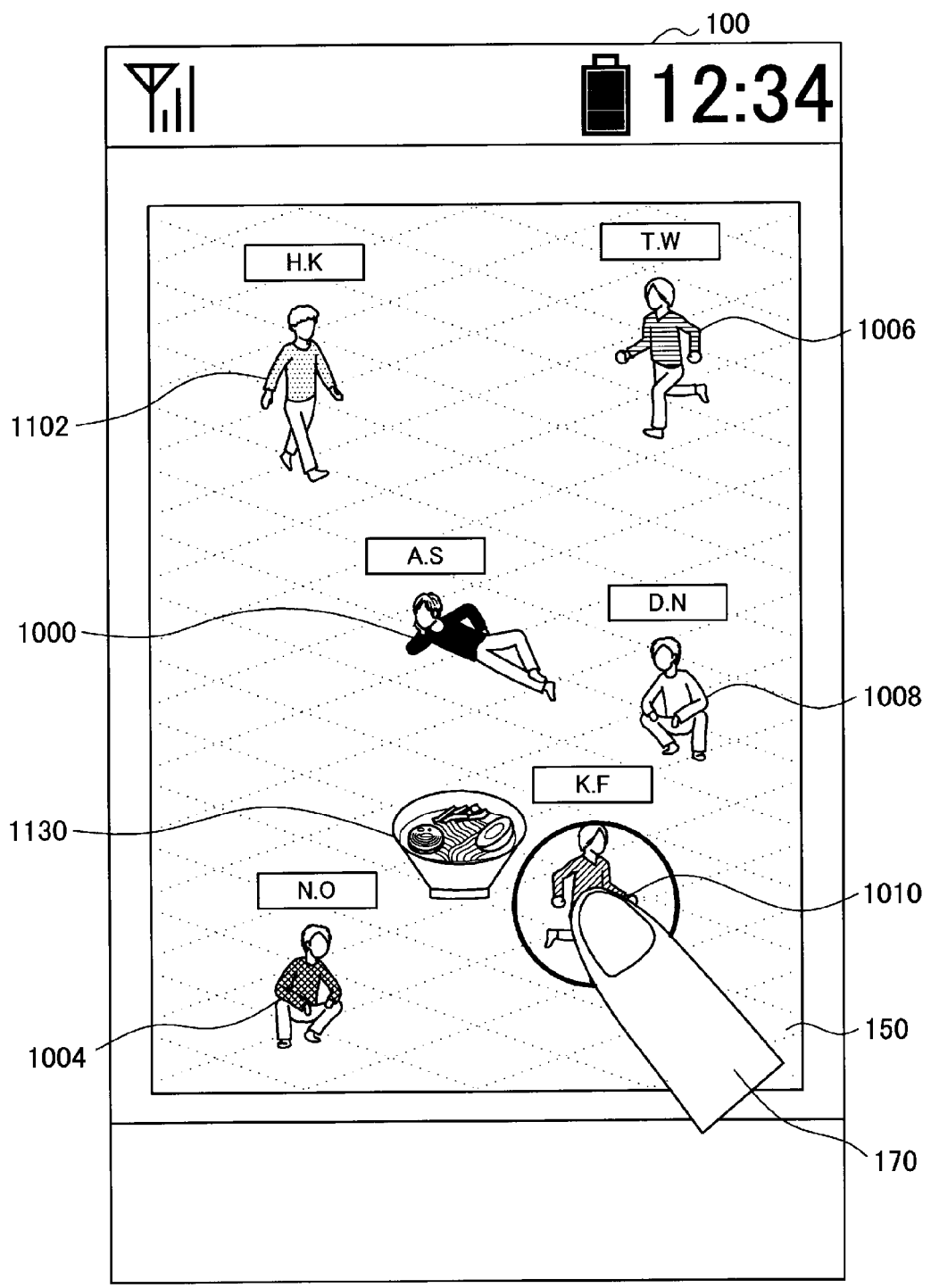
FIG. 16 is an explanatory view showing a display screen of the information processing apparatus according to the embodiment.
Figure 17:
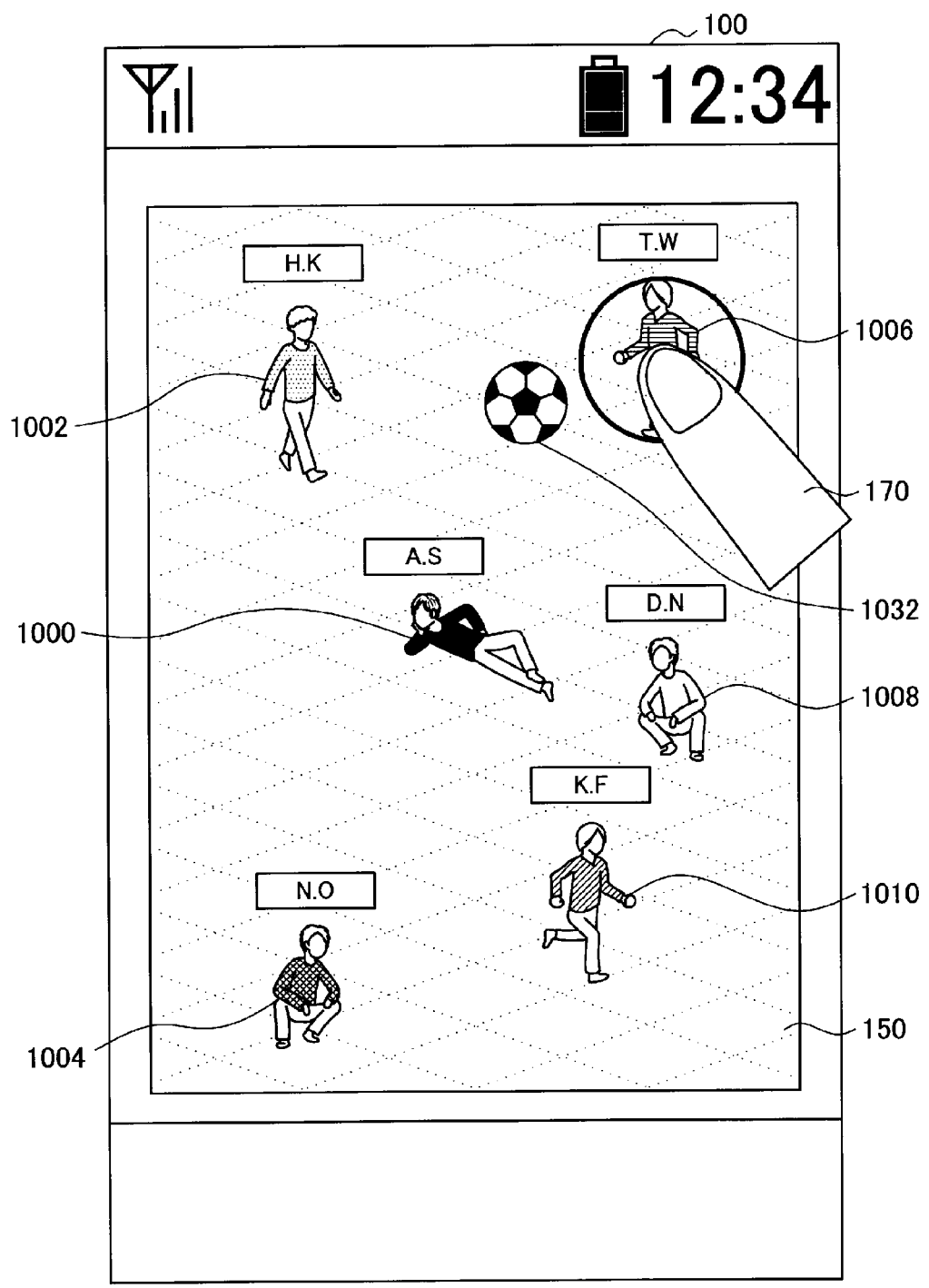
FIG. 17 is an explanatory view showing a display screen of the information processing apparatus according to the embodiment.
Figure 18:
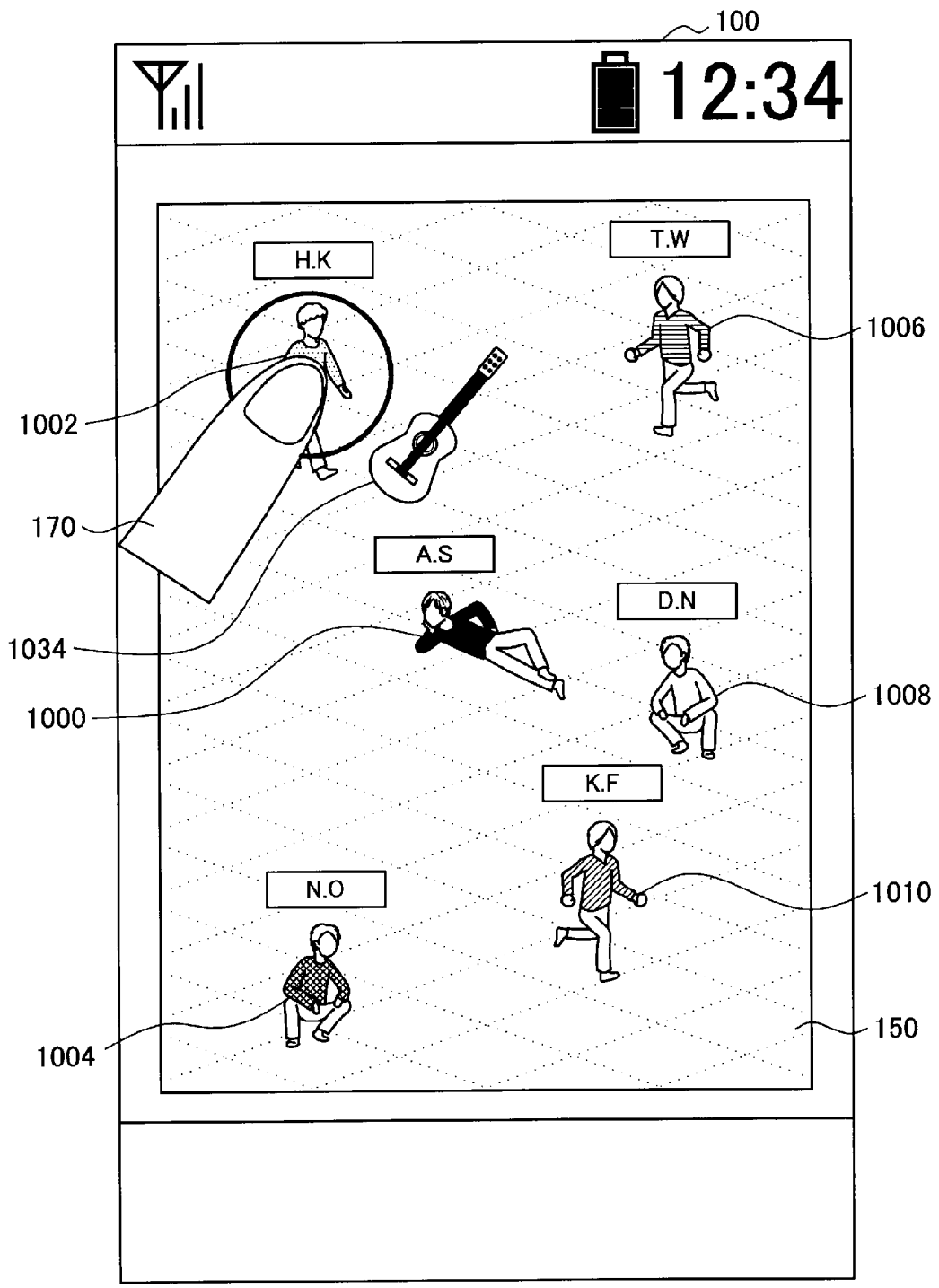
FIG. 18 is an explanatory view showing a display screen of the information processing apparatus according to the embodiment.

Next, another method by which the information processing apparatus 100 according to the present embodiment displays the objects 1000, 1002, 1004, 1006, 1008, and 1010 in the two-dimensional display screen 150 based on personal data with reference to FIGS. 16 to 18. FIG. 16 is a diagram illustrating the display screen 150 in which the objects 1000, 1002, 1004, 1006, 1008, and 1010 are displayed based on personal data.

In the example shown in FIG. 16, the data control unit 118 causes the display screen 150 to display personal data 1130 on the hobby of the user concerning the object 1010 by the finger 170 being brought into contact with the object 1010. Thus, with the finger 170 being brought into contact with the object 1010, the user can know that the user concerning the object 1010 is a Chinese noodles lover. The objects 1000, 1002, 1004, 1006, 1008, and 1010 concerning the plurality of users may be arranged in the display screen 150 based on personal data other than personal data on whether a user is a Chinese noodles lover or hater. That is, the user can first grasp commonness of the plurality of pieces of information of the plurality of users based on how the objects 1000, 1002, 1004, 1006, 1008, and 1010 are arranged in the display screen 150. Then, with the finger 170 being brought into contact with the object 1010, other personal data can further be grasped. Incidentally, in the example shown in FIG. 16, after the finger 170 being brought into contact with the object 1010, another operation of the user may become necessary so that the data control unit 118 causes the display screen 150 to display personal data. For example, the data control unit 118 may cause the display screen 150 to display personal data after the finger 170 of one hand being brought into contact with the object 1010 and an input key of the information processing apparatus 100 being pressed by the finger 170 of the other hand. Personal data is not limited to the example shown in FIG. 16. For example, personal data may be the numbers of words frequently used in transmitted/received mails. In the example described with reference to FIG. 16, the arrangement of the objects 1000, 1002, 1004, 1006, 1008, and 1010 in the display screen 150 may not be based on personal data. In other words, the arrangement of the objects 1000, 1002, 1004, 1006, 1008, and 1010 in the display screen 150 may be based on position data, communication history data or the like. That is, for example, the user can grasp personal data of the user while grasping presence positions of users concerning the objects 1000, 1002, 1004, 1006, 1008, and 1010.

Also in the example shown in FIG. 17, the data control unit 118 causes the display screen 150 to display personal data 1032 on the hobby of the user concerning the object 1006 by the finger 170 being brought into contact with the object 1006. FIG. 17 is a diagram illustrating the display screen 150 in which the objects 1000, 1002, 1004, 1006, 1008, and 1010 are displayed based on personal data. Thus, with the finger 170 being brought into contact with the object 1006, the user can know that the user concerning the object 1006 is a soccer fan. How the objects 1000, 1002, 1004, 1006, 1008, and 1010 are arranged in the display screen 150 is exactly the same as content described with reference to FIG. 16 and thus, a description thereof is omitted.

Also in the example shown in FIG. 18, the data control unit 118 causes the display screen 150 to display personal data 1034 on the hobby of the user concerning the object 1002 by the finger 170 being brought into contact with the object 1002. FIG. 18 is a diagram illustrating the display screen 150 in which the objects 1000, 1002, 1004, 1006, 1008, and 1010 are displayed based on personal data. Thus, with the finger 170 being brought into contact with the object 1002, the user can know that the user concerning the object 1002 likes guitar. How the objects 1000, 1002, 1004, 1006, 1008, and 1010 are arranged in the display screen 150 is exactly the same as content described with reference to FIG. 16 and thus, a description thereof is omitted.

(Transmitting a Brief Message Using a Touch Panel)

Next, a function to transmit a brief message by a touch panel operation on an object will be described with reference to FIGS. 19 to 21.

Figure 19:
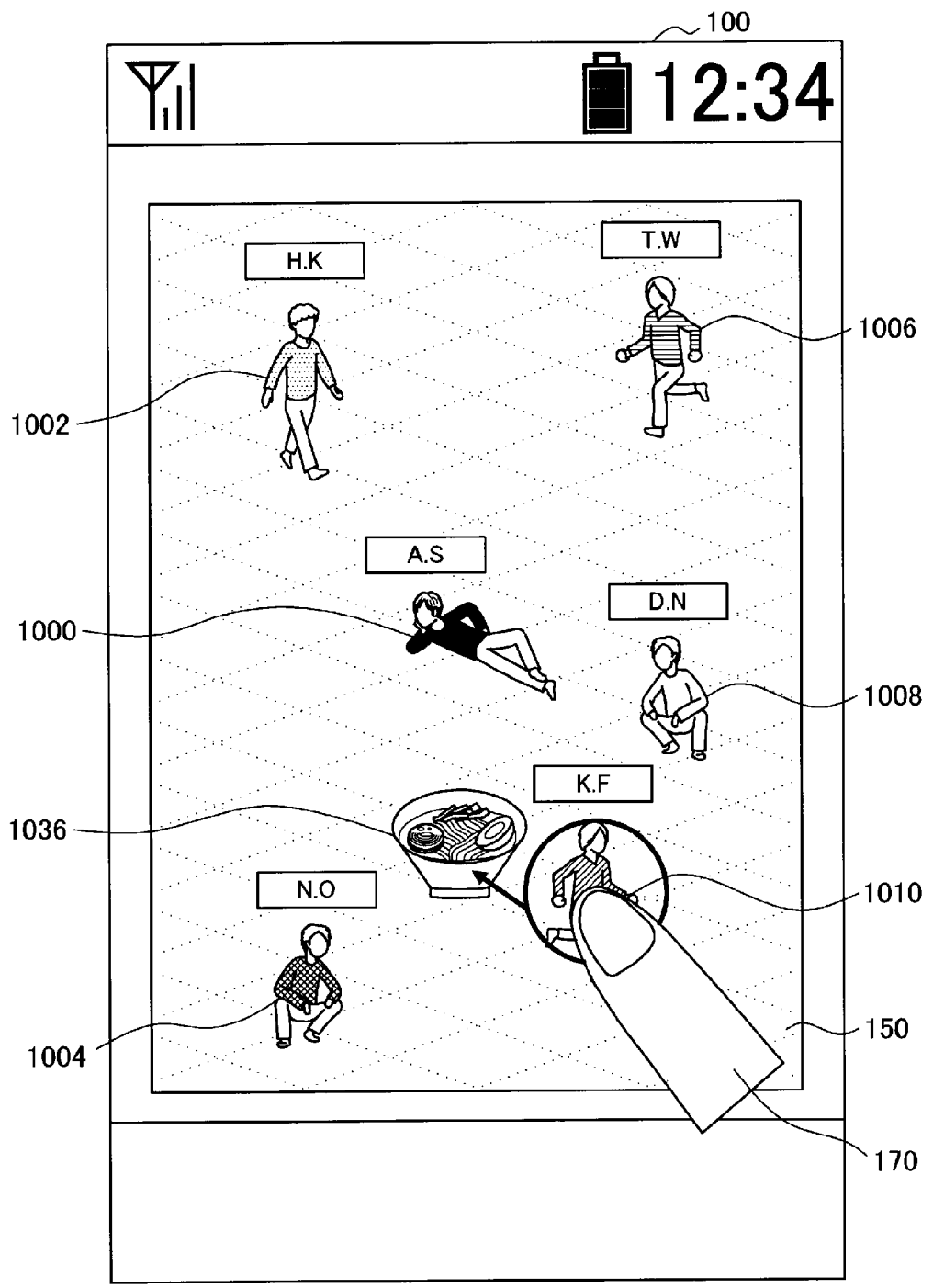
FIG. 19 is an explanatory view showing a display screen of the information processing apparatus according to the embodiment.

FIG. 19 is a diagram illustrating how the administrative user transmits a brief message to the user concerning the object 1010. As described above, the data control unit 118 can cause the display screen 150 to display personal data 1036 concerning the object 1010 by a touch panel operation. In FIG. 19, the personal data 1036 that the user concerning the object 1010 is a Chinese noodles lover is displayed in the display screen 150. The user can perform a drag & drop operation of the object 1010 onto the object of the personal data 1036. As a result, the data control unit 118 can transmit a brief message to the data transmission unit 114. Then, the data transmission unit 114 transmits the brief message to the server 102. Next, the server 102 transmits the brief message to the user concerning the object 1010. The brief message may be, for example, a simple message like "Let's go to eat Chinese noodles". The user who receives a brief message can receive the brief message by, for example, the same means as that of electronic mails. The brief message may be a message recorded in the storage unit 126.

Figure 20:
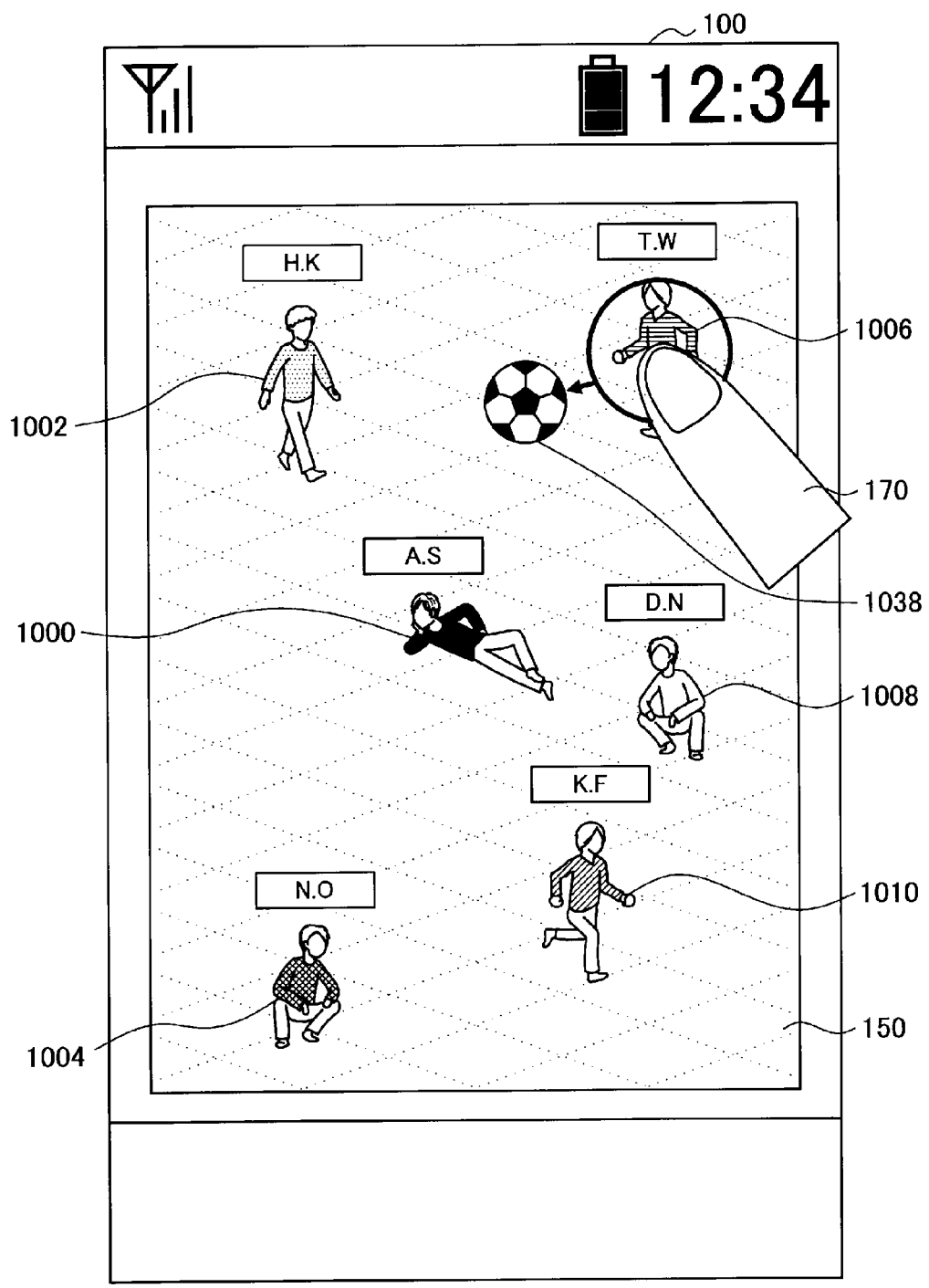
FIG. 20 is an explanatory view showing a display screen of the information processing apparatus according to the embodiment.

FIG. 20 is a diagram illustrating how the administrative user transmits a brief message to the user concerning the object 1006. In FIG. 20, the personal data 1038 that the user concerning the object 1006 wants to go to see a soccer game is displayed in the display screen 150. The user can perform a drag & drop operation of the object 1006 onto the object of the personal data 1038 by a touch panel operation. Then, in the exactly the same manner as described with reference to FIG. 19, a simple message like "Let's go to see a soccer game" can be transmitted to the user concerning the object 1006.

Figure 21:
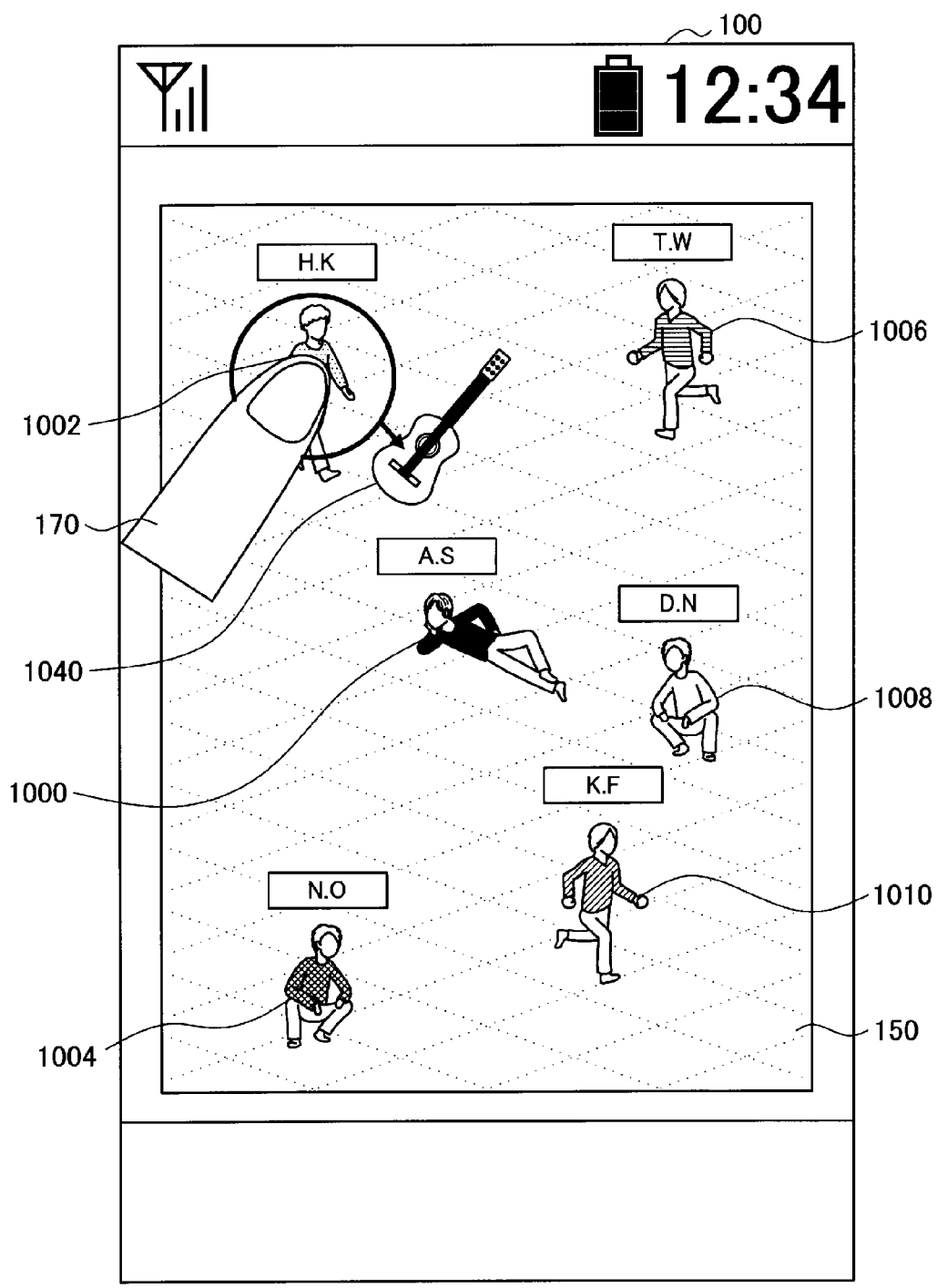
FIG. 21 is an explanatory view showing a display screen of the information processing apparatus according to the embodiment.

FIG. 21 is a diagram illustrating how the administrative user transmits a brief message to the user concerning the object 1002. In FIG. 21, the personal data 1040 that the user concerning the object 1002 plays the guitar well is displayed in the display screen 150. The user can perform a drag & drop operation of the object 1002 onto the object of the personal data 1040 by a touch panel operation. Then, in the exactly the same manner as described with reference to FIG. 19, a simple message like "Please play the guitar" can be transmitted to the user concerning the object 1002.

(Grasping Current User Behavior Via the Touch Panel)

Figure 22:
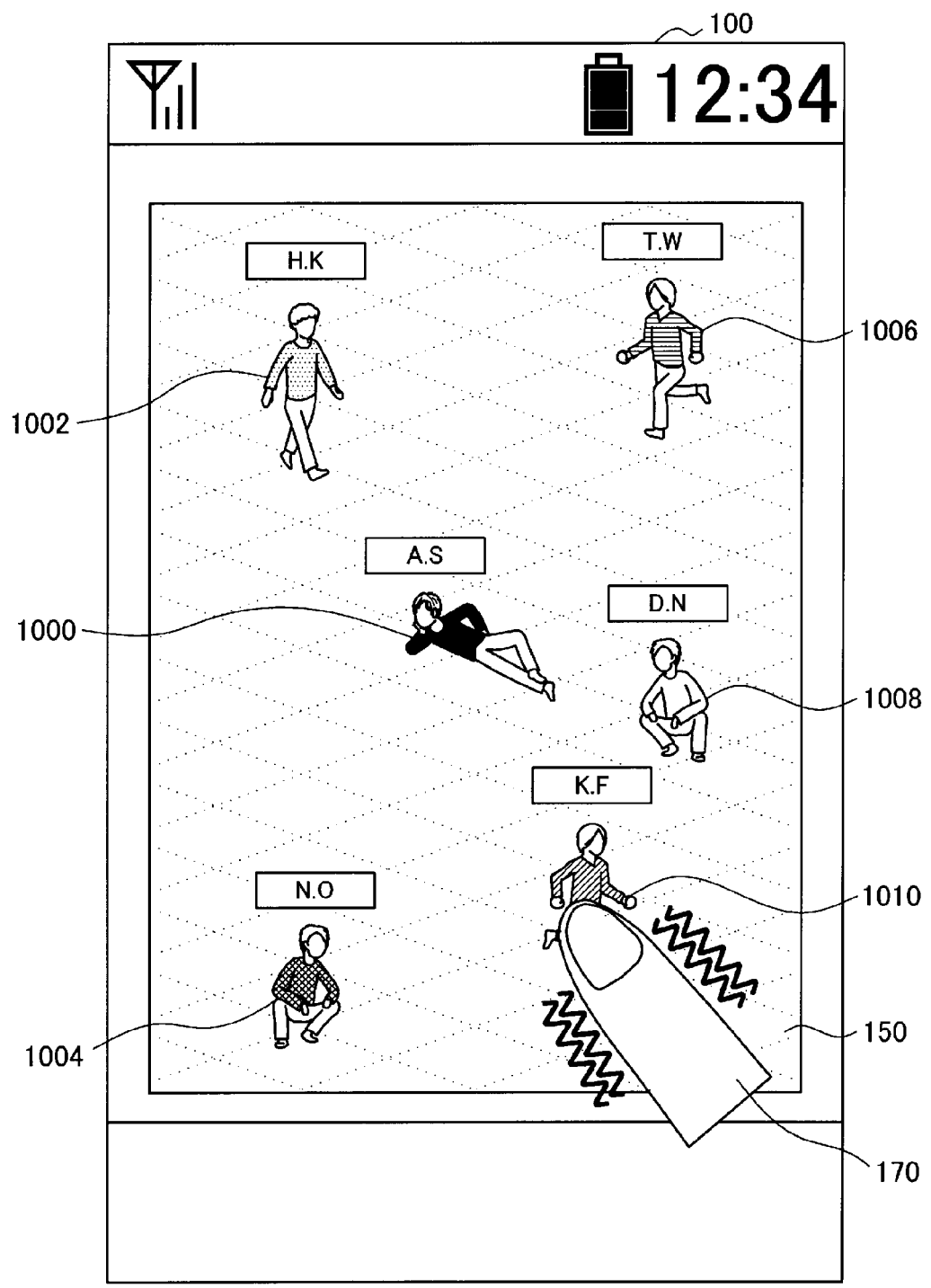
FIG. 22 is an explanatory view showing a display screen of the information processing apparatus according to the embodiment.

Next, a function enabling the user to grasp behavior of the user concerning an object by the object being touched will be described with reference to FIGS. 22 to 26. FIG. 22 is a diagram illustrating that the user can grasp behavior of the user concerning the object 1010 by the finger 170 of the user being brought into contact with the object 1010.

As shown in FIG. 22, the data control unit 118 acquiring behavior representation data of the user concerning the object 1010 by the finger 170 of the user being brought into contact with the object 1010 transmits predetermined vibration to the finger 170 of the user. The user can grasp the behavior of the user concerning the object 1010 through the predetermined vibration. That is, the user can visually and tactually grasp the behavior of the user through an object and vibration based on the behavior representation data.

Figure 23:
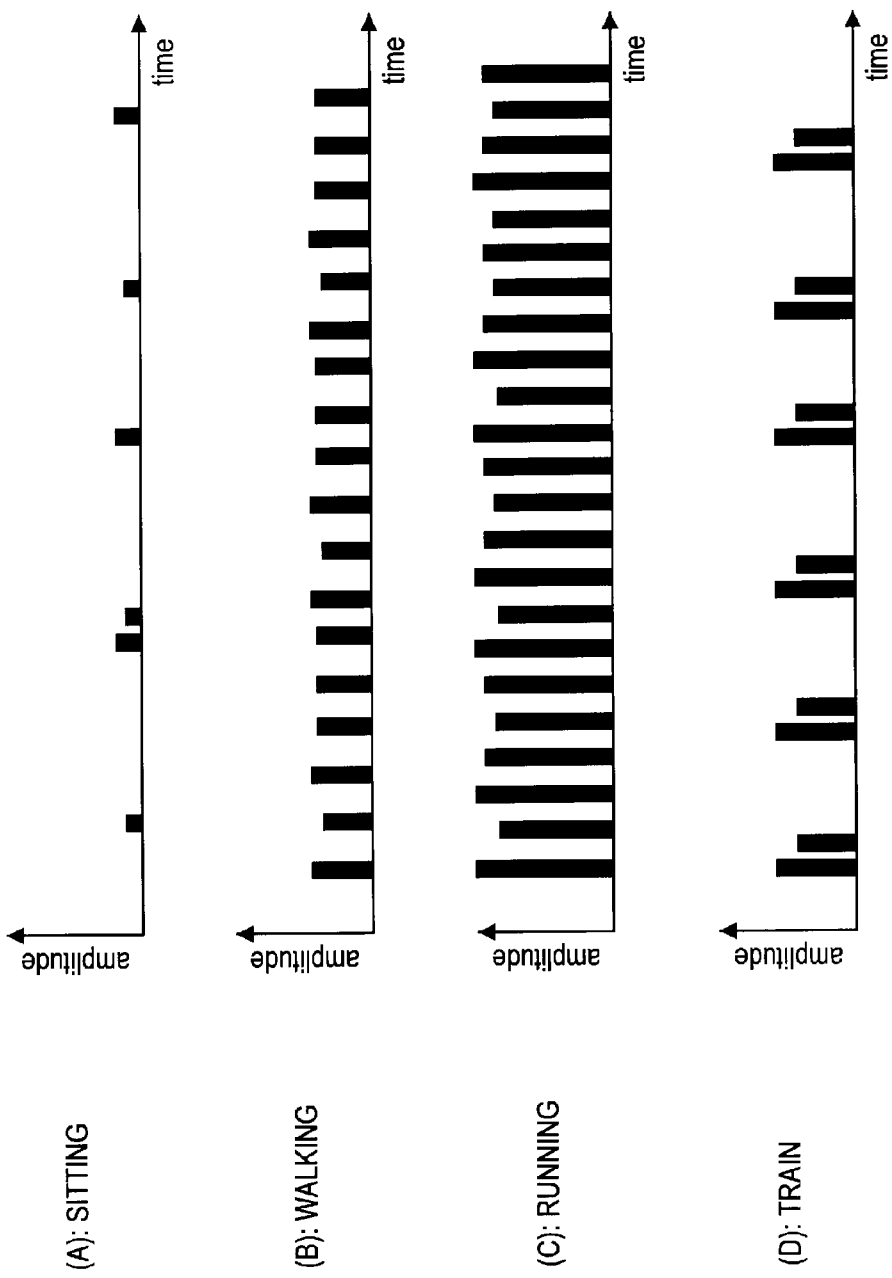
FIG. 23 is an explanatory view showing a function of vibration of the information processing apparatus according to the embodiment.

Examples of the period and amplitude of the vibration for each act of behavior of the user will be described with reference to FIG. 23. FIG. 23 is a diagram showing examples of the period and amplitude of the vibration for each act of behavior. (A) in FIG. 23 is an example of vibration to transmit that the user is sitting. (B) in FIG. 23 is an example of vibration to transmit that the user is walking. (C) in FIG. 23 is an example of vibration to transmit that the user is running. (D) in FIG. 23 is an example of vibration to transmit that the user is moving on a train. Each vibration pattern may be recorded in the storage unit 126.

(A) in FIG. 23 shows vibration when the user is sitting and when the user is sitting, there are relatively few actions in general. Thus, vibration to indicate that the user is sitting has a long period and a small amplitude so that the user can easily be reminded of actual behavior. Next, (B) in FIG. 23 shows vibration when the user is walking and when the user is walking, a monotonously rhythmic action is produced in general. Thus, vibration to indicate that the user is walking has a constant period and a suitable amplitude that the user can easily be reminded of actual behavior.

Next, (C) in FIG. 23 shows vibration when the user is running and when the user is running, actions are greater than when walking. Thus, vibration to indicate that the user is running has a shorter period and a larger amplitude set than when walking. As a result, the user can easily be reminded of actual behavior. Next, (D) in FIG. 23 shows vibration when the user is moving on a train and when the user is moving on a train, the user strongly feels jolting of the train in general. Thus, vibration to indicate that the user is moving on a train has a period and an amplitude set to associate with jolting of the train like "clickety-clack". As a result, the user can easily be reminded of actual behavior.

If, as shown in FIG. 24, the finger 170 of the user is brought into contact with an object as if to enclose the object, turning (changing the direction of behavior) of the user concerning the object can be grasped. FIG. 24A is a diagram illustrating that the user is enabled to grasp the turn of the user concerning the object 1010 by the finger 170 of the user being brought into contact with the object 1010 if to enclose the object. FIG. 24B is an example of vibration to transmit the turn.

As shown in FIG. 24A, the data control unit 118 acquiring behavior representation data of the user concerning the object 1010 by the finger of the user being brought into contact with the object 1010 if to enclose the object 1010 transmits vibration shown in FIG. 24B to the finger 170 of the user. The user can grasp a turn of the user concerning the object 1010 through the vibration shown in FIG. 24B. That is, the user can visually and tactually grasp the behavior of the user through an object and vibration based on the behavior representation data. FIG. 24B shows vibration when the user turns.

Figure 25A:
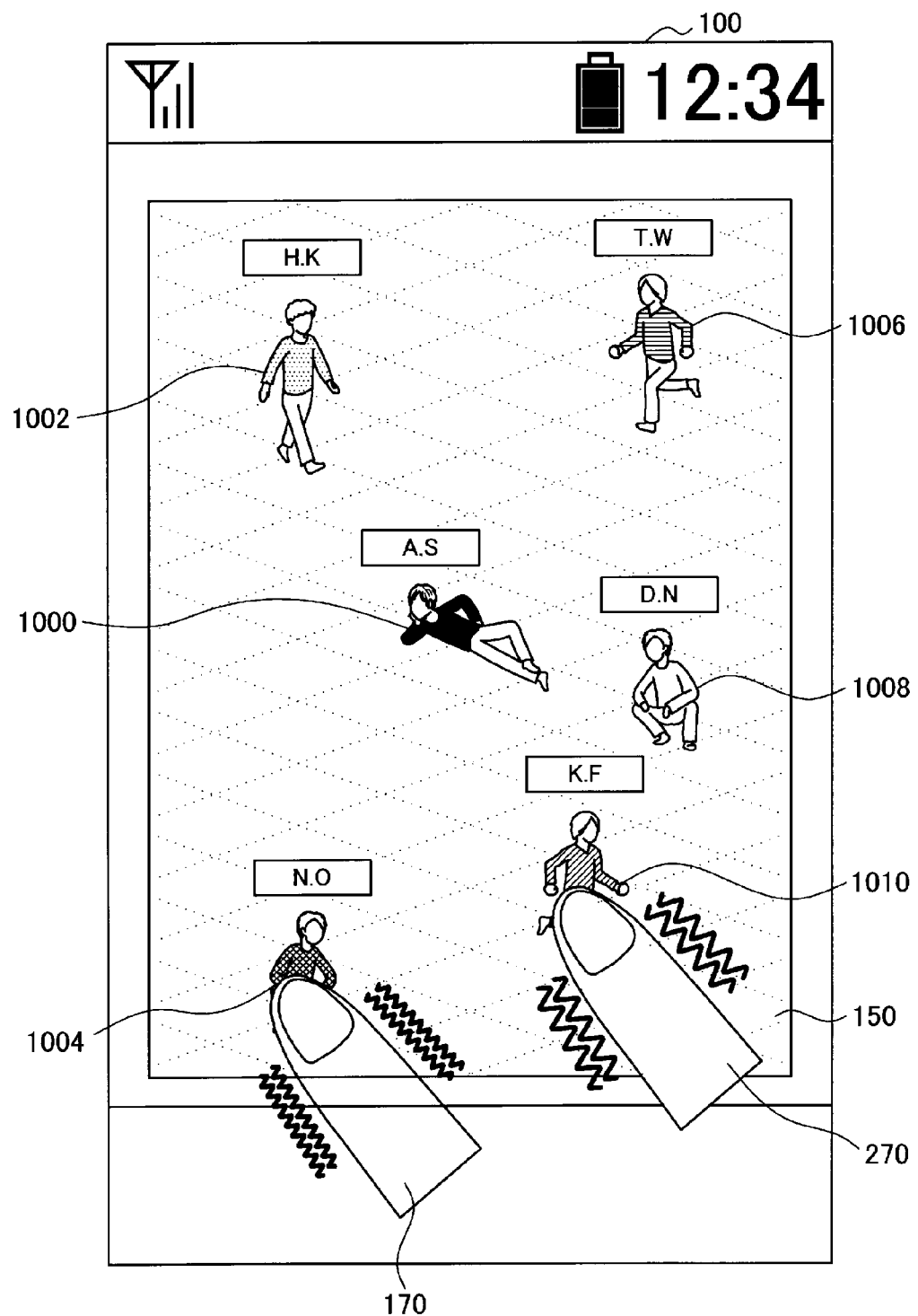
FIG. 25A is an explanatory view showing the display screen of the information processing apparatus according to the embodiment.
Figure 25B:
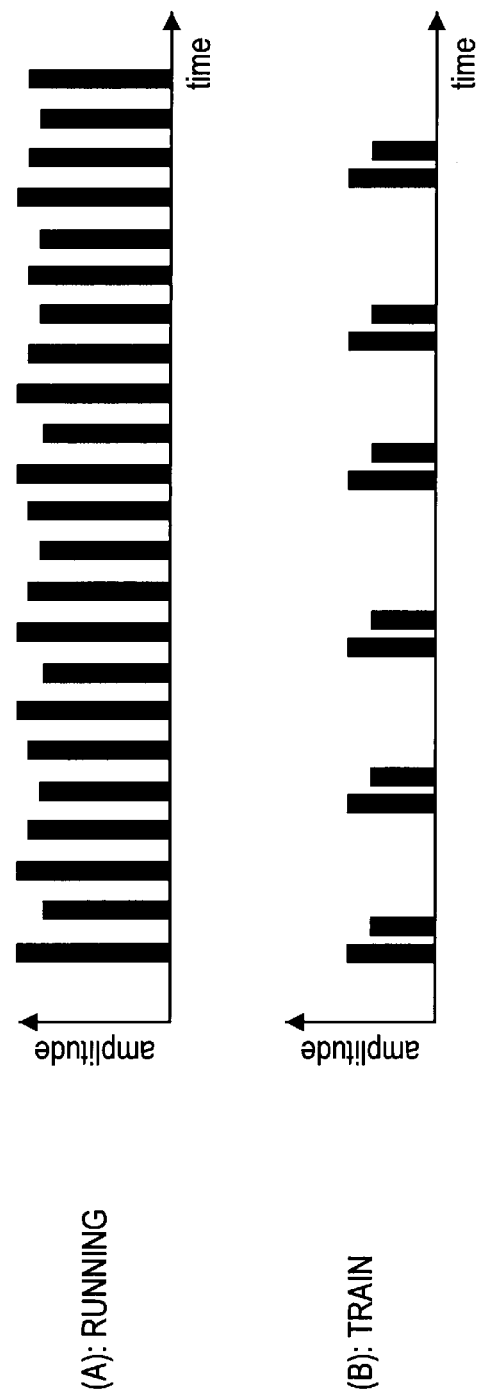
FIG. 25B is an explanatory view showing a function of vibration of the information processing apparatus according to the embodiment.

Next, FIG. 25A is a diagram illustrating that the user is enabled to grasp behavior of a plurality of users concerning the objects 1004 and 1010 by the finger 170 and a finger 270 of the user being brought into contact with a plurality of the objects 1004 and 1010 simultaneously. FIG. 25B is an example of vibration showing that the user concerning the object 1010 is running and the user concerning the object 1004 is moving on a train. Thus, the user can simultaneously grasp behavior of the plurality of the objects 1004 and 1010 (or any other combination of objects) from different vibration for each user.

(Making a Phone Call or Transmitting a Mail to the User by a Touch Panel Operation)

A method of enabling various functions such as a phone call and mail between users by a touch panel operation on objects will be described with reference to FIGS. 26 to 32.

FIG. 26 is a diagram illustrating that the user can check whether the user concerning the object 1006 is ready for communication by double-clicking the object 1006 with the finger 170. As shown in (A) of FIG. 26, the finger 170 of the user double-clicks the object 1006. Accordingly, the data control unit 118 transmits a signal to the data transmission unit 114. Next, the data transmission unit 114 transmits the signal to the server 102. Next, the data control unit 118 of the information processing apparatus 100 owned by the user concerning the object 1006 receives the signal from the server 102. The data control unit 118 thereby transmits a signal to notify that communication is ready. Then, the data control unit 118 of the information processing apparatus 100 of the administrative user receives the signal via the server 102. Then, as shown in (B) of FIG. 26, the data control unit 118 causes the object 1006 in the display screen 150 to output voice "Did you call me?" through an output unit (not shown). Thus, the user can grasp that the user with whom communication should be performed is communication ready in advance by a simple technique.

Figure 27:
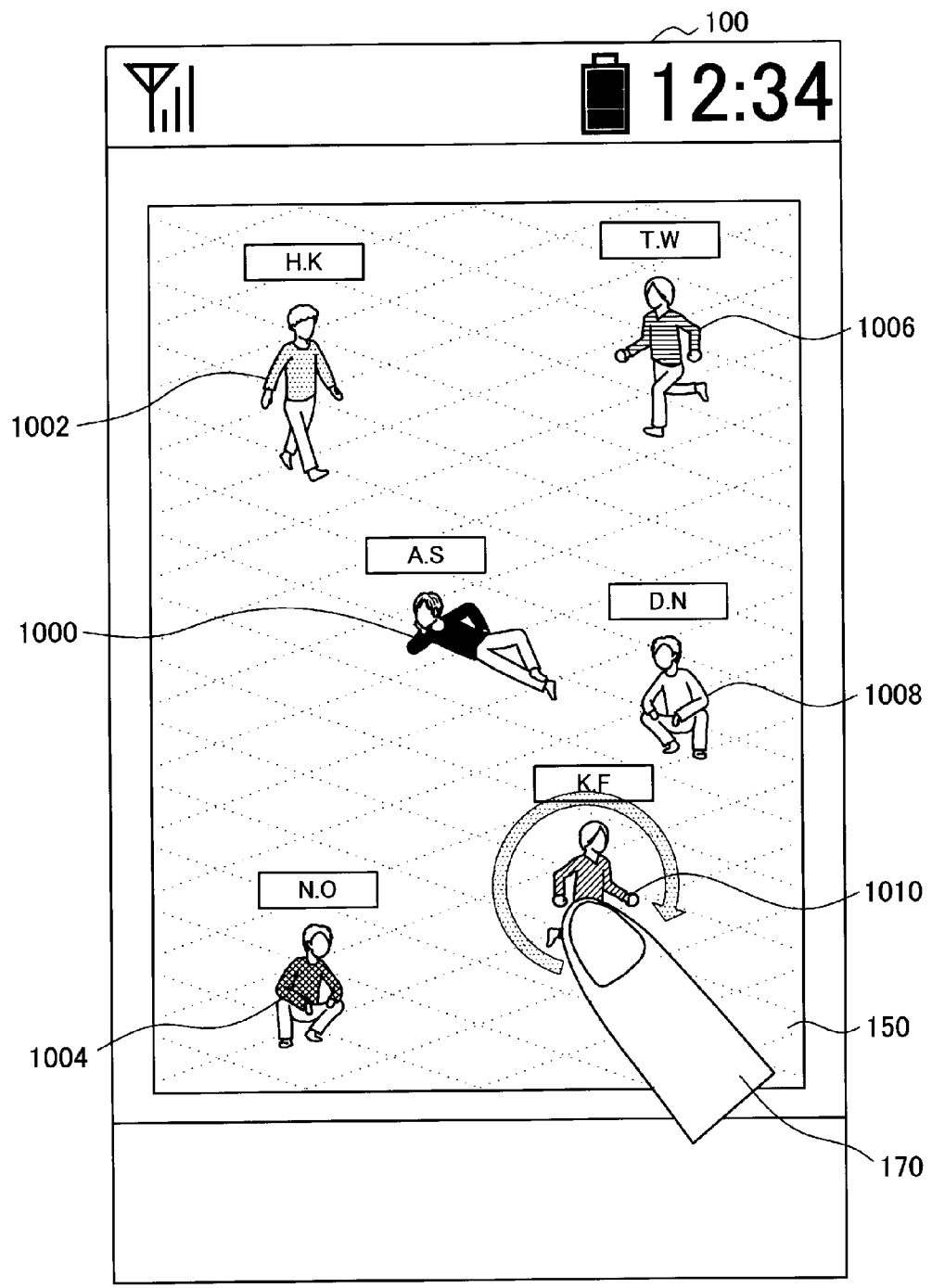
FIG. 27 is an explanatory view showing a display screen of the information processing apparatus according to the embodiment.

FIG. 27 is a diagram illustrating that the administrative user enables a phone call to the user concerning the object 1010 by performing a predetermined touch panel operation. The data control unit 118 transmits a call signal, which is a signal for making a call, to the data transmission unit 114 after the object 1010 being operated with the finger 170 of the administrative user as if to enclose the object 1010. The data transmission unit 114 transmits the call signal to the server 102. The server transmits the call signal to the data control unit 118 of the information processing apparatus 100 of the user concerning the object 1010. Then, the data control unit 118 transmits a call ready signal, which is a signal indicating that a phone call is ready, to the data control unit 118 of the information processing apparatus 100 of the administrative user via the server. A phone call is thereby enabled between the information processing apparatus 100 of the administrative user and the information processing apparatus 100 of the user concerning the object 1010. Thus, a phone call between users is enabled by a very simple operation.

Figure 28:
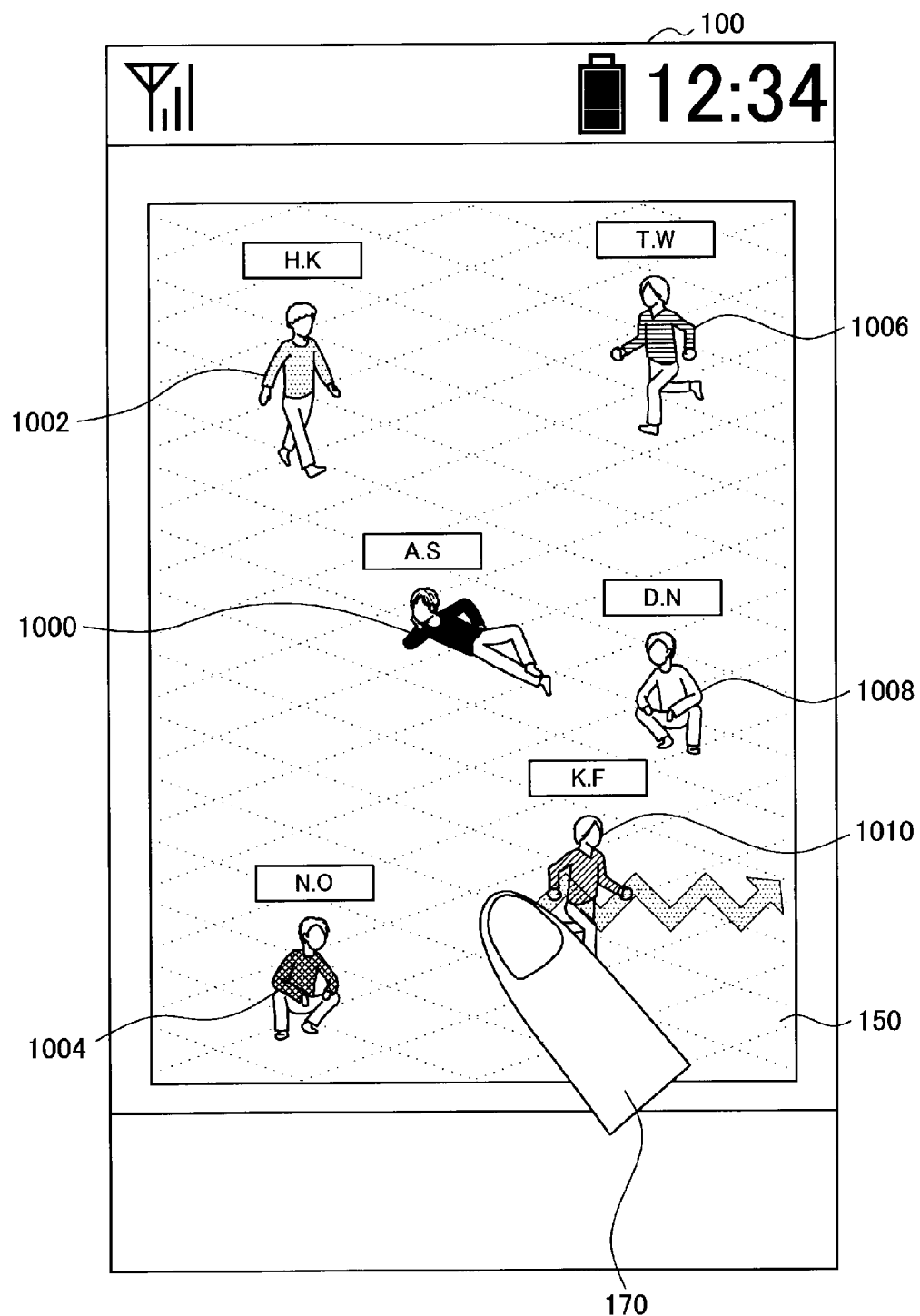
FIG. 28 is an explanatory view showing a display screen of the information processing apparatus according to the embodiment.

FIG. 28 is a diagram illustrating that the administrative user has a mail creation screen to the user concerning the object 1010 displayed by performing a predetermined touch panel operation. The data control unit 118 causes the display screen 150 to display a mail creatable screen after an operation as if to propel a pen being performed by the finger 170 of the administrative user. The information processing apparatus 100 of the administrative user is thereby enabled to create a mail to the information processing apparatus 100 of the user concerning the object 1010. Thus, mail creation is enabled by a very simple operation.

Figure 29:
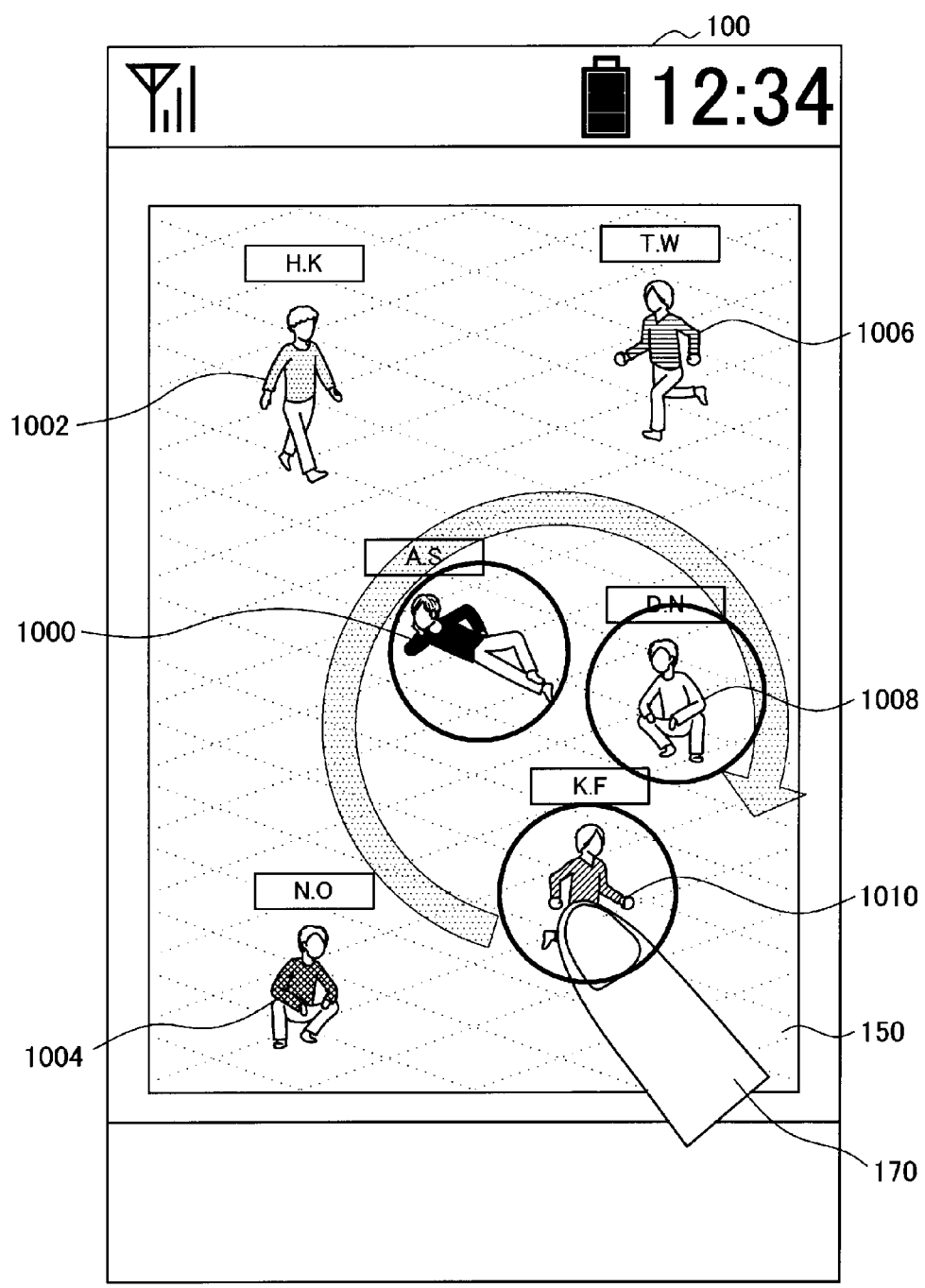
FIG. 29 is an explanatory view showing a display screen of the information processing apparatus according to the embodiment.

FIG. 29 is a diagram illustrating that the administrative user enables a chat among users concerning the objects 1000, 1008, and 1010 by performing a predetermined touch panel operation. The data control unit 118 transmits a chat signal, which is a signal to have a chat, to the data transmission unit 114 after an operation as if to enclose the objects 1000, 1008, and 1010 being performed by the finger 170 of the administrative user. The data transmission unit 114 transmits the chat signal to the server 102. The server transmits the chat signal to each of the data control units 118 of the information processing apparatuses 100 of users concerning the objects 1008 and 1010. Then, each of the data control units 118 transmits a chat ready signal, which is a signal indicating that a chat is ready, to the data control unit 118 of the information processing apparatus 100 of the administrative user via the server. A chat is thereby enabled between the information processing apparatus 100 of the administrative user and the information processing apparatuses 100 of the users concerning the objects 1008 and 1010. Thus, a chat between users is enabled by a very simple operation.

Figure 30:
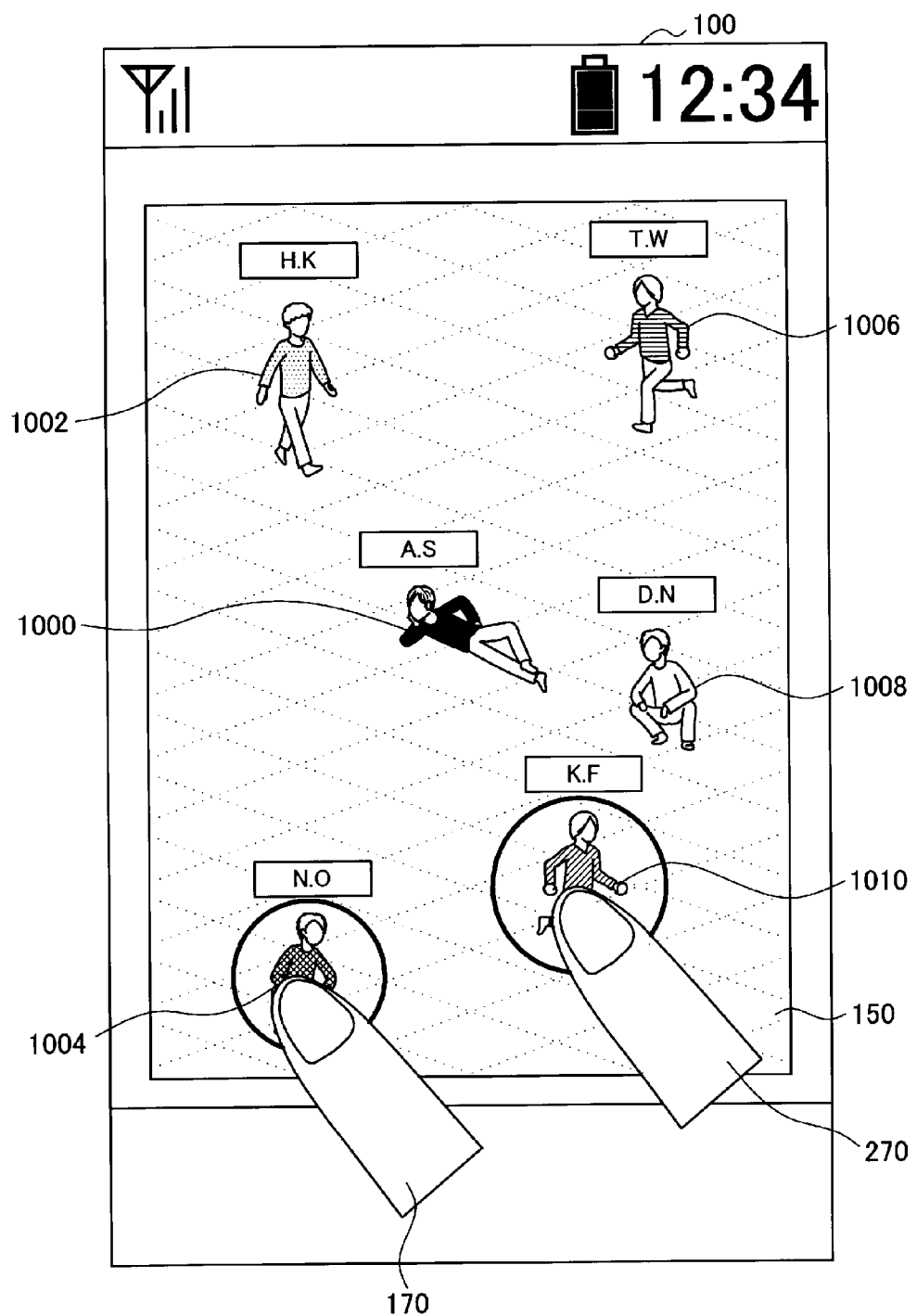
FIG. 30 is an explanatory view showing a display screen of the information processing apparatus according to the embodiment.

FIG. 30 is a diagram illustrating that a user enables a chat among users concerning the objects 1004 and 1010 and the administrative user concerning the object 1000 by performing a predetermined touch panel operation. The data control unit 118 transmits a chat signal, which is a signal to have a chat, to the data transmission unit 114 after an operation as if to enclose the objects 1000, 1004, and 1010 being performed by the finger 170 of the user. The data transmission unit 114 transmits the chat signal to the server 102. The server transmits the chat signal to each of the data control units 118 of the information processing apparatuses 100 of users concerning the objects 1004 and 1010. Then, each of the data control units 118 transmits a chat ready signal, which is a signal indicating that a chat is ready, to the data control unit 118 of the information processing apparatus 100 of the administrative user via the server. A chat is thereby enabled between the information processing apparatus 100 of the administrative user and the information processing apparatuses 100 of the users concerning the objects 1004 and 1010. Thus, a chat between users is enabled by a very simple operation.

Figure 31:
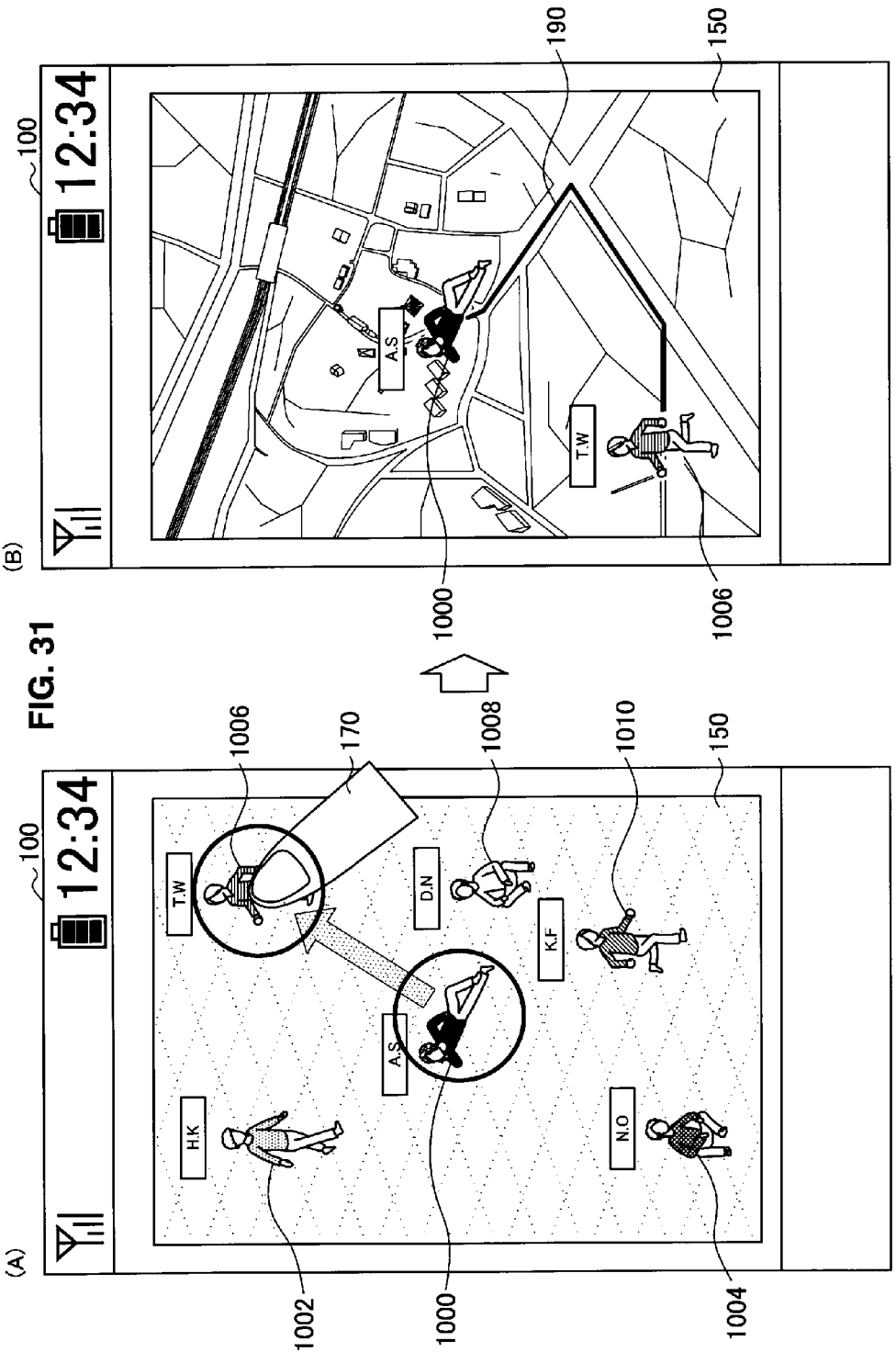
FIG. 31 is an explanatory view showing a display screen of the information processing apparatus according to the embodiment.

FIG. 31 is a diagram illustrating that physical relationships in real space between the administrative user concerning the object 1000 and the user concerning the object 1006 and a route between the users can be shown by performing a predetermined touch panel operation. As shown in (a) of FIG. 31, the data control unit 118 receives position data of the user concerning the object 1006 via the server 102 after an operation as if to trace from the object 1000 to the object 1006 being performed by the finger 170 of the user. The data control unit 118 causes the display screen 150 to display position data of the administrative user and that of the user concerning the object 1006. Then, the data control unit 118 receives data on a route from the presence position in the real space of the administrative user to that in the real space of the user concerning the object 1006 from the storage unit 126. Then, as shown in (b) of FIG. 31, the data control unit 118 outputs the display screen 150 in which a route 190 from the presence position of the administrative user to that of the user concerning the object 1006 is displayed. Thus, the actual route 190 to a user to meet can easily be displayed by a very simple operation.

Figure 32:
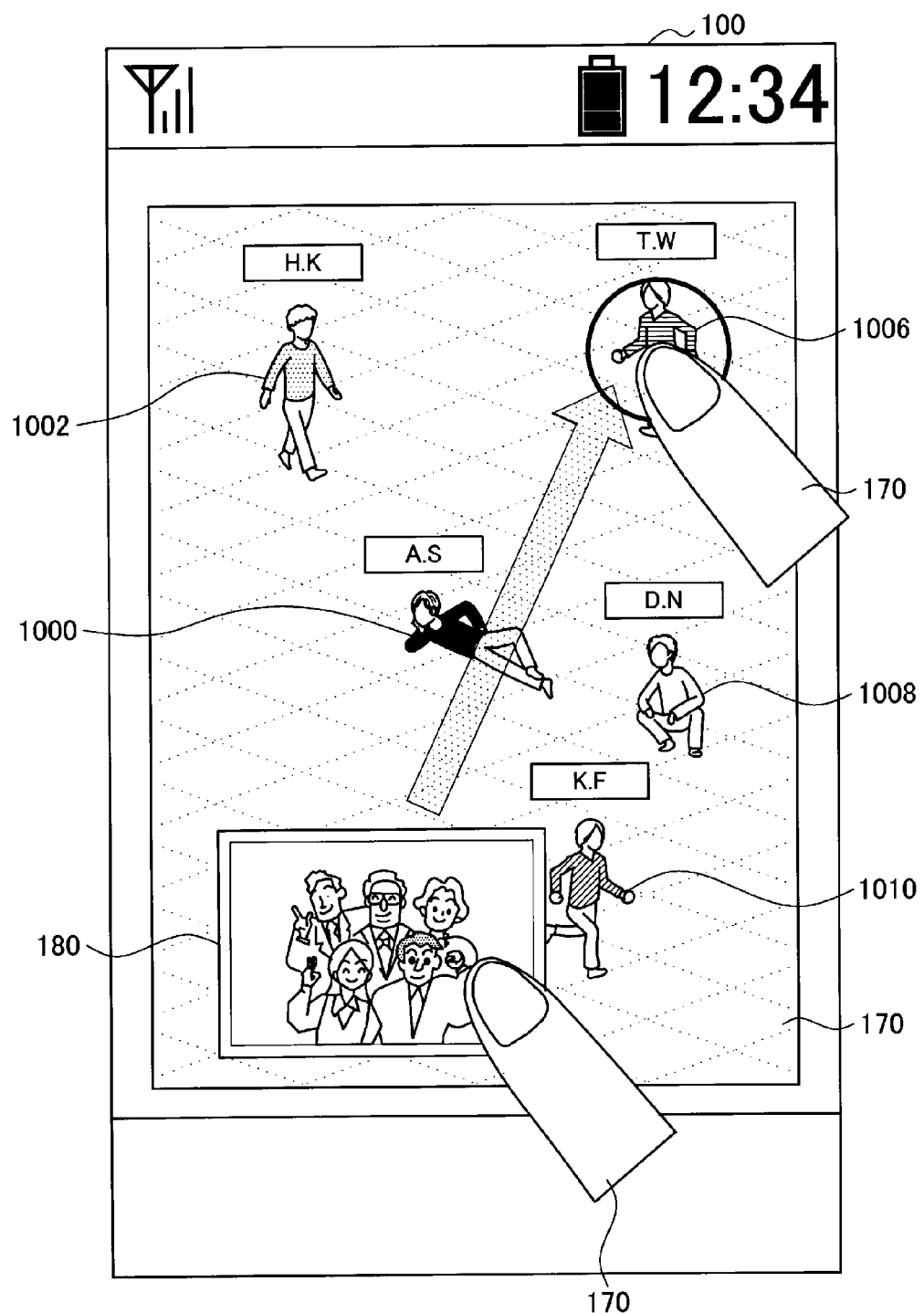
FIG. 32 is an explanatory view showing a display screen of the information processing apparatus according to the embodiment.

FIG. 32 is a diagram illustrating that a user enables transmission of image data 180 to the user concerning the object 1006 by performing a predetermined touch panel operation. The data control unit 118 receives the image data 180 from the storage unit 126 after an operation as if to trace from the object 1000 to the object 1006 being performed by the finger 170 of the user. Next, the data control unit 118 transmits the image data 180 to the data receiving unit 116 of the information processing apparatuses 100 of the user concerning the object 1006 via the server 102. Accordingly, the user concerning the object 1006 can cause the display screen 150 of the information processing apparatuses 100 of the user to display the image data 180. Thus, data can be transmitted/received between users by a very simple operation. Data that can be transmitted as described above is not limited to image data. For example, data that can be transmitted may be data on URL of a Web page or a message.

Incidentally, it is desirable that the behavior sensing unit 106 be set not to sense behavior of users during the touch panel operations described above.

Figure 33:
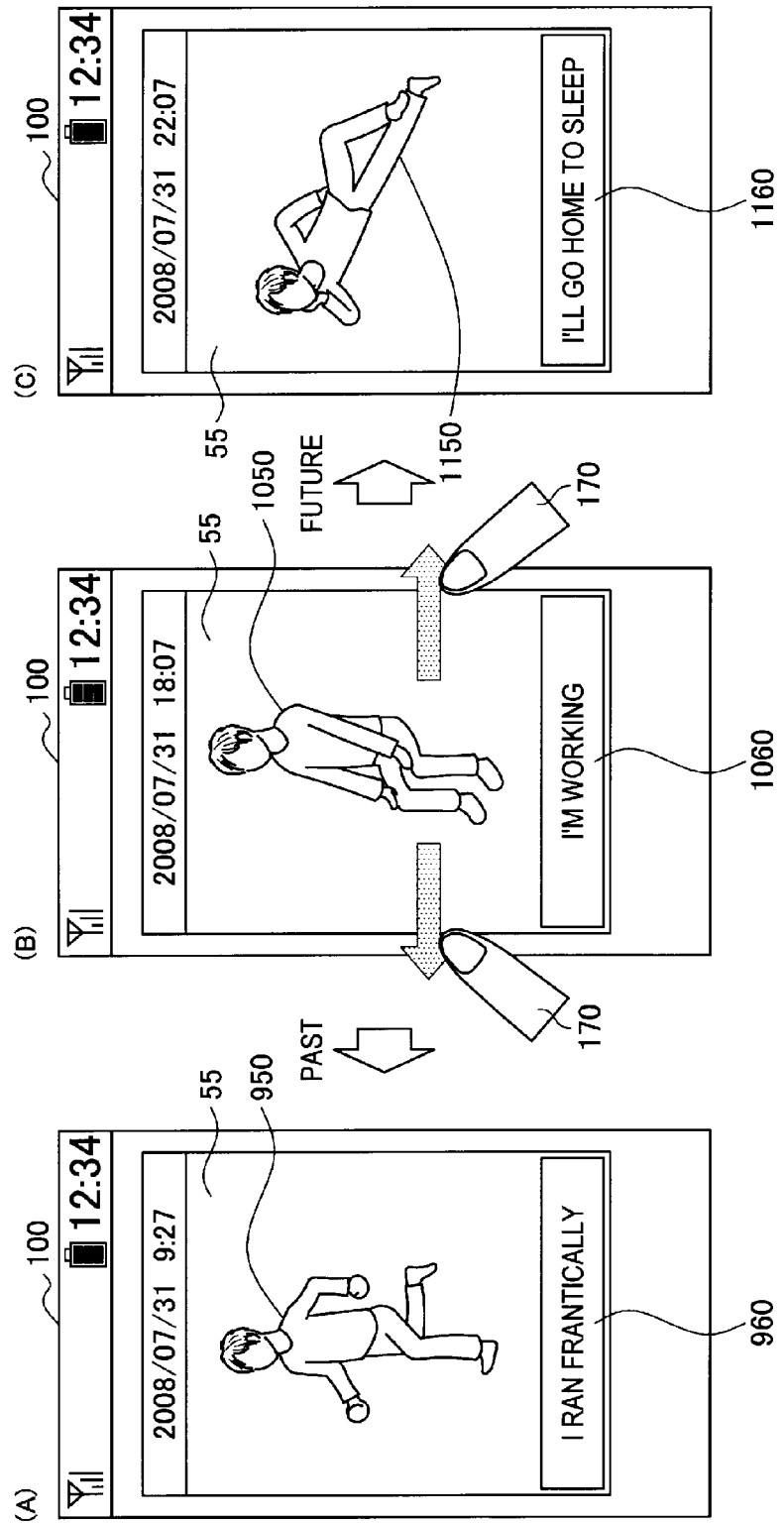
FIG. 33 is an explanatory view showing a display screen of the information processing apparatus according to the embodiment.
Figure 34:
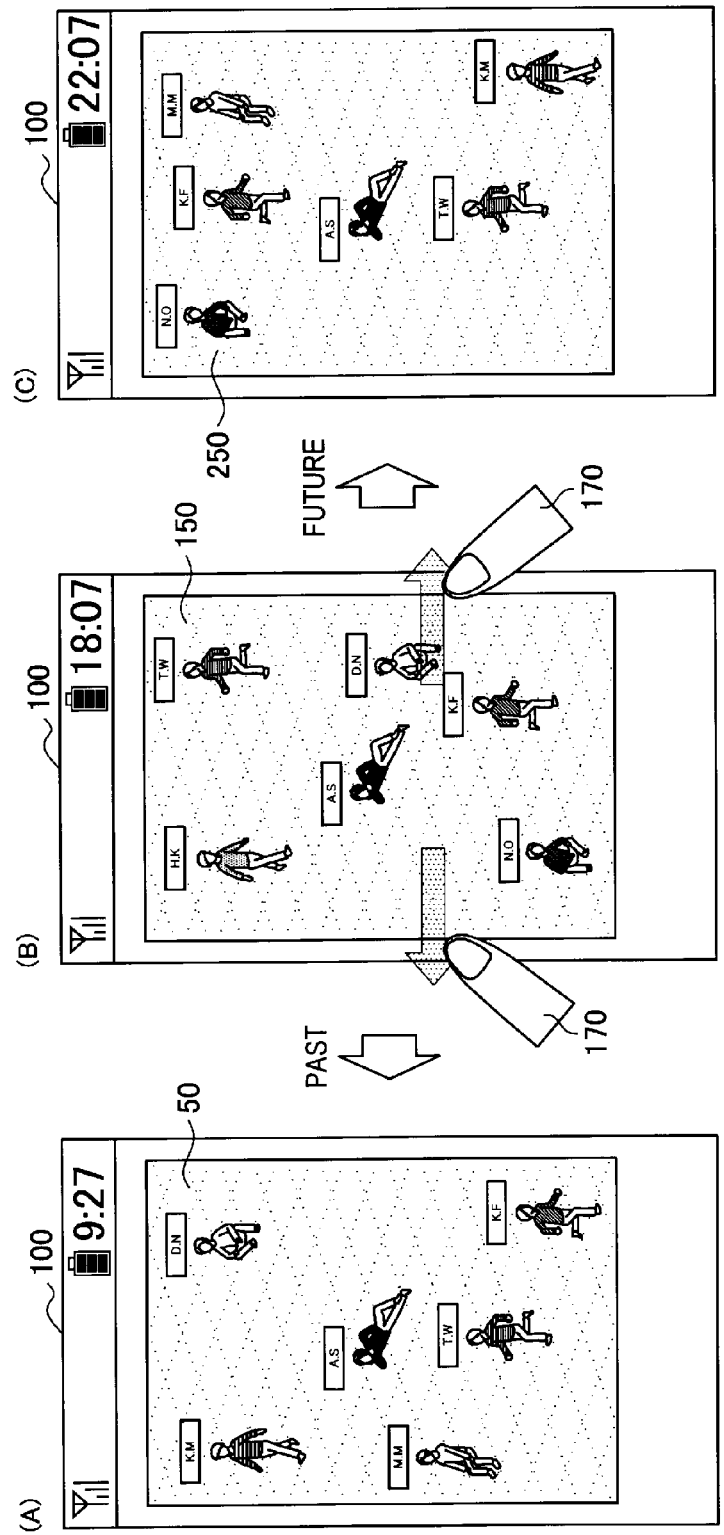
FIG. 34 is an explanatory view showing a display screen of the information processing apparatus according to the embodiment.

Next, that objects can be arranged in the display screen 150 based on not only the latest position data, communication history data, or personal data, but also past position data, communication history data, or personal data will be described with reference to FIGS. 33 and 34. Moreover, objects can be arranged based on position data or communication history data predicted for the future.

FIG. 33B is an explanatory view when the data control unit 118 displays an object 1050 in a display screen 155 by taking a close-up of a single user only. FIG. 33A is a diagram illustrating that an object 950 in a display screen 55 that goes back a predetermined time with respect to FIG. 33B can be displayed. The data control unit 118 receives data that goes back a specific time from the storage unit 126 after the object 1050 being traced by the finger 170 of the administrative user from the position on the object 1050 to the left. Then, based on the received data, the data control unit displays the object 950 in the display screen 150. The object 1050 indicating the present indicates current behavior based on behavior recognition data. The object 950 indicating the past indicates past behavior based on past behavior recognition data.

FIG. 33C is a diagram illustrating that an object 1050 can be displayed in a display screen 255 that is a predetermined time ahead of FIG. 33B. In FIG. 33C, the data control unit 118 receives data predicted for the future by a specific time from now after the object 1050 being traced by the finger 170 of the administrative user from a position on the object 1050 to the right. Data predicted for the future by a specific time from now is generated based on an extraordinary behavior extraction system described in detail below.

FIG. 34B is an explanatory view showing a state in which objects of a plurality of current users described above is displayed in the display screen 150. FIG. 34A is a diagram illustrating that a display screen 50 that goes back a predetermined time with respect to FIG. 34B can be displayed. The data control unit 118 receives data that goes back a specific time from the storage unit 126 after the display screen 150 being traced by the finger 170 of the administrative user from the position on the display screen 150 to the left. Then, based on the received data, the data control unit 118 displays the display screen 50 of the past. Objects in the display screen 150 indicating the present indicates current behavior based on behavior recognition data. Objects in the display screen 50 indicating the past indicates past behavior based on past behavior recognition data.

FIG. 34C is a diagram illustrating that a display screen 250 that is a predetermined time ahead of FIG. 33B can be displayed. In FIG. 34C, the data control unit 118 receives data predicted for the future by a specific time from now after the display screen 150 being traced by the finger 170 of the administrative user from a position on the display screen 150 to the right. Data predicted for the future by a specific time from now is generated based on the extraordinary behavior extraction system described in detail below.

Thus, the display control unit 120 can display past data in the display screen 150. Moreover, the display control unit 120 can display data predicted for the future in the display screen 150 thanks to extraordinary behavior extraction technology described in detail below.

5. EXTRAORDINARY BEHAVIOR EXTRACTION TECHNOLOGY (Summary of Issues)

As described above, it is possible to record behavior of current users or display behavior of a plurality of users in one display screen of an information processing apparatus. In the information processing apparatus 100 such as a mobile phone in which an acceleration sensor is mounted, for example, a technique to realize an application that records a behavior history without any burden on the user and automatically generates a behavior history using behavior parameters obtained from the record is proposed.

However, it is complicated work to accumulate data by using such a system and to search the data for intended data. It is also very complicated to detect a huge amount of data to reflect behavior or the like on that day. Further, while a past behavior history can be detected from data, it is difficult for an apparatus to automatically predict future behavior to some extent.

Extraordinary behavior extraction technology provided with the information processing apparatus 100 according to the present embodiment is developed in view of the above issues and it is desirable to extract only characteristic behavior or time zones from data on a large amount of behavior records. It is also desirable to remind a user of behavior on that day or behavior in the future.

(Effects)

According to extraordinary behavior extraction technology provided with the information processing apparatus 100 according to the present embodiment, it becomes possible to extract only characteristic behavior or time zones from data on a large amount of behavior records. Also according to the extraordinary behavior extraction technology, it becomes possible to remind a user of behavior on that day or behavior in the future.

(Functional Configuration)

Figure 35:
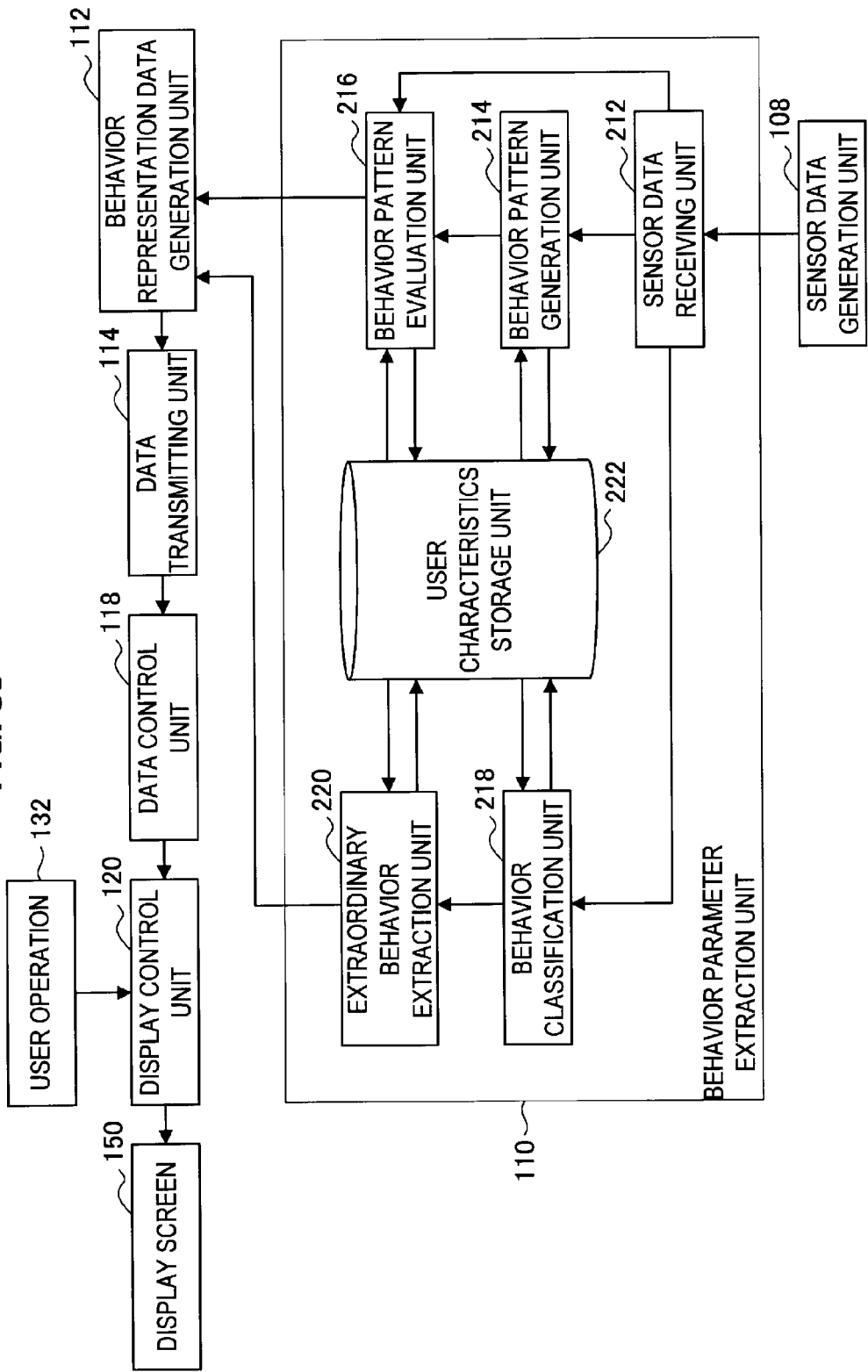
FIG. 35 is an explanatory view showing a display screen of the information processing apparatus according to the embodiment.

Next, the functional configuration of the information processing apparatus 100 according to the present embodiment having extraordinary behavior extraction technology will be described with reference to FIG. 35. Particularly in FIG. 35, an extraordinary behavior extraction held by a behavior parameter extraction unit will be described and an overlapping portion with the functional configuration described with reference to FIG. 3 is omitted. FIG. 35 is an explanatory view showing a functional configuration example of the information processing apparatus 100 according to the present embodiment. The information processing apparatus 100 has a function, with predetermined display information provided by the local apparatus, to arrange objects contained in a video signal in a two-dimensional display screen based on the predetermined information. Further, the information processing apparatus 100 is characterized by a function, with predetermined display information provided by the local apparatus, to extract and display only extraordinary behavior from user's behavior.

The sensor data generation unit 108 transmits sensor data to the behavior parameter extraction unit 110. The function held by the sensor data generation unit 108 is exactly the same as that held by the sensor data generation unit 108 described with reference to FIG. 3. As shown in FIG. 35, the behavior parameter extraction unit 110 includes a sensor data receiving unit 212, a behavior pattern generation unit 214, a behavior pattern evaluation unit 216, a behavior classification unit 218, an extraordinary behavior extraction unit 220, and a user characteristics storage unit 222.

The sensor data receiving unit 212 receives sensor data from the sensor data generation unit 108. The sensor data receiving unit 212 transmits the sensor data to the behavior pattern generation unit 214 and the behavior pattern evaluation unit 216. The behavior pattern generation unit 214 receives a plurality of pieces of sensor data from the sensor data receiving unit 212. The behavior pattern generation unit 214 generates a behavior pattern based on the plurality of pieces of sensor data. More specifically, for example, the behavior pattern generation unit 214 generates the behavior pattern by, for example, determining an averaging value of the plurality of pieces of sensor data.

The behavior pattern evaluation unit 216 receives the behavior pattern from the behavior pattern generation unit 214. The behavior pattern evaluation unit 216 also receives the sensor data from the sensor data receiving unit 212. The behavior pattern evaluation unit 216 determines a correlation coefficient between the behavior pattern and the sensor data. The correlation coefficient may be determined at intervals of several minutes or several hours. The behavior pattern evaluation unit 216 transmits sensor data on which the correlation coefficient is superimposed to the behavior representation data generation unit 112. The sensor data on which the correlation coefficient is superimposed is transmitted to the behavior representation data generation unit 112. Alternatively, only sensor data whose correlation coefficient is outside a predetermined range may be transmitted to the behavior representation data generation unit 112.

The behavior representation data generation unit 112 generates behavior representation data on which the correlation coefficient is superimposed based on the sensor data on which the correlation coefficient is superimposed. Then, the data transmission unit 114 receives and transmits the behavior representation data on which the correlation coefficient is superimposed to the data control unit 118. As described with reference to FIG. 3, the data control unit 118 can display the behavior representation data in the two-dimensional display screen 150 based on predetermined data. Alternatively, the data control unit 118 may calculate an extraordinary degree, which serves as a parameter to indicate extraordinary behavior of the user at predetermined intervals based on the correlation coefficient, so that the display screen 150 can be caused to display the extraordinary degree.

The sensor data receiving unit 212 also transmits sensor data to the behavior classification unit 218. When the sensor data is displayed chronologically, the behavior classification unit 218 classifies a peak based on a period in which the peak represented by the output value of the sensor data occurs. The extraordinary behavior extraction unit 220 that receives peaks classified based on the period extracts peaks whose period is equal to or less than a predetermined value and transmits data on the extracted peaks to the behavior representation data generation unit 112 as extraordinary behavior data. Alternatively, both the extraordinary behavior data and sensor may be transmitted to the behavior representation data generation unit 112.

The behavior representation data generation unit 112 generates behavior representation data based on the extraordinary behavior data. Then, the data transmission unit 114 receives and transmits the extraordinary behavior data to the data control unit 118. The data control unit 118 can display behavior representation data on extraordinary behavior in the display screen 150 based on the behavior representation data.

The above behavior pattern, the above sensor data on which correlation coefficients are superimposed, peaks of the sensor data classified based on the period, and extraordinary behavior data may be recorded in the user characteristics storage unit 222.

(Application Examples of Extraordinary Behavior Extraction Technology)

Next, methods of displaying objects and the like in the display screen using extraordinary behavior extraction technology will be described with reference to FIGS. 36 to 54.

Figure 36:
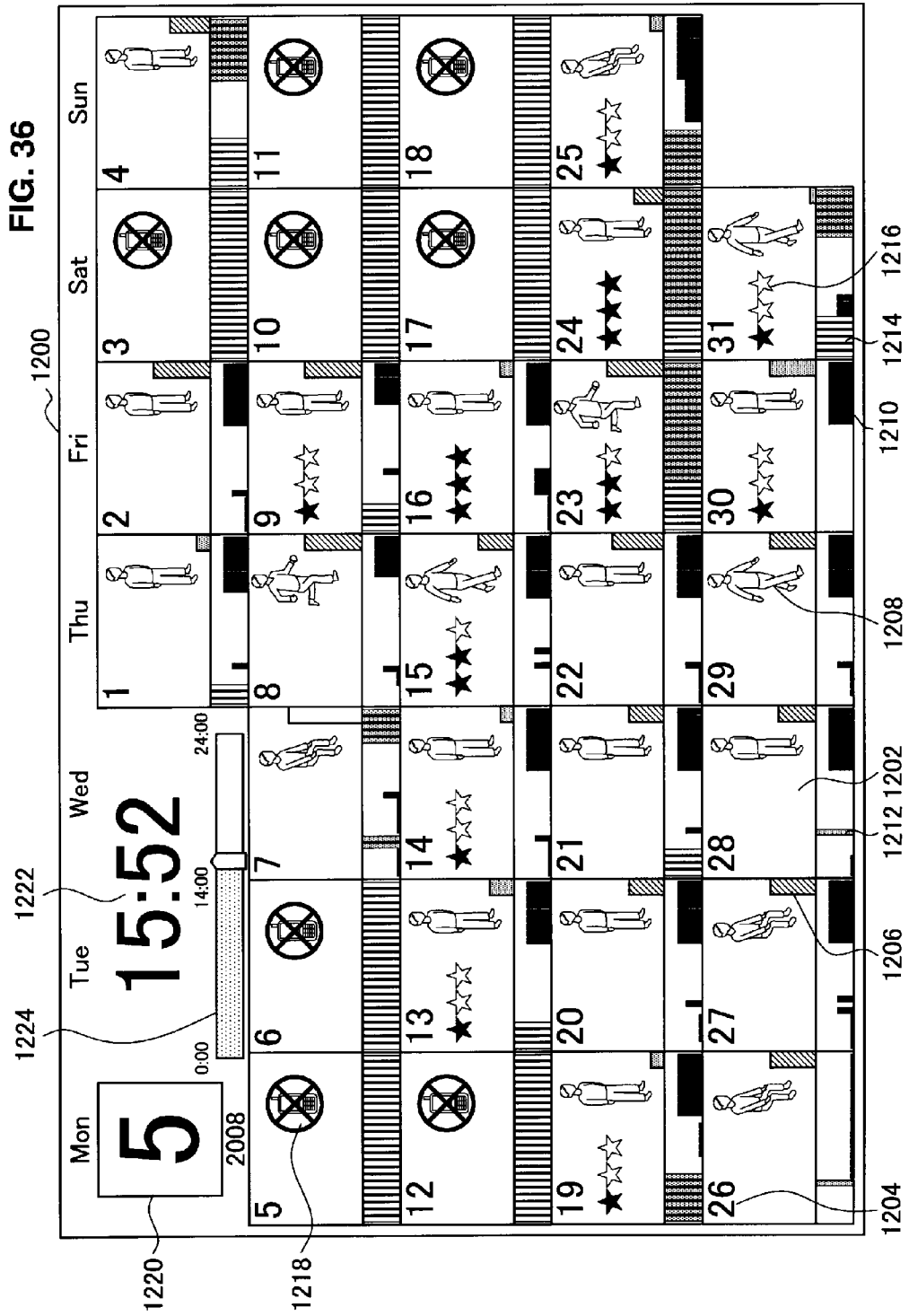
FIG. 36 is an explanatory view showing a display screen of the information processing apparatus according to the embodiment.

FIG. 36 is an explanatory view showing, as an example, a display state in which a behavior history of some user can be compared and observed as an example of application. In the example shown in FIG. 36, a behavior history of one month of the same user is arranged in a calendar 1200. The calendar 1200 includes recording data 1202 for each day. The recording data 1202 includes a date 1204, an activity factor 1206, an object 1208, an extraordinary degree 1210, an extraordinary degree 1212, an extraordinary degree 1214, and extraordinary behavior data 1216. The recording data 1202 may also include a non-measurable display 1218. The calendar 1200 also includes a year/month display 1220, a clock 1222, and a time change key 1224.

Figure 37:
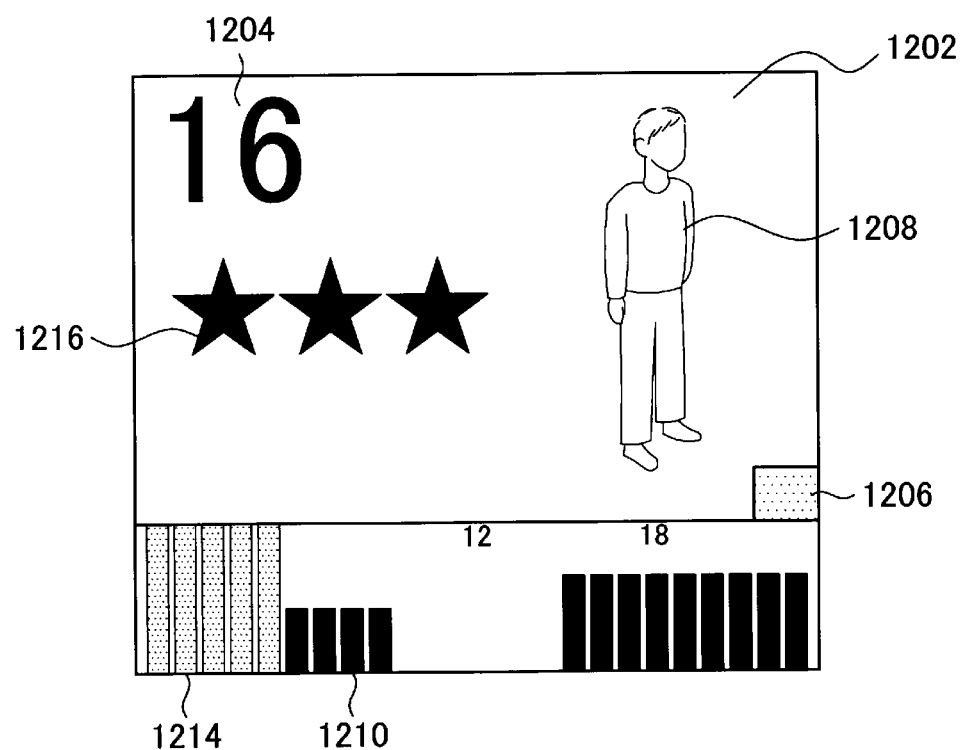
FIG. 37 is an explanatory view showing a display screen of the information processing apparatus according to the embodiment.

FIG. 37 is a diagram showing that the recording data 1202 of only one day of the calendar 1200 is focused on.

The calendar 1200 is created by compiling the recording data 1202 of each day for one month in a general calendar form. The recording data 1202 is data in which the activity factor for each day 1206, the extraordinary degree 1210 and the like are described. The date 1204 is a date on which the recording data 1202 is recorded. The activity factor 1206 is a degree that indicates how active a user is in a day, which will be described later. The object 1208 is a behavior state of a user represented based on the above behavior representation data. The extraordinary degree 1210, the extraordinary degree 1212, and the extraordinary degree 1214 show the degree of extraordinary behavior calculated by the behavior pattern evaluation unit 216 based on sensor data, which will be described later. The extraordinary behavior data 1216 indicates how much extraordinary behavior is exhibited in each day on a scale of 1 to 3. The non-measurable display 1218 is a display indicating that recorded data could not be recorded due to various circumstances.

The year/month display 1220 represents the year and month in which the calendar 1200 is displayed. The clock 1222 displays the displayed current time. The time change key 1224 is a key to change the display to a time when behavior representation data should be grasped by the display of an object.

Figure 38:
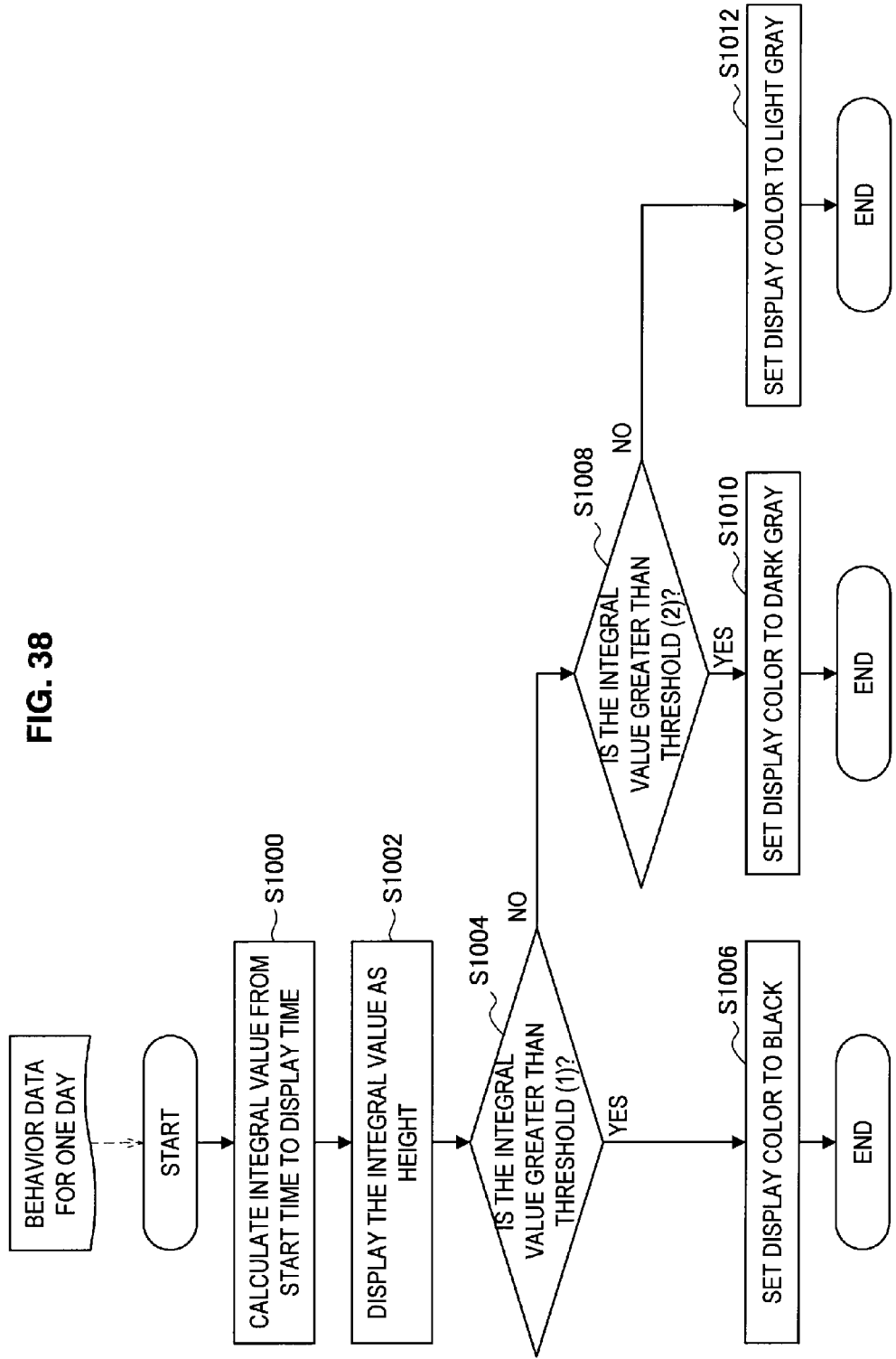
FIG. 38 is an explanatory view showing the flow concerning the function of the information processing apparatus according to the embodiment.

First, the above activity factor 1206 will be described with reference to FIG. 38. FIG. 38 is a flow chart about the display method of the activity factor 1206. Behavior data that determines an activity factor for one day includes, for example, the number of steps and the total walk time. From a recognition result of behavior of moving on a train, the time on a train and the number of stations can be considered. These indexes may be used alone or in combination. The above behavior data can be sensed by the behavior sensing unit 106. The above behavior data is transmitted from the behavior sensing unit 106 to the data control unit 118. The data control unit 118 first calculates an integral value from the recording start time to the display time based on behavior data for one day (S1000). Next, the data control unit 118 displays the integral value as a height (S1002). Next, the data control unit 118 determines whether the activity factor 1206 is equal to or more than some threshold (1) (S1004). If the activity factor 1206 is equal to or more than the threshold (1), the data control unit 118 changes the color displayed on the calendar 1200 to black (S1006). Next, if the activity factor 1206 is not equal to or more than the threshold (1), the data control unit 118 determines whether the activity factor 1206 is equal to or more than some threshold (2) (S1008). If the activity factor 1206 is equal to or more than the threshold (2), the data control unit 118 changes the color displayed on the calendar 1200 to dark gray (S1010). Next, if the activity factor 1206 is not equal to or more than the threshold (2), the data control unit 118 changes the color displayed on the calendar 1200 to light gray (S1012).

Figure 39:
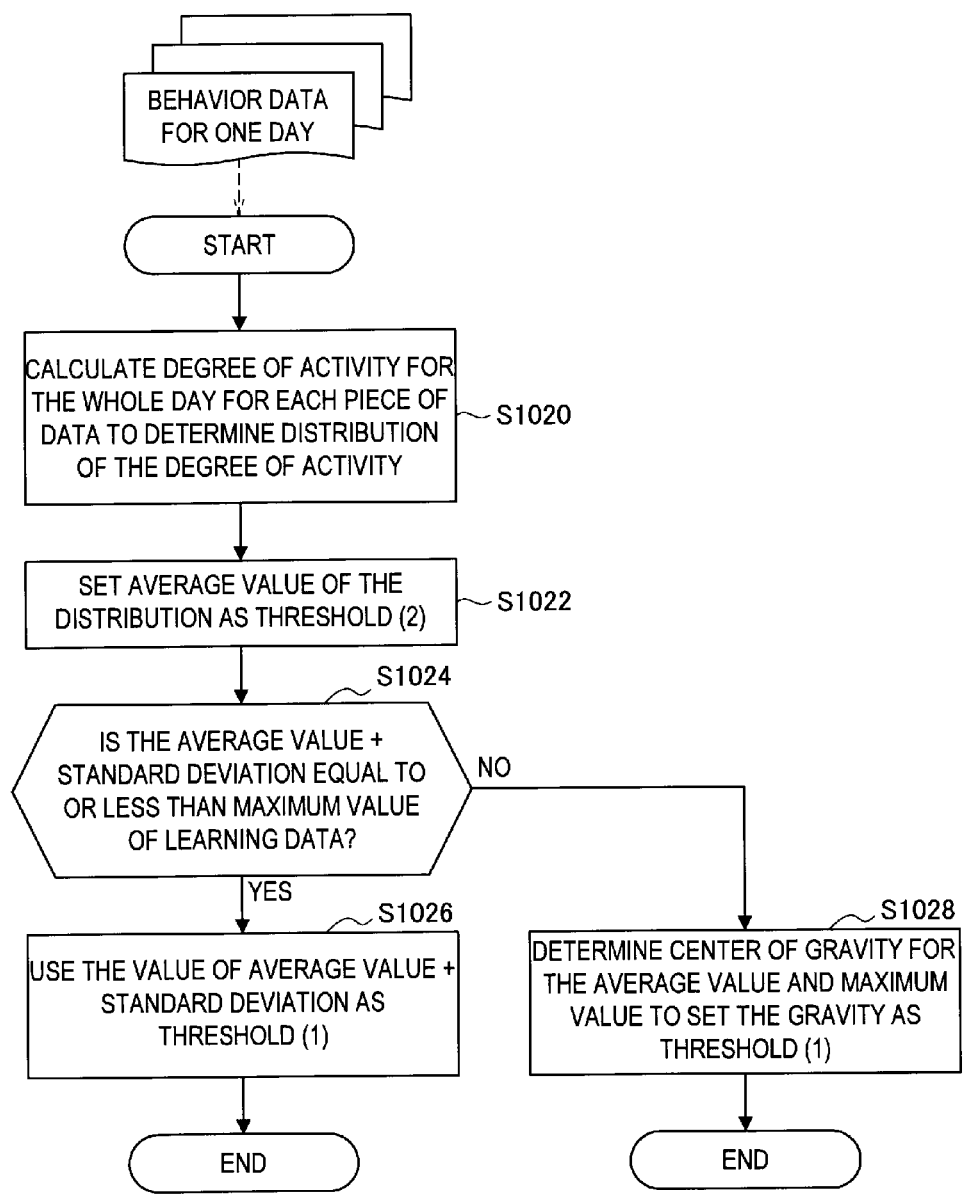
FIG. 39 is an explanatory view showing the flow concerning the function of the information processing apparatus according to the embodiment.

Next, the setting method of the threshold will be described with reference to FIG. 39. FIG. 39 is a flow chart about the setting method of the threshold. First, the data control unit 118 acquires a plurality of pieces of behavior data for one day. Then, the data control unit 118 calculates an activity factor for one day for each piece of the data to determine a distribution of activity factor (S1020). Next, the data control unit 118 sets an average value of the distribution as the threshold (2) (S1022). Next, the data control unit 118 determines whether the average value+standard deviation is equal to or less than the maximum value of the plurality of pieces of behavior data for one day (S1024). If the average value+standard deviation is equal to or less than the maximum value, the data control unit 118 uses the value of the average value+standard deviation as the threshold (1) (S1026). If the average value+standard deviation is not equal to or less than the maximum value at S1024, the center of gravity determined for the average value and maximum value is set as the threshold (1) (S1028). When n thresholds are defined, the I-th threshold may be set as the average value+standard deviation or as an internally dividing point of I/n:(n−I)/n of the average value and maximum value.

Figure 40:
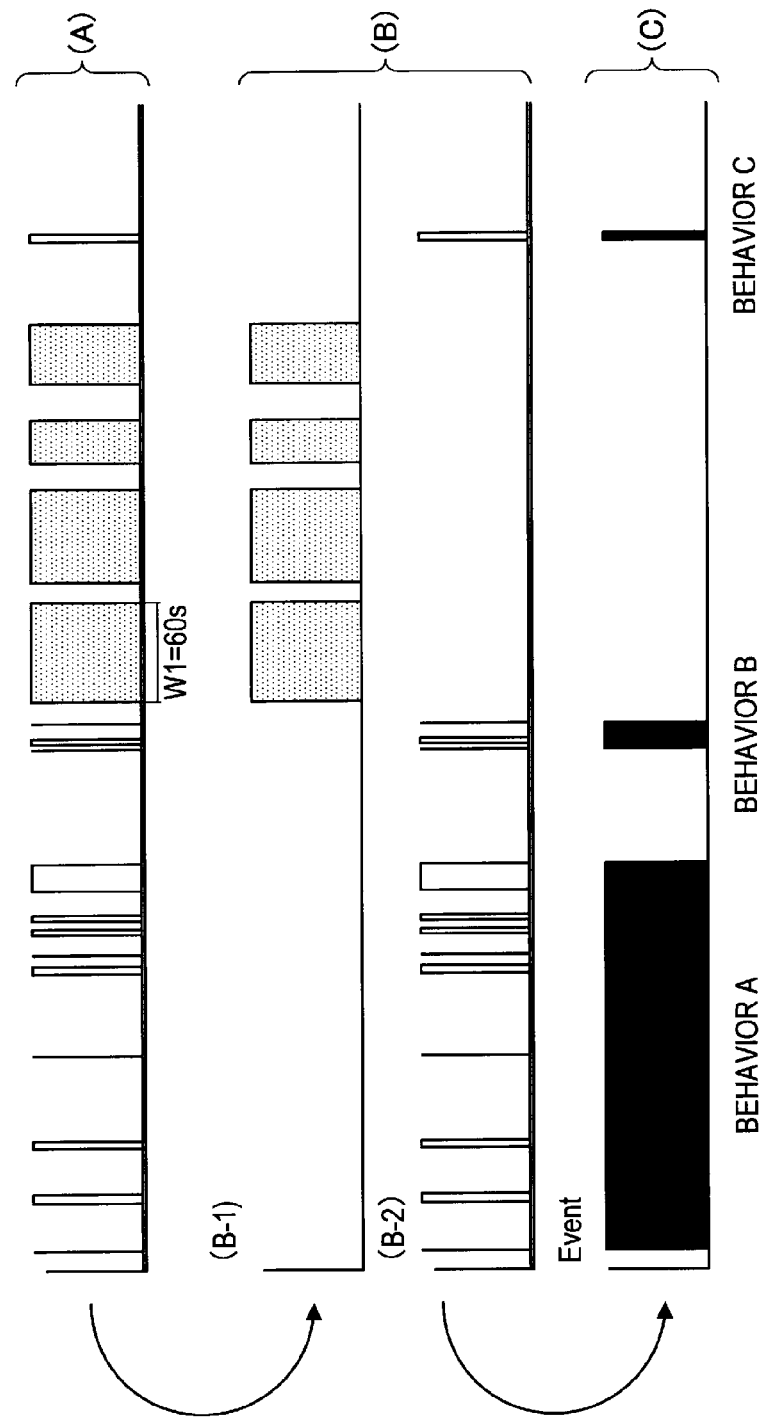
FIG. 40 is an explanatory view showing the flow concerning the function of the information processing apparatus according to the embodiment.

Next, the calculation method of the extraordinary behavior data 1216 will be described. First, an overview of processing of extraordinary behavior data will be provided with reference to FIG. 40. FIG. 40A is a diagram showing data divided into each interval (hereinafter, referred to as a unit) in which one act of behavior is exhibited continuously at specific intervals of sensor data generated by the sensor data generation unit 108. FIG. 40A shows that one unit W1 has 60 seconds.

Then, as shown in FIG. 40B, the behavior classification unit 218 performs threshold processing. That is, the behavior classification unit 218 classifies long units to (B-1) and short units to (B-2). Next, as shown in FIG. 40C, the behavior classification unit 218 combines units classified to (B-2) within the range of some period. Then, as shown in FIG. 40C, the behavior classification unit 218 classifies behavior into Behavior A, Behavior B, and Behavior C with different numbers of combination. Then, the extraordinary behavior extraction unit 220 sets, for example, 2 for Behavior A on a scale of 1 to 3. Then, the extraordinary behavior extraction unit 220 sets, for example, 1 for Behavior B on a scale of 1 to 3. Then, the extraordinary behavior extraction unit 220 displays 2, which is the maximum value of the evaluation, on the calendar 1200 as the extraordinary behavior data 1216. The extraordinary behavior data 1216 may not be the maximum value and, for example, an average value or a total value of scores of all units on the measuring day may be used.

Figure 41:
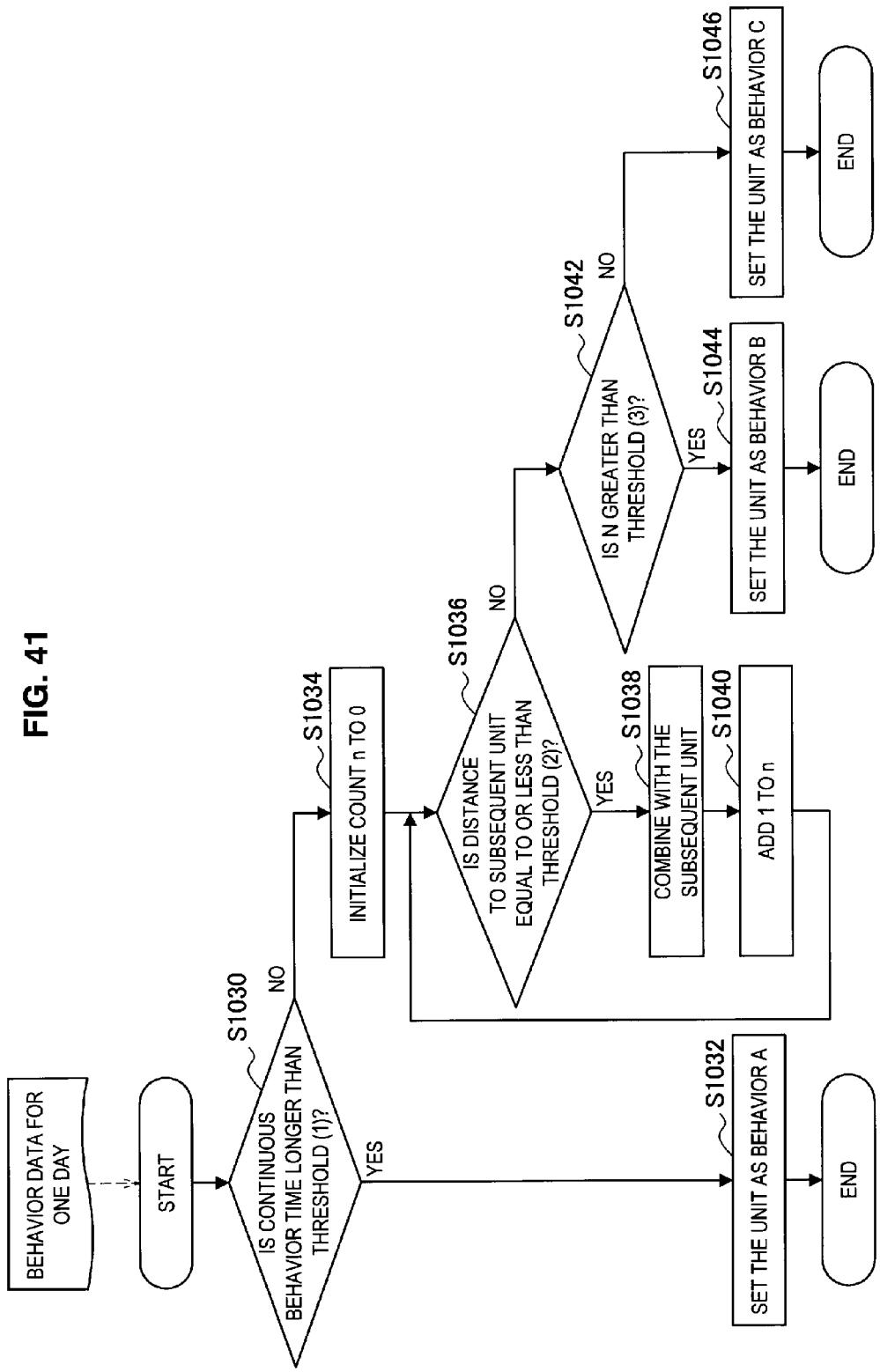
FIG. 41 is an explanatory view showing the flow concerning the function of the information processing apparatus according to the embodiment.

Next, the concrete calculation method of the extraordinary behavior data 1216 will be described with reference to FIG. 41. FIG. 41 is a flow chart about classification into the above Behavior A, Behavior B, and Behavior C. First, the behavior classification unit 218 determines whether the continuous behavior time is longer than some threshold (1) based on behavior data for one day (S1030). If the continuous behavior time is longer than the threshold (1), the extraordinary behavior extraction unit 220 sets the unit as Behavior A (S1032).

Then, if the continuous behavior time is not longer than the threshold (1), the behavior classification unit 218 initializes the combined count to 0 (S1034). Next, the behavior classification unit 218 determines whether the distance to the chronologically subsequent unit is equal to or less than a threshold (2) (S1036). If the distance to the chronologically subsequent unit is equal to or less than the threshold (2), the behavior classification unit 218 combines the unit with the subsequent unit (S1038). Then, the behavior classification unit 218 adds 1 to n (S1040). Then, returning to S1036, a similar determination is made. If the distance to the subsequent unit is equal to or more than the threshold (2), whether n is more than a threshold (3) is determined (S1042). Then, if n is more than the threshold (3), the unit is set as Behavior B. If n is not more than the threshold (3), the unit is set as Behavior C. The thresholds (1) to (3) are determined by, for example, a technique described later.

Figure 42:
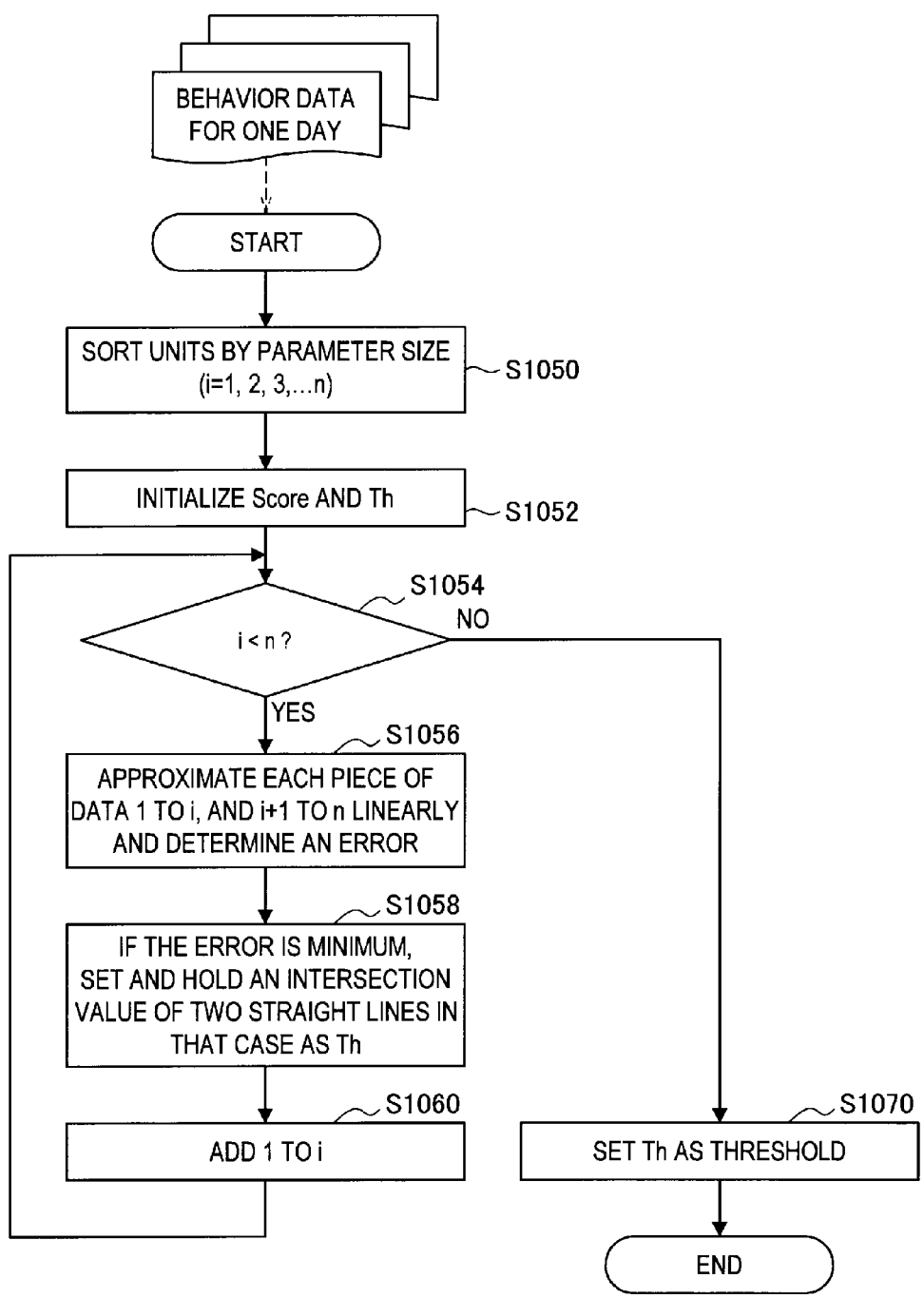
FIG. 42 is an explanatory view showing the flow concerning the function of the information processing apparatus according to the embodiment.

Next, a calculation example of the thresholds will be described with reference to FIG. 42. FIG. 42 is a flow chart showing the calculation method of the thresholds. First, based on behavior data for one day (i=1, 2, 3, . . . , n), the behavior classification unit 218 sorts units by magnitude of some parameter (S1050). Next, the behavior classification unit 218 initializes Score and Th (S1052). Next, the behavior classification unit 218 determines whether i<n (S1054). If i<n holds, the behavior classification unit 218 determines an error by linearly approximating each piece of data 1 to i and i+1 to n (S1056). Next, if the error is minimum, the behavior classification unit 218 sets and holds an intersection value of two straight lines in that case as Th (S1058). Next, the behavior classification unit 218 adds 1 to i (S1060) and a determination at S1054 is made again. If, on the other hand, i<n does not hold, the behavior classification unit 218 sets Th as a threshold (S1070).

Figure 43:
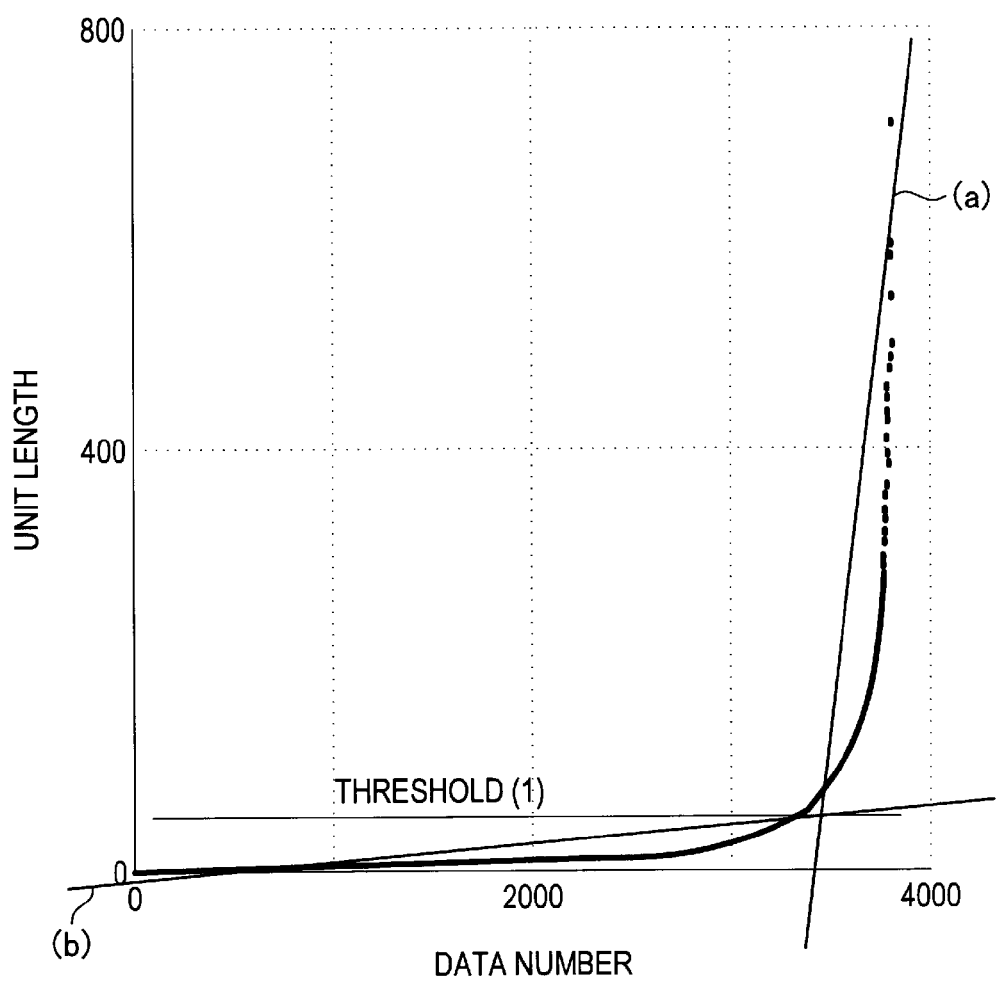
FIG. 43 is an explanatory view showing a graph diagram used for processing of the information processing apparatus according to the embodiment.

Here, the calculation method of a threshold will be described with reference to a graph in FIG. 43. FIG. 43 shows a graph obtained by plotting the unit length of some type of behavior with respect to the data number. First, the behavior classification unit 218 divides data into two portions at the i-th piece of data and each portion is linearly approximated like (a) and (b). Then, the behavior classification unit 218 calculates two straight lines for each point and can set the unit length at the intersection point of the two straight lines when the square error is minimum as the threshold (1).

Next, the calculation method of the extraordinary behavior data 1216 will be described with reference to FIG. 44. Here, processing on the above Behavior B will be described as an example.

First, the behavior classification unit 218 determines whether a determination score of a unit of Behavior B is equal to or more than a threshold (4) (S1080). If the determination score is equal to or more than the threshold (4), the extraordinary behavior extraction unit 220 sets the score of the unit to 3 (S1082). That is, the data control unit 118 causes the display unit 150 to display three stars for the extraordinary behavior data 1216 on the calendar 1200.

Here, the behavior classification unit 218 determines the determination score by, as an example, Formula 2 below:

$$\text{Determination score} = W1 \times \text{unit length} + W2 \times \text{count number} \quad \text{(Formula 2)}$$

W1 and W2 are weighting factors for predetermined weighting. The count number is the number of units before combination contained in Behavior B.

Figure 44:
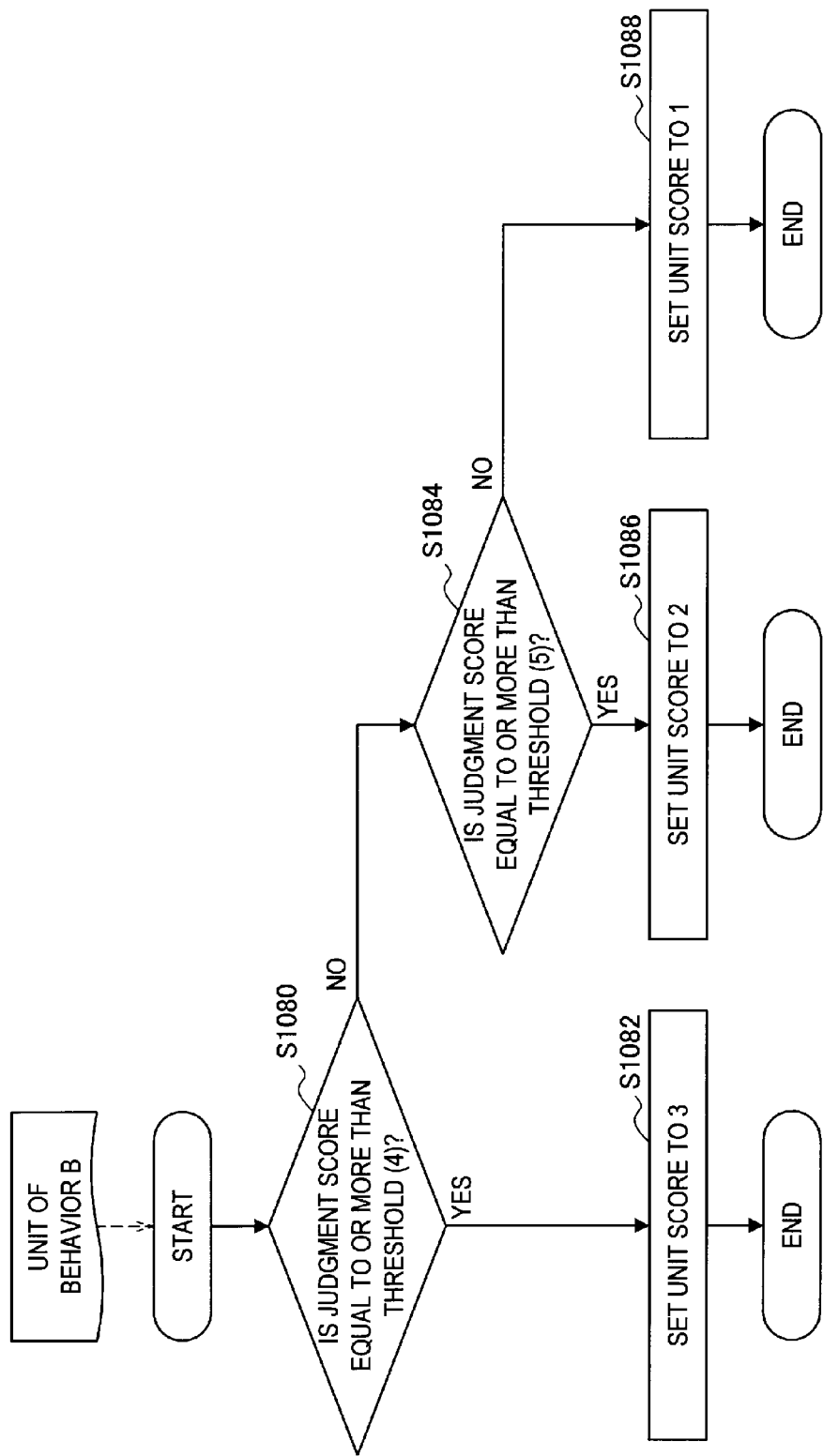
FIG. 44 is an explanatory view showing the flow concerning the function of the information processing apparatus according to the embodiment.

The description will continue by returning to the flow chart in FIG. 44. If, according to the determination made at S1080, the determination score is not equal to or more than the threshold (4), the behavior classification unit 218 determines whether the determination score is equal to or more than a threshold (5) (S1084). If the determination score is equal to or more than the threshold (5), the extraordinary behavior extraction unit 220 sets the score of the unit to 2 (S1086). If, on the other hand, the determination score is not equal to or more than the threshold (5), the extraordinary behavior extraction unit 220 sets the score of the unit to 1 (S1088). In the above example, the determination score is evaluated on a scale of 1 to 3, but the number of thresholds may further be increased to evaluate the determination score more finely.

Figure 45:
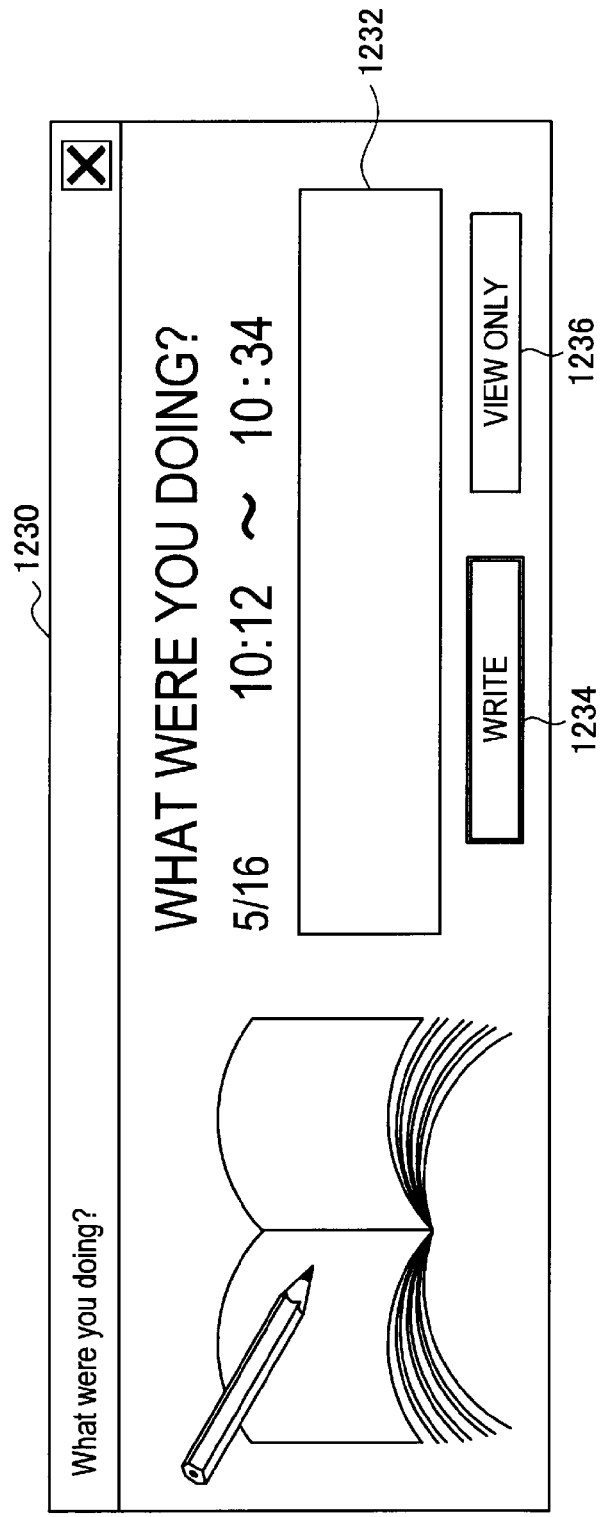
FIG. 45 is an explanatory view showing a display screen of the information processing apparatus according to the embodiment.

The extraordinary behavior data 1216 is determined as described in the above example. Continuing the description with reference to FIG. 36, if the number of stars of the extraordinary behavior data 1216 is, for example, three, a comment entry field 1230 as shown in FIG. 45 may be displayed by a predetermined operation. The user can enter a comment in a frame 1232. After a comment entry, the user can press predetermined selection buttons 1234 and 1236. In the above example, a case in which the number of stars is three is described, but the number of stars may be made selectable by the user.

By detecting extraordinary behavior as described above, it becomes possible to make a more detailed classification of, for example, an act of behavior of "walking". For example, a classification can be made of "just walking to go somewhere" or "walking while doing something". That is, the user can obtain more detailed information about past behavior by detecting extraordinary behavior.

Next, the calculation method of the extraordinary degree 1210 (may be 1212 or 1214 and this also applies below) will be described. First, an overview of processing of the extraordinary degree will be described with reference to FIGS. 46 and 47.

Figure 46A:
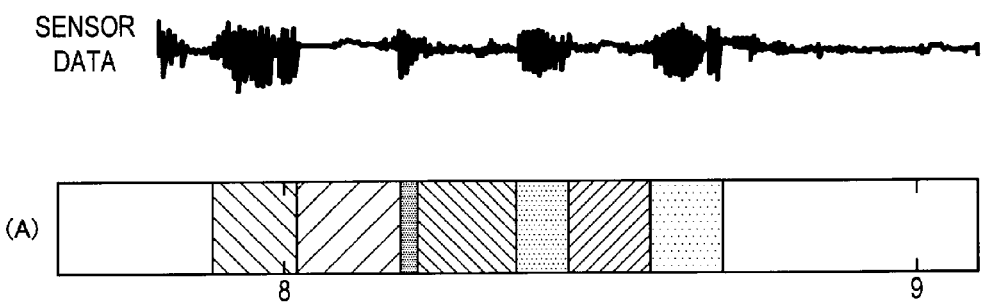
FIG. 46A is an explanatory view showing a graph diagram used for processing of the information processing apparatus according to the embodiment.
Figure 46B:
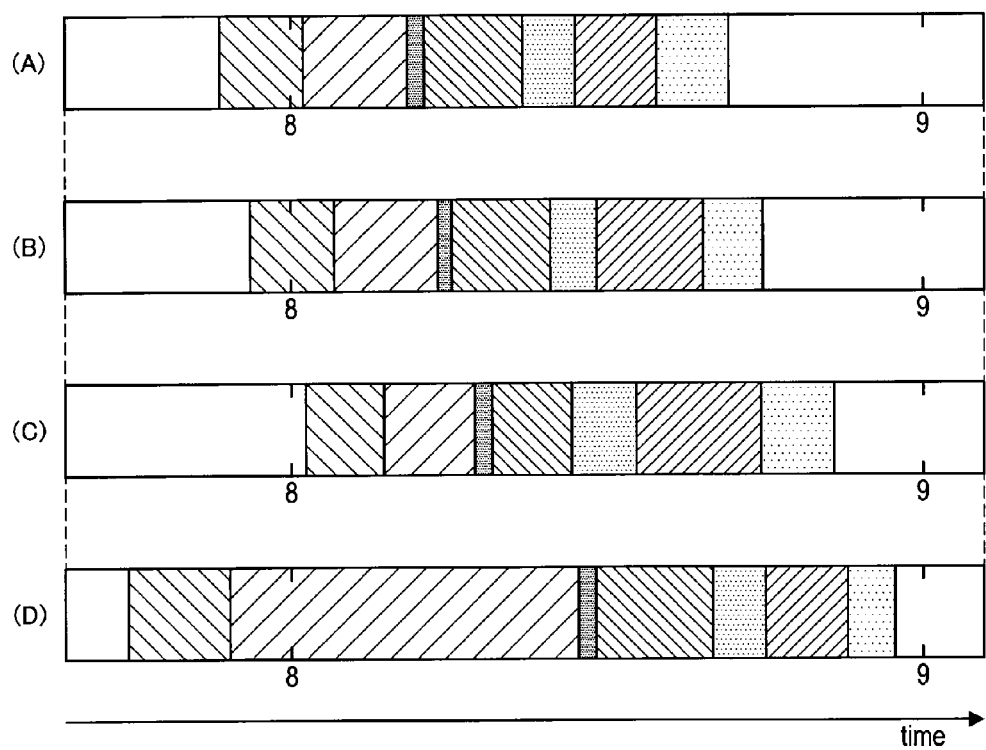
FIG. 46B is an explanatory view showing a graph diagram used for processing of the information processing apparatus according to the embodiment.

FIGS. 46A and 46B are diagrams illustrating shifts of behavior patterns day by day. First, as shown in FIG. 46A, the sensor data generation unit 108 generates sensor data (1) at a specific time in a day. To simplify a description, the description below is based on (A) in which sensor data is classified by unit. (B), (C), and (D) are data of units on behavior on other days than that of (A) by aligning the axis of time. In (A), (B), and (C), the user exhibits almost the same behavior. (D) shows, when compared with (A), (B), and (C), a different behavior pattern. In processing of the extraordinary degree described below, for example, (A), (B), and (C) are determined to have time shifts permitted for each user and not to be extraordinary. Then, for example, (D) is determined that user's behavior is extraordinary.

Figure 47A:
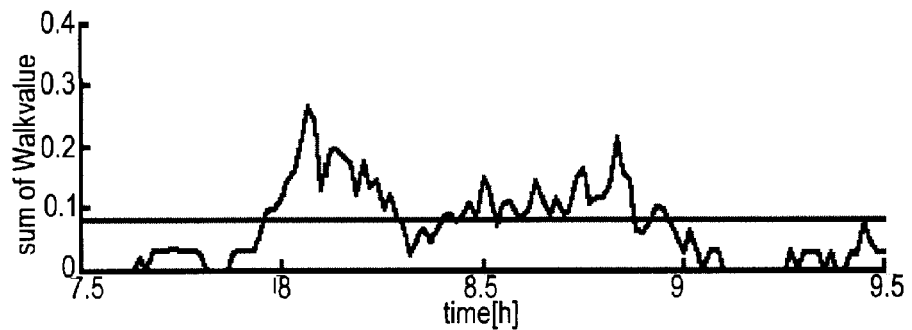
FIG. 47A is an explanatory view showing a graph diagram used for processing of the information processing apparatus according to the embodiment.
Figure 47B:
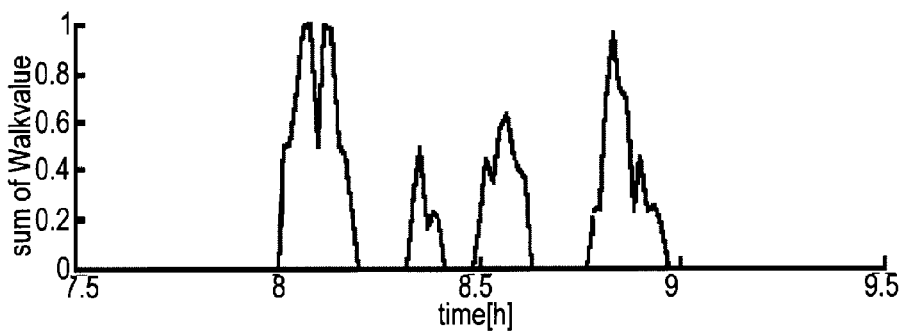
FIG. 47B is an explanatory view showing a graph diagram used for processing of the information processing apparatus according to the embodiment.
Figure 47C:
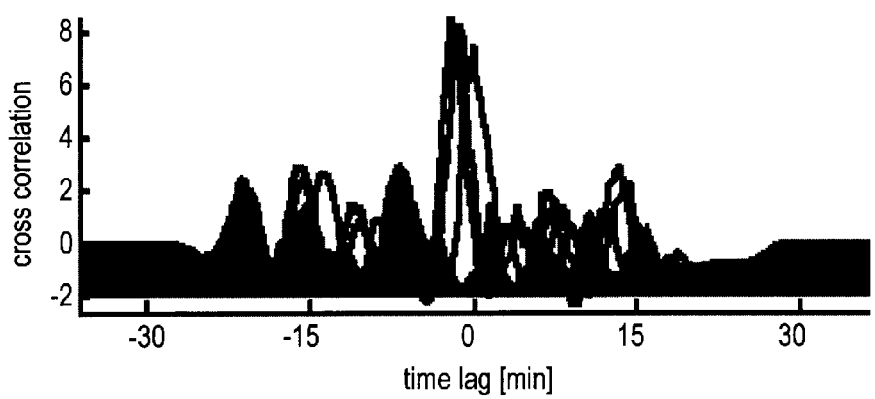
FIG. 47C is an explanatory view showing a graph diagram used for processing of the information processing apparatus according to the embodiment.

FIG. 47 is a diagram illustrating a method of calculating the extraordinary degree based on a graph. First, as shown in FIG. 47A, the behavior pattern generation unit 214 averages sensor data for several days by addition. Then, the behavior pattern generation unit 214 extracts a time zone particularly focused on. Then, as shown in FIG. 47B, the behavior pattern generation unit 214 generates a template for the focused time zone, that is, a behavior pattern. Next, the behavior pattern evaluation unit determines a correlation coefficient between the behavior pattern and received sensor data. The correlation coefficient will become an extraordinary degree. FIG. 47C illustrates (A) to (D) in FIG. 46 in more detail. If plots in solid black and other solid line plots shown in FIG. 47C are obtained, both have different behavior of the correlation coefficient from that of others and thus, the correlation coefficient becomes an extraordinary degree.

Figure 48:
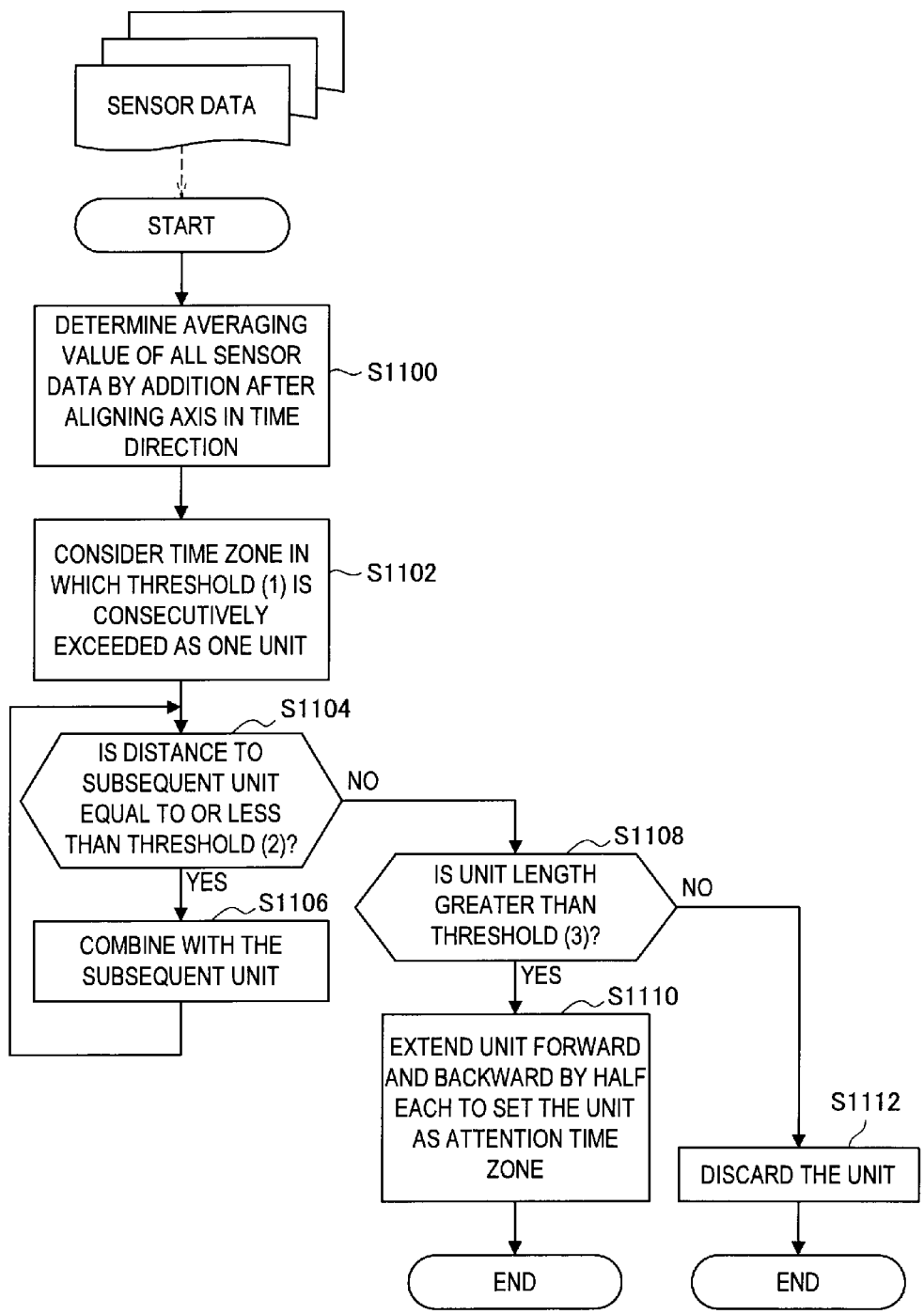
FIG. 48 is an explanatory view showing the flow concerning the function of the information processing apparatus according to the embodiment.

The detection method of the focused time zone will be described with reference to FIG. 48. FIG. 48 is a flow chart about the detection method of the focused time zone.

First, the behavior pattern generation unit 214 determines an average value by adding all sensor data and aligning the axis of the time direction (S1100). Next, the behavior pattern generation unit 214 considers a time zone that continuously exceeds some threshold (1) as one unit (S1102). Next, the behavior pattern generation unit 214 determines whether the distance of the unit to the chronologically subsequent unit is equal to or less than some threshold (2) (S1104). If the distance is equal to or less than the threshold (2), the behavior pattern generation unit 214 combines the unit with the subsequent unit (S1106). Then, the behavior pattern generation unit 214 performs processing at S1104 again.

If, on the other hand, the distance is not equal to or less than the threshold (2) at S1104, the behavior pattern generation unit 214 determines whether the unit length is greater than the threshold (3) (S1108). If the unit length is greater than the threshold (3), the behavior pattern generation unit 214 extends the unit by a predetermined amount to set the unit as an attention time zone. If the unit length is not greater than the threshold (3) at S1108, the behavior pattern generation unit 214 discards the unit (S1112). The threshold (1), threshold (2), and threshold (3) are determined from statistical values such as an average value, standard deviation and the like.

Figure 49:
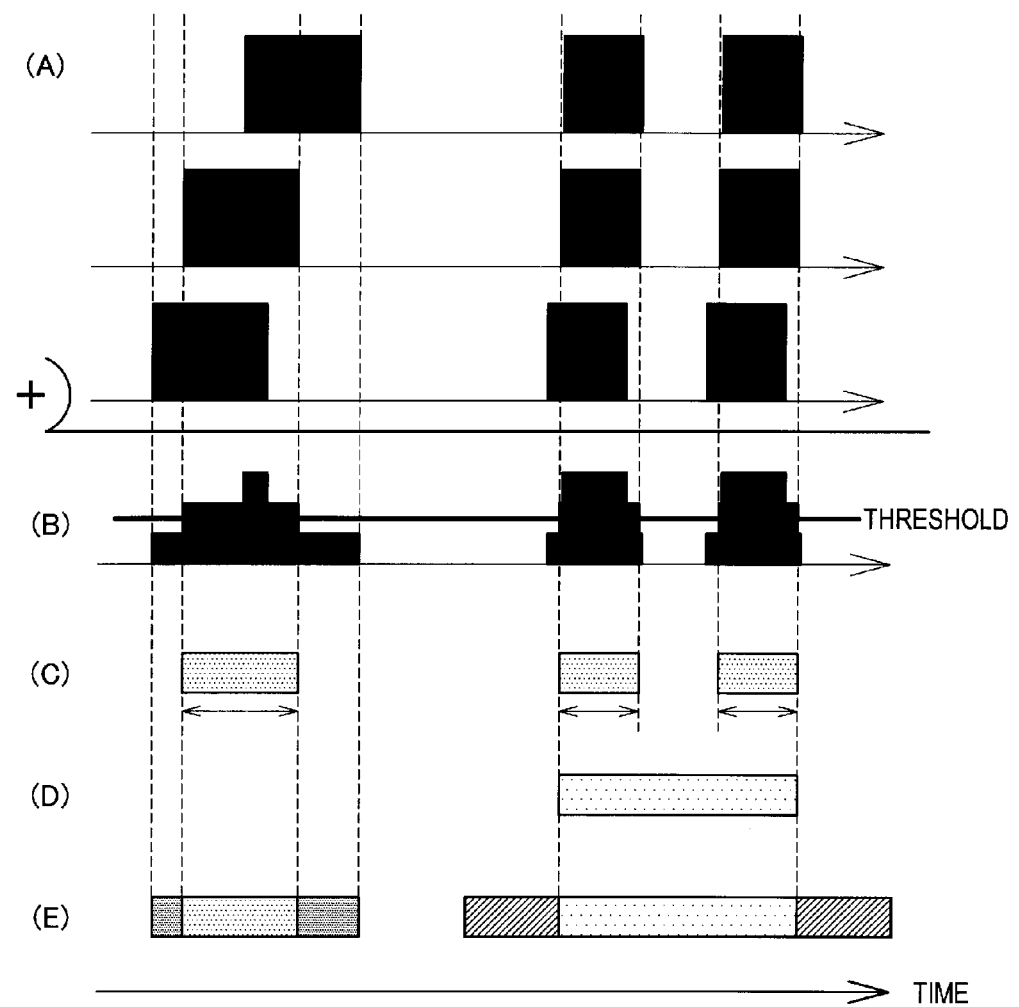
FIG. 49 is an explanatory view showing a graph diagram used for processing of the information processing apparatus according to the embodiment.

Next, the detection method of the above focused time zone will further be described with reference to FIG. 49. FIG. 49 is a diagram illustrating addition and the processing method after the addition about the detection method of the focused time zone based on units with respect to the time on different days.

As shown in FIG. 49A, different units for three days are present. The behavior pattern generation unit 214 adds, as shown in (B), three pieces of data. The behavior pattern generation unit 214 extracts, as shown in (C), time zones in which the threshold is exceeded. Then, the behavior pattern generation unit 214 combines, as shown in (D), permissible time shifts. Further, in consideration of time shifts shown in (E) as well, the behavior pattern generation unit 214 detects attention time zones by extending units more than those in (B).

Figure 50:
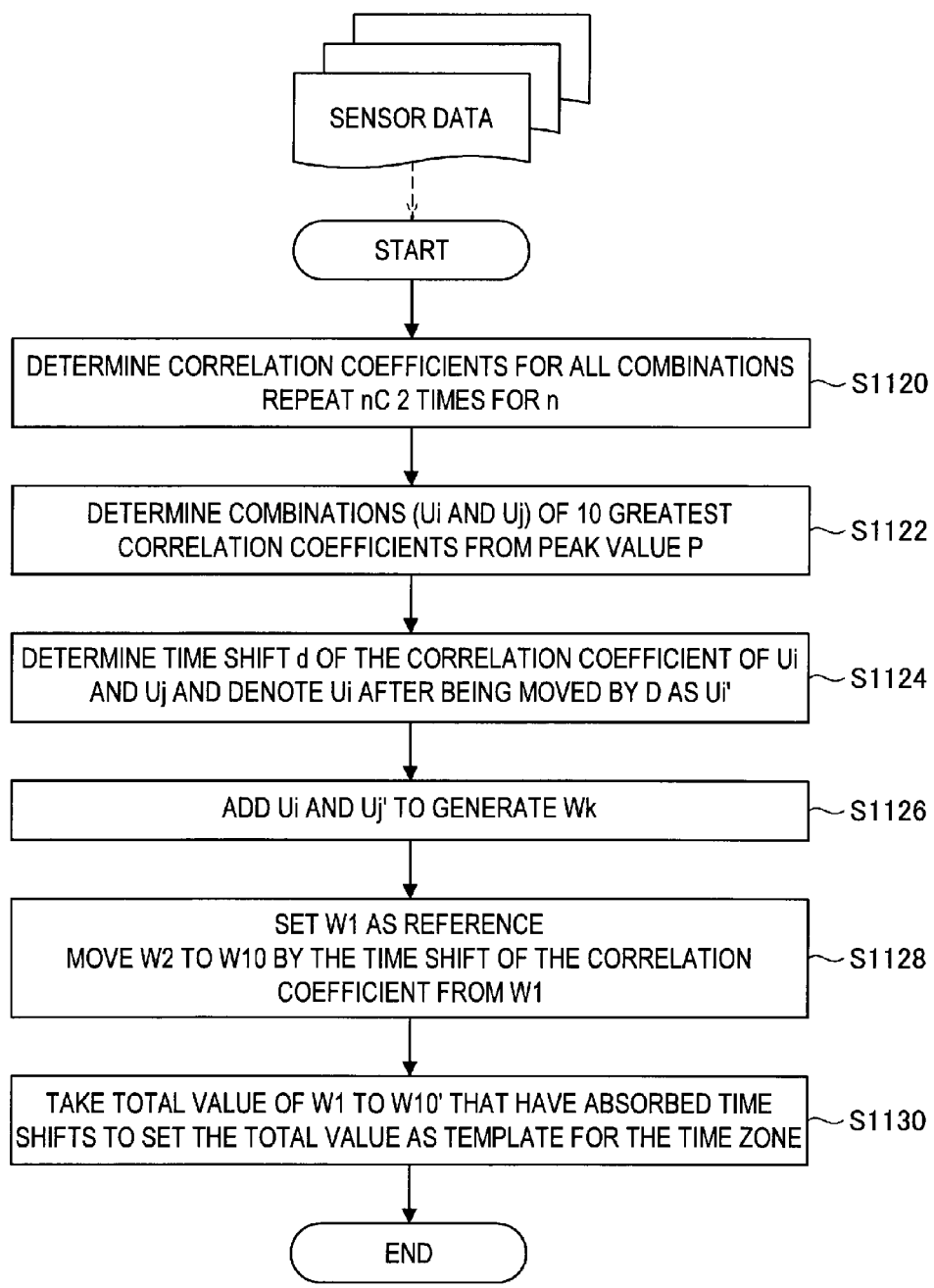
FIG. 50 is an explanatory view showing the flow concerning the function of the information processing apparatus according to the embodiment.

Next, the calculation method of a behavior pattern will be described. First, the calculation method of a behavior pattern will be described with reference to FIG. 50. FIG. 50 is a flow chart illustrating the calculation method of a behavior pattern.

The behavior pattern evaluation unit 216 determines cross-correlation coefficients for all combinations of sensor data to be used for processing (S1120). If there are n pieces of sensor data, the behavior pattern evaluation unit 216 repeats the above operation $_nC_2$ times (S1120). Then, the behavior pattern generation unit 214 determines 10 combinations (Ui and Uj) in descending order of peak value P of cross-correlation coefficients (S1122). While the number of combinations is 10, the number is not limited to this value.

Next, the behavior pattern evaluation unit 216 determines a time shift d of the cross-correlation coefficient of Ui and Uj, and Ui after being moved in the time direction by d is denoted as Ui' (S1124). Next, the behavior pattern evaluation unit 216 adds Ui and Uj' to generate Wk. The behavior pattern generation unit 214 uses W1 as a reference to move W2 to W10 by the time shift from W1. The behavior pattern generation unit 214 takes a total value of W1 to W10' that factor in time shifts as described above and sets the total value as a template for the time zone, that is, a behavior pattern.

Figure 51:
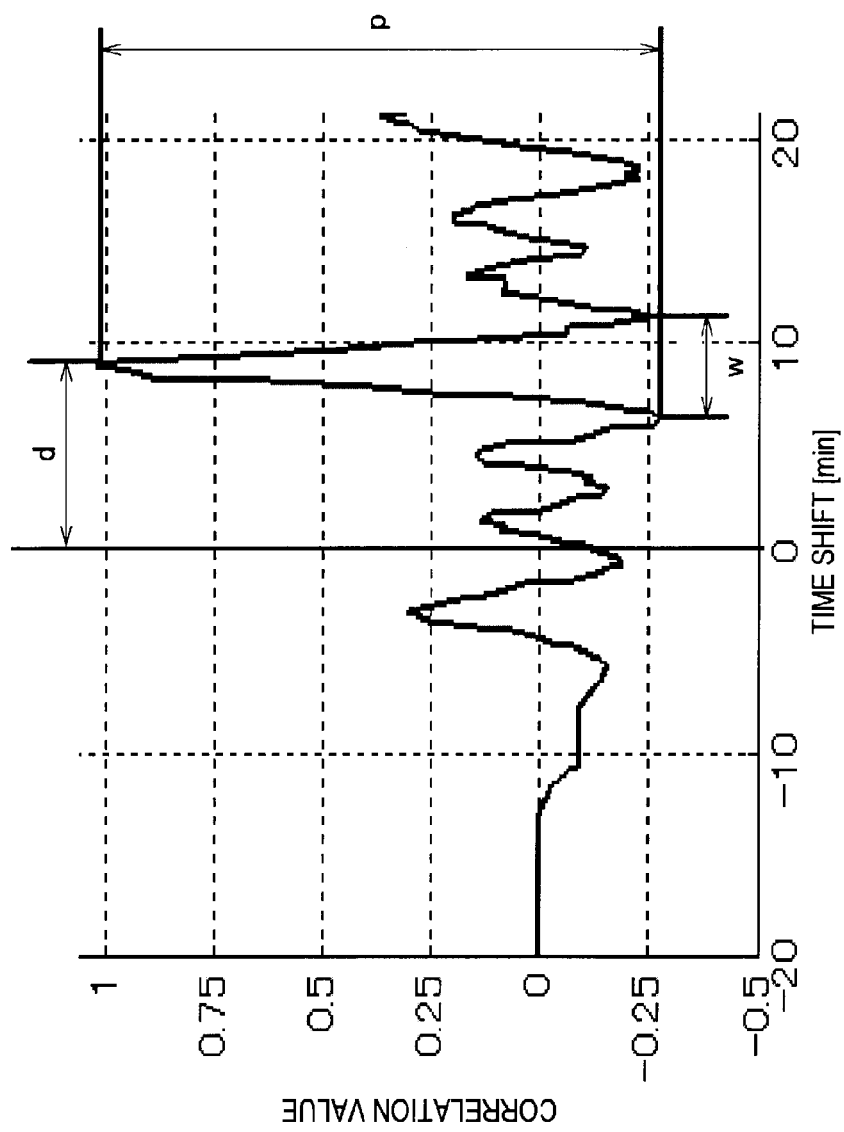
FIG. 51 is an explanatory view showing a graph diagram used for processing of the information processing apparatus according to the embodiment.

FIG. 51 is a diagram illustrating the time shift d of cross-correlation coefficients and the peak value P of cross-correlation coefficients. FIG. 51 is an example of plotting cross-correlation coefficients with respect to time shifts. By considering time shifts in this manner, slight time shifts due to the measuring day can be absorbed when a plurality of sensor data is gathered. As a result, many pieces of data can be added so that the SN ratio can be improved.

Figure 52:
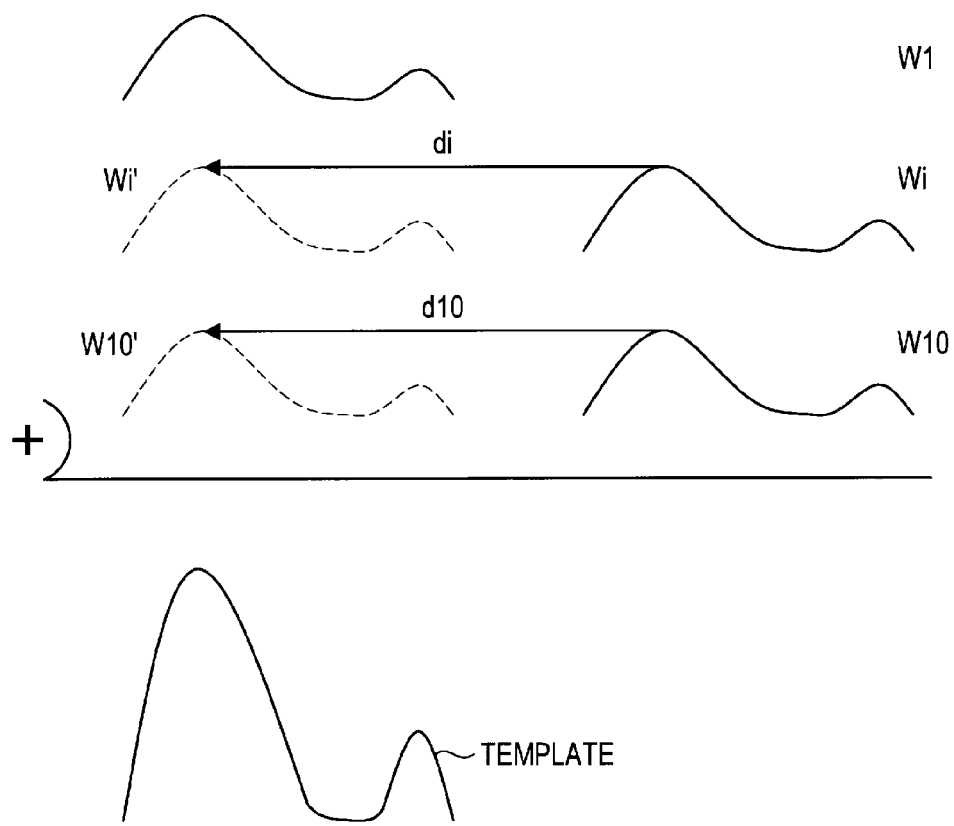
FIG. 52 is an explanatory view showing a graph diagram used for processing of the information processing apparatus according to the embodiment.

FIG. 52 briefly illustrates the calculation method of a behavior pattern. That is, the behavior pattern evaluation unit 216 makes a time shift correction of di for Wi with respect to W1. The behavior pattern evaluation unit 216 makes a time shift correction of d10 for W10 with respect to W1. The behavior pattern evaluation unit 216 adds W1, Wi' (i is an integer between 2 and 9), and W10' to generate a template, that is, a behavior pattern.

Figure 53:
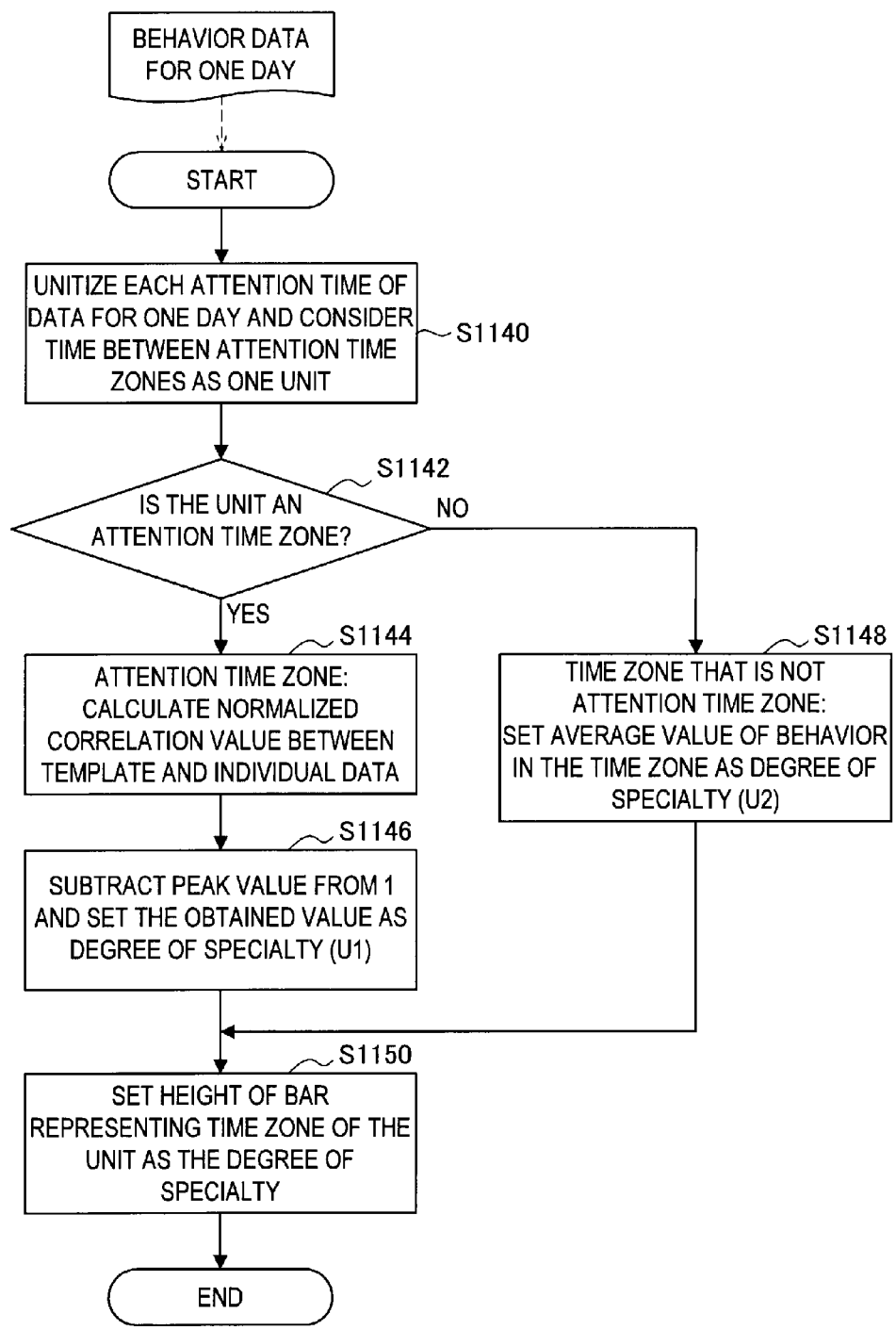
FIG. 53 is an explanatory view showing the flow concerning the function of the information processing apparatus according to the embodiment.

FIG. 53 is a flow chart illustrating a method of calculating a degree of deviation from a typical behavior pattern. First, the behavior pattern generation unit 214 that has received behavior data for one day as sensor data unitizes the data for one day for each attention time zone and considers a time between attention time zones (a time other than attention time zones) as a unit as well (S1140). Next, the behavior pattern generation unit 214 determines whether the unit is an attention time zone (S1142). If the determination is correct, the behavior pattern evaluation unit 216 calculates a normalized cross-correlation coefficient between the template (behavior pattern) and individual data in the attention time zone (S1144). Next, the behavior pattern evaluation unit 216 subtracts a peak value from 1 and sets the obtained value as a degree of specialty (U1) of the unit (S1146).

If, on the other hand, the determination is not correct at S1142, an average value of behavior in a time zone that is not an attention time zone is set as a degree of specialty (U2) of the unit (S1148). Then, the behavior pattern evaluation unit 216 sets the height of a bar representing the time zone of the unit as the degree of specialty (S1150). In this manner, U1 ands U2 are calculated and the extraordinary degree 1210 as shown in FIG. 37 is displayed on the calendar 1200 by the data control unit 118.

Figure 54:
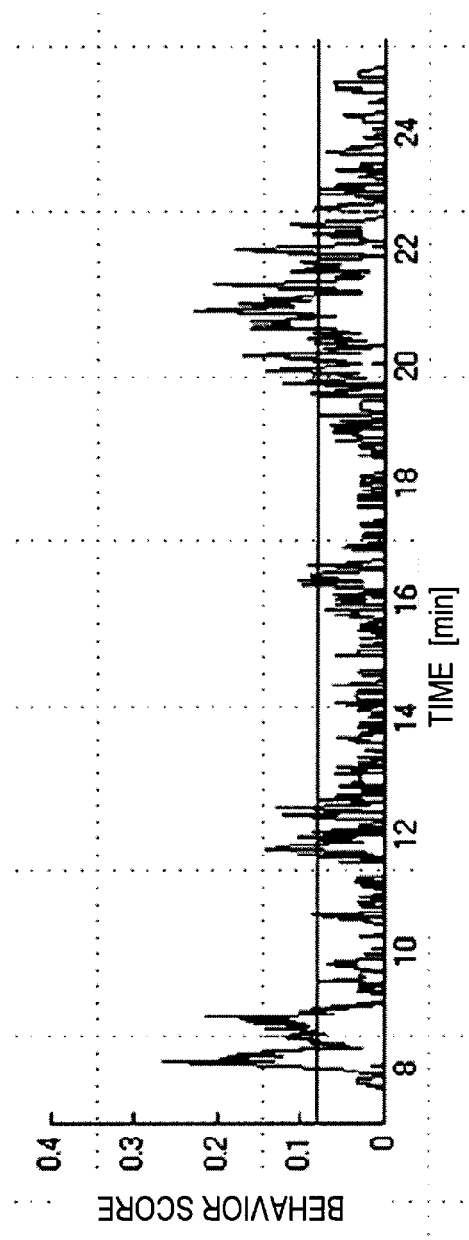
FIG. 54 is an explanatory view showing a graph diagram used for processing of the information processing apparatus according to the embodiment.

FIG. 54 is a diagram showing behavior scores of every hour of a day, that is, sensor data. Based on the data, the extraordinary degree, behavior pattern and the like will be calculated. As a result, the user can predict future behavior to some extent from extraordinary behavior and ordinary behavior.

6. HARDWARE CONFIGURATION EXAMPLE OF INFORMATION PROCESSING APPARATUS 100

Figure 55:
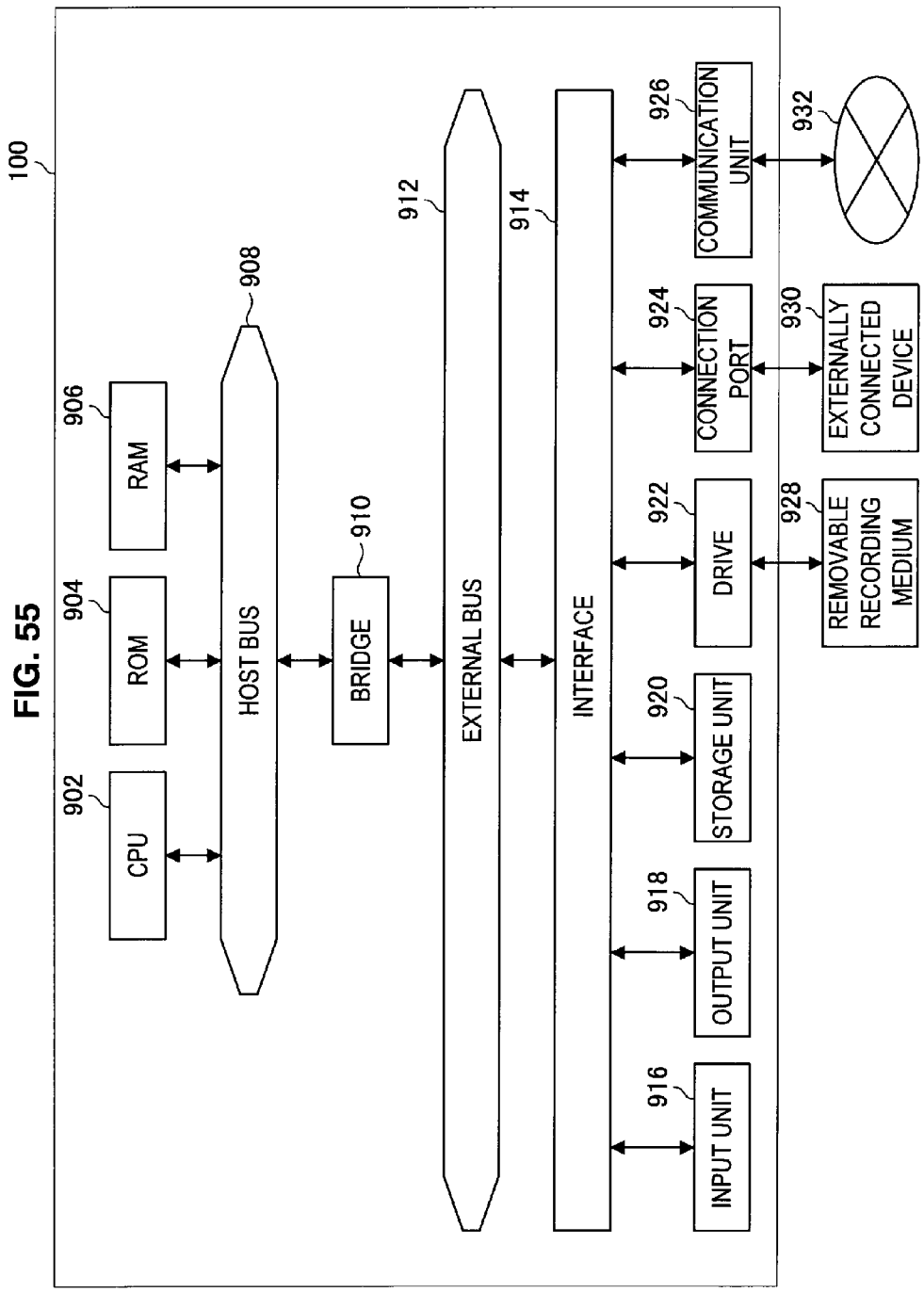
FIG. 55 is an explanatory view showing a hardware configuration example of the information processing apparatus according to the embodiment.

The function of each component of the apparatus can be realized by an information processing apparatus having the hardware configuration shown, for example, in FIG. 55 using a computer program to realize the above function. FIG. 55 is an explanatory view showing the hardware configuration of an information processing apparatus capable of realizing the function held by each component of the apparatus. The form of the information processing apparatus is optional. For example, the form of the information processing apparatus includes a mobile information terminal such as a personal computer, mobile phone, PHS (Personal Handy-phone System), and PDA (Persona, Digital Assistant), game machine, and a variety of home information appliances.

As shown in FIG. 55, the information processing apparatus mainly includes a CPU (Central Processing Unit) 902 and a ROM (Read Only Memory) 904. The information processing apparatus also includes a RAM (Random Access Memory) 906, a host bus 908, a bridge 910, an external bus 912, and an interface 914. Further, the information processing apparatus includes an input unit 916, an output unit 918, the storage unit 126, a drive 922, a connection port 924, and a communication unit 926.

The CPU 902 functions as an arithmetic processing device or a control device and controls an overall operation each component or a portion thereof based on various programs recorded in the ROM 904, the RAM 906, the storage unit 126, or a removable recording medium 928. The ROM 904 stores, for example, programs read into the CPU 902 or data used for operation. The RAM 906 temporarily or persistently stores, for example, programs read into the CPU 902 or various parameters and the like that change as appropriate during execution thereof. These components are mutually connected by, for example, the host bus 908 capable of transmitting data at high speed. The host bus 908 is connected to the external bus 912 whose data transmission speed is relatively low via, for example, the bridge 910.

The input unit 916 is an operation means such as a mouse, keyboard, touch panel, button, switch, and lever. The input unit 916 may also be a remote control means (a so-called remocon) capable of transmitting a control signal by using infrared rays or other radio waves. The input unit 916 is configured of an input control circuit to transmit information input as an input signal by using the above operation unit to the CPU 902.

The output unit 918 is, for example, a display device such as a CRT (Cathode Ray Tube) and LCD (Liquid Crystal Display). The output unit 918 may also be, for example, a display device such as a PDP (Plasma Display Panel) and ELD (Electro-Luminescence Display). The output unit 918 may also be an apparatus capable of visually or aurally notifying a user of acquired information like an audio display apparatus such as a speaker and headphone, printer, mobile phone, and facsimile.

The storage unit 126 is a device to store various kinds of data and is made of, for example, a magnetic storage device such as a hard disk drive (HDD), semiconductor storage device, optical storage device, or magneto-optical device.

The drive 922 is a device that reads information stored in the removable recording medium 928 such as a magnetic disk, optical disk, magneto-optical disk, and semiconductor memory or write information into the removable recording medium 928. The removable recording medium 928 is, for example, a DVD medium, Blu-ray medium, HD DVD medium, memory stick, or an SD memory card (Secure Digital memory card). Naturally, the removable recording medium 928 may be, for example, an IC card (Integrated Circuit card) on which a non-contact IC chip is mounted or an electronic device.

The connection port 924 is a port to connect an externally connected device 930 such as a USB (Universal Serial Bus) port and IEEE 1394 port. The connection port 924 is also a port to connect the externally connected device 930 such as an SCSI (Small Computer System Interface), RS-232C port, and optical audio terminal. The externally connected device 930 is, for example, a printer, mobile music player, digital camera, digital video camera, or IC recorder.

The communication unit 926 is a communication device to connect to a network 932 and, for example, a wire or wireless LAN (Local Area Network) or WUSB (Wireless USB) communication card. The communication unit 926 may also be an optical communication router, ADSL (Asymmetric Digital Subscriber Line) router, or modem for various kinds of communication. The network 932 connected by the communication unit 926 is configured of a network connected by wire or by radio and, for example, the Internet, a home LAN, infrared-ray communication, visible light communication, broadcasting, or satellite communication

7. SUMMARY

Lastly, the functional configuration held by the information processing apparatus 100 according to the present embodiment and operation effects achieved by the functional configuration will briefly be summarized.

First, the functional configuration of the information processing apparatus 100 according to the present embodiment can be expressed as follows: The information processing apparatus 100 includes the storage unit 126, the data control unit 118, and the display control unit 120. The storage unit 126 records predetermined information about a first user and a second user registered by the first user. The data control unit 118 generates a video signal that displays objects of the first user and the second user in a two-dimensional display screen at a distance based on the predetermined information. Thus, a plurality of users can be arranged two-dimensionally in the screen and a user can easily grasp predetermined relationships between the users at a glance. The display control unit 120 displays the video signal in the two-dimensional display screen.

The functional configuration of the information processing apparatus 100 according to the present embodiment can also be expressed as follows: The information processing apparatus 100 also includes the behavior sensing unit 106, the sensor data generation unit 108, the behavior parameter extraction unit 110, and the behavior representation data generation unit 112. The behavior sensing unit 106 senses behavior of the first user. The sensor data generation unit 108 receives behavior information, which is information about behavior of the first user, from the behavior sensing unit 106 and generates sensor data on the behavior information of the first user. The behavior parameter extraction unit 110 extracts behavior parameters that characterize behavior from the sensor data. The behavior representation data generation unit 112 generates behavior representation data represented by using moving images or still images based on the behavior parameters. The data control unit 118 also generates a video signal that displays the behavior representation data as the objects in the two-dimensional display screen at a distance based on the predetermined data. Thus, the object of the first user is displayed based on behavior currently being exhibited by the first user. That is, the user can further grasp a plurality of pieces of information at a time.

The functional configuration of the information processing apparatus 100 according to the present embodiment can also be expressed as follows: The information processing apparatus also includes the data transmission unit 114 and the data receiving unit 116. The data transmission unit 114 transmits the behavior representation data to a server. The data receiving unit 116 receives the behavior representation data of the second user from the server. The data control unit 118 generates a video signal that displays the behavior representation data of the first user and the second user as the objects in the two-dimensional display screen at a distance based on the predetermined data. That is, objects of all of the plurality of users can be based on behavior representation data and thus, the user can grasp information of still more of the plurality of pieces of information at a time.

The functional configuration of the information processing apparatus 100 according to the present embodiment can also be expressed as follows: The information processing apparatus also includes the position recognition unit 128 and the position data generation unit 130. The position recognition unit 128 recognizes the presence position of the first user. The position data generation unit 130 generates position data from presence position information, which is information about the presence position of the first user acquired from the position recognition unit 128. The predetermined data is the position data. The data transmission unit transmits the position data to the server, and the data receiving unit receives at least one piece of the position data of the second user from the server. Then, the data control unit receives the position data of the first user from the data transmission unit 114 and the position data of the second user from the data receiving unit 116. Thus, the user can grasp presence positions of the plurality of users and also what behavior each user exhibits.

The functional configuration of the information processing apparatus 100 according to the present embodiment can also be expressed as follows: The predetermined data is communication history data on a history of communication between users using the information processing apparatus 100 owned by each user. The data control unit 118 generates a video signal that displays the behavior representation data of the first user and the second user as the objects in the two-dimensional display screen at a distance based on the communication history data. Thus, the user can grasp what behavior each user currently exhibits while grasping closeness between users.

The functional configuration of the information processing apparatus 100 according to the present embodiment can also be expressed as follows: With an external object being brought into contact with the object displayed in the display screen, the data control unit causes the object to move following movement of the external object in contact. Thus, the arrangement position of an object concerning each user can be adjusted when necessary.

The functional configuration of the information processing apparatus 100 according to the present embodiment can also be expressed as follows: The predetermined data for each user is personal data on a user. The data transmission unit 114 transmits the personal data to the server. The data receiving unit 116 receives the personal data of the second user from the server. The data control unit 118 generates a video signal that displays the behavior representation data of the first user and the second user as the objects in the two-dimensional display screen at a distance based on the personal data. Thus, the user can grasp hobbies or the like of each user at a glance.

The functional configuration of the information processing apparatus 100 according to the present embodiment can also be expressed as follows: Communication between the first user and the second user is started by the data control unit 118 after a gesture of a predetermined type by the first user being made to the object of the user. Thus, a phone call or mail can be exchanged by a very simple operation.

The functional configuration of the information processing apparatus 100 according to the present embodiment can also be expressed as follows: The behavior parameter extraction unit 110 also includes the sensor data receiving unit 212, the behavior classification unit 218, and the extraordinary behavior extraction unit 220. The sensor data receiving unit 212 receives the sensor data. The behavior classification unit 218 classifies peaks based on a period in which a peak represented by an output value of the sensor data occurs when the sensor data is displayed chronologically. The extraordinary behavior extraction unit 220 extracts the peaks whose period is equal to or less than a predetermined value and transmits data on the extracted peaks to a behavior representation data generation unit as extraordinary behavior data. Thus, extraordinary behavior can be extracted from behavior exhibited by each user.

The functional configuration of the information processing apparatus 100 according to the present embodiment can also be expressed as follows: The behavior parameter extraction unit 110 also includes the sensor data receiving unit 212, the behavior pattern generation unit 214, and the behavior pattern evaluation unit 216. The sensor data receiving unit 212 receives the sensor data. The behavior pattern generation unit 214 acquires a plurality of sensor data to generate a behavior pattern. The behavior pattern evaluation unit 216 determines a correlation coefficient between the behavior pattern received from the behavior pattern generation unit 214 and the sensor data received from the sensor data receiving unit 212. Then, the behavior pattern evaluation unit 216 transmits the sensor data that does not fall within the range of predetermined correlation coefficients back to the behavior representation data generation unit 112. Thus, extraordinary behavior can be extracted from behavior exhibited by each user.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-311628 filed in the Japan Patent Office on 5 Dec. 2008, the entire content of which is hereby incorporated by reference.

What is claimed is:

1. An information processing apparatus comprising:
    a non-transitory storage device configured to record personal information about a first user, the personal information comprising a first communication history between the first user and a plurality of other users of other information processing apparatuses;
    a display screen configured to display objects representing the first user and the other users, positions of the objects being arranged on the display screen based on degrees of association among the first user and the other users; and
    a processor configured to
       determine a plurality of first degrees of association between the first user and each of the other users based on the first communication history between the first user and each of the other users;
       determine a second degree of association between a first other user and a second other user based on their respective first degrees of association with respect to the first user;
       generate a video signal that represents objects and cause the display screen to display the video signal;
       reposition the objects on the display screen based upon an input from the first user; and
       change at least one of the plurality of first degrees of association between the first user and the other users, or the second degree of association between the first other user and the second other user, based upon the repositioning.

2. The information processing apparatus according to claim 1, wherein the first communication history includes electronic mail communication.

3. The information processing apparatus according to claim 1, wherein the video signal includes a representation of personal information of the other users when the first user selects the objects.

4. The information processing apparatus according to claim 1, wherein the processor is further configured to condition a communication between the first user and the other users on the first degrees of association between the first user and the other users.

5. The information processing apparatus of claim 1,
    wherein the non-transitory storage device is further configured to record personal information about the other users, wherein the personal information about the first user includes past geographical position data of the first user and the personal information about the other users includes past geographical position data of the other users, and wherein the processor is further configured to determine past first degrees of association at a past time based on the past geographical position data about the first user and the other users.

6. The information processing apparatus of claim 1,
wherein the non-transitory storage device is further configured to record personal information about the other users,
wherein the processor is further configured to predict future personal information of the first user, the future personal information including future geographical position data of the first user,
wherein the processor is further configured to predict future personal information of the other users, the future personal information including future geographical position data of the other users, and
wherein the processor is further configured to predict future first degrees of association at a future time based on the future geographical position data of the first user and the other users.

7. The information processing apparatus of claim 1, wherein the processor is further configured to determine the second degree of association between the first other user and the second other user based on an angle formed by a first line connecting the objects representing the first user and the first other user, and a second line connecting the objects representing the first user and the second other user.

8. An information processing method comprising the steps of:
storing personal information about a first user, the personal information comprising a first communication history between the first user and a plurality of other users;
displaying, on a display screen, objects representing the first user and the other users, positions of the objects being arranged on the display screen based on degrees of association among the first user and the other users;
determining a plurality of first degrees of association between the first user and each of the other users based on the first communication history between the first user and each of the other users;
determining a second degree of association between a first other user and a second other user based on their respective first degrees of association with respect to the first user;
generating a video signal that represents objects and causing the display screen to display the video signal;
repositioning the objects on the display screen based upon an input from the first user; and
changing at least one of the plurality of first degrees of association between the first user and the other users, or the second degree of association between the first other user and the second other user, based upon the repositioning.

9. The information processing method according to claim 8, wherein the first communication history includes electronic mail communication.

10. The information processing method according to claim 8, wherein generating the video signal includes generating a representation of personal information of the other users when the first user selects the objects.

11. The information processing method according to claim 8, further comprising:
conditioning a communication between the first user and the other users on the plurality of first degrees of association between the first user and the other users.

12. The information processing method of claim 8, further comprising:
storing personal information about the other users,
wherein the personal information about the first user includes past geographical position data of the first user and the personal information about the other users includes past geographical position data of the other users, and
the method further comprising determining past first degrees of association at a past time based on the past geographical position data about the first user and the other users.

13. The information processing method of claim 8, further comprising:
storing personal information about the other users;
predicting future personal information of the first user, the future personal information including future geographical position data of the first user,
predicting future personal information of the other users, the future personal information including future geographical position data of the other users; and
predicting future first degrees of association at a future time based on the future geographical position data of the first user and the other users.

14. The information processing method of claim 8, wherein determining the second degree of association between the first other user and the second other user comprises determining the second degree of association based on an angle formed by a first line connecting the objects representing the first user and the first other user, and a second line connecting the objects representing the first user and the second other user.

15. A non-transitory, computer-readable storage medium storing a program that, when executed by a processor, causes the processor to execute a process comprising:
storing personal information about a first user, the personal information comprising a first communication history between the first user and a plurality of other users;
displaying, on a display screen, objects representing the first user and the other users, positions of the objects being arranged on the display screen based on degrees of association among the first user and the other users;
determining a plurality of first degrees of association between the first user and each of the other users based on the first communication history between the first user and each of the other users;
determining a second degree of association between a first other user and a second other user based on their respective first degrees of association with respect to the first user;
generating a video signal that represents objects and causing the display screen to display the video signal;
repositioning the objects on the display screen based upon an input from the first user; and
changing at least one of the plurality of first degrees of association between the first user and the other users, or the second degree of association between the first other user and the second other user, based upon the repositioning.

16. The non-transitory, computer-readable storage medium according to claim 15, wherein the ft communication history includes electronic mail communication.

17. The non-transitory, computer-readable storage medium according to claim 15, wherein the video signal includes a representation of personal information of the other users when the first user selects the objects.

18. The non-transitory, computer-readable storage medium according to claim 15, wherein the process further comprises:
conditioning a communication between the first user and the other users on the plurality of first degrees of association between the first user and the other users.

19. The non-transitory, computer-readable storage medium of claim 15, wherein the process further comprises:
storing personal information about the other users,
wherein the personal information about the first user includes past geographical position data of the first user and the personal information about the other users includes past geographical position data of the other users, and
the process further comprising determining past first degrees of association at a past time based on the past geographical position data about the first user and the other users.

20. The non-transitory, computer-readable storage medium of claim 15, wherein the process further comprises:
storing personal information about the other users,
predicting future personal information of the first user, the future personal information including future geographical position data of the first user,
predicting future personal information of the other users, the future personal information including future geographical position data of the other users; and
predicting future first degrees of association at a future time based on the future geographical position data of the first user and the other users.

21. The non-transitory, computer-readable storage medium of claim 15, wherein determining the second degree of association between the first other user and the second other user comprises determining the second degree of association based on an angle formed by a first line connecting the objects representing the first user and the first other user, and a second line connecting the objects representing the first user and the second other user.

\* \* \* \* \*